(12) United States Patent
Kakine et al.

(10) Patent No.: US 8,347,477 B2
(45) Date of Patent: Jan. 8, 2013

(54) PIPE PRODUCING APPARATUS AND EXISTING PIPE REHABILITATING METHOD EMPLOYING THE SAME

(75) Inventors: Shinji Kakine, Shiga (JP); Hiroshi Sugahara, Shiga (JP); Takushi Minagi, Shiga (JP); Takashi Yamamoto, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 870 days.

(21) Appl. No.: 12/442,939

(22) PCT Filed: Dec. 18, 2007

(86) PCT No.: PCT/JP2007/074315
§ 371 (c)(1),
(2), (4) Date: Mar. 25, 2009

(87) PCT Pub. No.: WO2008/075681
PCT Pub. Date: Jun. 26, 2008

(65) Prior Publication Data
US 2010/0008731 A1    Jan. 14, 2010

(30) Foreign Application Priority Data
Dec. 18, 2006  (JP) .................................. 2006-340207

(51) Int. Cl.
*B23P 6/00* (2006.01)
*F16L 55/18* (2006.01)
*B21D 41/02* (2006.01)

(52) U.S. Cl. .................... 29/402.01; 29/402.09; 29/451; 405/184.2; 405/150.1; 405/184.1; 138/97; 138/98; 138/154; 72/393; 72/370.08

(58) Field of Classification Search ............... 29/402.01, 29/402.09, 451, 453; 405/184.2, 184.1, 150.1; 138/97, 98, 144, 154; 72/393, 370.04, 370.05, 72/370.06, 370.08
See application file for complete search history.

(56) References Cited

U.S. PATENT DOCUMENTS
4,995,929 A * 2/1991 Menzel .......................... 156/187
(Continued)

FOREIGN PATENT DOCUMENTS
JP    3072015 B2    7/2000
(Continued)

OTHER PUBLICATIONS
International Search Report for the Application No. PCT/JP2007/074315 mailed Mar. 4, 2008.

*Primary Examiner* — Essama Omgba
(74) *Attorney, Agent, or Firm* — Cheng Law Group, PLLC

(57) ABSTRACT

In an embodiment, a shaping frame (2) of a pipe producing apparatus (1) includes a plurality of linking bodies (20) in which a pair of linking elements (21, 22) are rotatably coupled via a coupling shaft (23), a bending link (30) with opposite ends of which coupling elements are rotatably coupled via coupling shafts (23) and which expands or contracts the shaping frame (2), a drive unit (40) with opposite ends of which coupling elements (25, 25) are rotatably coupled via coupling shafts (23) and which forcedly sends out a profile strip (100) from the inside, and a joint unit (80) with opposite ends of which coupling elements (21, 22) are rotatably coupled via coupling shafts (23) and which is provided at a joint portion (120) of a winding of the profile strip.

8 Claims, 37 Drawing Sheets

U.S. PATENT DOCUMENTS

| | | | |
|---|---|---|---|
| 5,074,943 A * | 12/1991 | Menzel | 156/195 |
| 5,101,863 A * | 4/1992 | Fujii et al. | 138/98 |
| 5,799,701 A * | 9/1998 | Kitahashi et al. | 138/97 |
| 5,817,200 A * | 10/1998 | O'ffill | 156/94 |
| 6,234,226 B1 * | 5/2001 | Kitahashi et al. | 156/391 |
| 6,637,092 B1 * | 10/2003 | Menzel et al. | 29/451 |
| 7,186,060 B2 * | 3/2007 | Akimoto et al. | 405/184.2 |
| 7,476,055 B2 * | 1/2009 | Bateman et al. | 405/184.2 |
| 8,151,827 B2 * | 4/2012 | Ohira et al. | 138/98 |
| 8,240,339 B2 * | 8/2012 | Kamiyama et al. | 138/98 |
| 2004/0013472 A1 * | 1/2004 | Akimoto et al. | 405/184.2 |
| 2008/0205991 A1 * | 8/2008 | Bateman et al. | 405/184.2 |
| 2009/0129869 A1 * | 5/2009 | Zivanovic et al. | 405/184.2 |

FOREIGN PATENT DOCUMENTS

| | | |
|---|---|---|
| JP | 2002-525526 A | 8/2002 |
| JP | 2004-314639 A | 11/2004 |
| JP | 2005-061545 A | 3/2005 |
| JP | 2005-342915 A | 12/2005 |
| WO | WO 00/17564 A1 | 3/2000 |

* cited by examiner

PIPE PRODUCING APPARATUS AND EXISTING PIPE REHABILITATING METHOD EMPLOYING THE SAME

TECHNICAL FIELD

The present invention relates to a pipe producing apparatus for producing a tubular structure formed by helically winding an elongated profile strip on an inner peripheral surface of an existing pipe, such as an agricultural water pipe, a sewage pipe, a water supply pipe, a gas pipe or the like, and an existing pipe rehabilitating method employing the pipe producing apparatus.

BACKGROUND ART

Existing pipes, such as an agricultural water pipe, a sewage pipe, a water supply pipe, a gas pipe and the like, are aging, leading to a crack, corrosion or the like. In this case, such an existing pipe may be rehabilitated by lining the inner peripheral surface of the existing pipe with a synthetic resin or the like to form a tubular structure.

Such a tubular structure may be produced on the inner peripheral surface of an existing pipe by a known technique of producing a pipe by helically winding an elongated profile strip having joint portions at opposite edge portions thereof in the existing pipe. For example, a drum into which a profile strip has been rolled is provided on the ground, while a pipe producing apparatus is provided in an existing pipe. The profile strip is continuously fed from the drum to the pipe producing apparatus. The pipe producing apparatus helically winds the profile strip and joins adjacent joint portions with each other to form a tubular structure. The previously formed tubular structure is left and the profile strip is newly fed at a front thereof, thereby progressively and additionally forming and extending the tubular structure (see, for example, Patent Document 1).

A pipe producing apparatus 300 for use in such a technique of rehabilitating an existing pipe 200 comprises, as shown in FIG. 37, a shaping frame 310 including a plurality of guide rollers 320 supported and arranged in an annular shape, and a joining mechanism portion 330 for joining joint portions of opposite edge portions of a profile strip 600. The joining mechanism portion 330 includes an outer roller 331 and an inner roller 332.

When the pipe producing apparatus 300 is used to produce a tubular structure 610, the outer roller 331 orbits along the inner peripheral surface of the existing pipe 200, so that the outer roller 331 may get stuck by pits or projections formed in the inner peripheral surface of the existing pipe 200 and may be damaged, or the formed tubular structure 610 may have an internal diameter smaller than that of the existing pipe 200, resulting in a gap between the existing pipe 200 and the tubular structure 610. When such a gap is formed between the existing pipe 200 and the tubular structure 610, the tubular structure 610 cannot be fixed to the existing pipe 200. In this case, if a large amount of water flows through the tubular structure 610, the tubular structure 610 may be shifted in a pipe axial direction by the flow of water, or soil water may enter the gap between the existing pipe 200 and the tubular structure 610, so that the soil water causes external force to be applied to the tubular structure 610, and therefore, the junction of windings of the profile strip 600 may be released. Therefore, a back-filling material is injected and loaded into the gap between the existing pipe 200 and the tubular structure 610 so that the tubular structure 610 is fixed to the existing pipe 200. Therefore, when the pipe producing apparatus 300 is used to produce the tubular structure 610, the step of injecting the back-filling material is required, and the cost of the back-filling material itself is also required. In addition, the tubular structure 610 thus formed has an internal diameter smaller than that of the existing pipe 200, so that the maximum amount of water that can be caused to flow therein is disadvantageously reduced.

To avoid this, a pipe producing apparatus has been proposed that can produce a tubular structure without formation of a gap between an existing pipe and the tubular structure (see, for example, Patent Document 2).

This pipe producing apparatus helically winds a profile strip having joint portions at opposite edge portions thereof, so that adjacent joint portions are joined with each other to form a tubular structure. Adjacent joint portions of the profile strip are joined with each other by means of reactive force provided by tension when the previous winding of the profile strip is pressed and expanded in an outer peripheral direction by a guide roller, and force that advances a new winding of the profile strip. Specifically, as shown in FIGS. 38 and 39, pipe producing apparatuses 400 and 500 comprise a plurality of guide rollers 420 and 520 that are supported by shaping frames 410 and 510 provided at center positions thereof with the guide rollers 420 and 520 being pressed toward an outer peripheral direction by the shaping frames 410 and 510.

Patent Document 1: JP 3072015 B
Patent Document 2: JP 2002-525526 A

DISCLOSURE OF INVENTION

Problem to be Solved by the Invention

However, in the pipe producing apparatus 400 as shown in FIG. 38, the number of the guide rollers 420 is small for the internal diameter of the existing pipe, and the space between each guide roller 420 is large. Therefore, it is difficult to form the tubular structure 610 along the inner peripheral surface of the existing pipe, so that a gap is formed between the inner peripheral surface of the existing pipe and the tubular structure 610. Therefore, in order to prevent a gap from being formed between the inner peripheral surface of the existing pipe and the tubular structure, the space between each guide roller 520 is reduced in a practical pipe producing apparatus as shown in FIG. 39.

However, if a complex structure is employed in which the space between each guide roller 520 is reduced as in the pipe producing apparatus 500 of FIG. 39, it is difficult to perform the pipe producing process while water is caused to flow through an existing pipe. Specifically, if the pipe producing apparatus 500 is used to produce a pipe while water is caused to flow through an existing pipe, the pipe producing apparatus 500 substantially blocks the existing pipe, so that the pipe producing apparatus 500 prevents the flow of water in the existing pipe. In this case, the hydraulic pressure of held water may shift the pipe producing apparatus 500 in the pipe axial direction of the existing pipe, or held water may overflow an upstream manhole.

On the other hand, since the pipe producing apparatus 500 has a complex structure, waste, paper or other junk that flows along with water in an existing pipe may get stuck in each movable portion of the pipe producing apparatus 500. In this case, the pipe producing process may be interrupted, or an enormous time may be required to perform maintenance with respect to the pipe producing apparatus 500 after the pipe producing process.

Therefore, when the pipe producing apparatus 500 is used to produce a pipe, the flow of water needs to be blocked in a section of an existing pipe to be treated. In this case, a complicated work is required, e.g., an alternative path needs to be created on the ground for water that would otherwise flow in the section of the existing pipe to be treated. For example, if an existing pipe is a sewage pipe, the use of water needs to be temporarily stopped in each house that drains waste water into the section of the existing pipe to be treated, so as to prevent the waste water from flowing into the section of the existing pipe to be treated.

The pipe producing apparatus 500 is normally carried through a manhole into an existing pipe. In this case, the pipe producing apparatus 500 cannot be carried into the existing pipe unless the pipe producing apparatus 500 needs to be disassembled to some extent. Since the pipe producing apparatus 500 has a complex structure as described above, it takes an enormous time to disassemble and assemble the pipe producing apparatus 500 when it is carried in and out.

Also, in the pipe producing apparatus 500, only a drive unit 530 for feeding a profile strip to an outer side of the guide roller 520 is used to correct and feed the profile strip 600 that is fed in a twisted state, so that the profile strip 600 is positioned adjacent to the previous winding of the profile strip 600. Therefore, the drive unit 530 needs to have large drive force, leading to an increase in size of the pipe producing apparatus 500 itself or a large load to each movable portion of the drive unit 530 or the profile strip 600. Therefore, a failure may occur in the drive unit 530, the profile strip 600 is damaged, or the like.

In view of the circumstances described above, the present invention has been achieved. An object of the present invention is to provide a pipe producing apparatus that can produce a tubular structure having any external diameter in an existing pipe even when water is flowing through the existing pipe and that can be easily carried into or out of the existing pipe.

Means for Solving Problem

To achieve the object, the present invention is characterized by a pipe producing apparatus for continuously feeding an elongated profile strip into an existing pipe, helically winding the profile strip, and joining adjacent windings of the profile strip to form a tubular structure, and further feeding a new winding of the profile strip to a front of the tubular structure, thereby progressively and additionally forming a tubular structure. The apparatus comprises a shaping frame provided in the existing pipe, and a guide roller rotatably supported by the shaping frame. The shaping frame includes a drive unit for forcedly feeding the profile strip from an inside of the shaping frame, and a bending link coupled with the shaping frame, wherein the bending link is bent toward an inside of the shaping frame. The bending link includes an actuator for changing a bent shape of the bending link, wherein a diameter of the shaping frame is expanded or contracted by the bending link, thereby applying tension to a previous winding of the profile strip via the guide roller.

According to the present invention, the bending link is used to expand the diameter of the shaping frame, thereby applying tension to a previous winding of the profile strip, and a new winding of the profile strip is fed to the previous winding of the profile strip by the drive unit from the inside. By reactive force with respect to the drive force, the shaping frame is rotated in a direction opposite to the feeding direction, so that a joint portion of the new winding of the profile strip is joined with a joint portion of the previous winding of the profile strip. Therefore, a tubular structure having any external diameter can be produced. For example, in the pipe producing apparatus of the present invention, an outer roller is not provided outside the shaping frame, so that a tubular structure can be produced without a gap between the tubular structure and the inner peripheral surface of the existing pipe throughout its cross-section.

The present invention is also characterized in that, in the thus-configured pipe producing apparatus, a plurality of linking bodies including a pair of linking elements rotatably coupled via coupling shafts, are coupled with the drive unit and the bending link in the shaping frame.

The present invention is also characterized in that, in the thus-configured pipe producing apparatus, coupling elements are rotatably coupled via coupling shafts with opposite ends of the bending link.

Also, in the thus-configured pipe producing apparatus of the present invention, the actuator is preferably a hydraulic cylinder or a pneumatic cylinder in view of operability, anchorage strength, or the like.

The present invention is also characterized by a pipe producing apparatus for continuously feeding an elongated profile strip into an existing pipe, helically winding the profile strip, and joining adjacent windings of the profile strip to form a tubular structure, and further feeding a new winding of the profile strip to a front of the tubular structure, thereby progressively and additionally forming a tubular structure. The apparatus comprises a shaping frame provided in the existing pipe, and a guide roller rotatably supported by the shaping frame. The shaping frame includes a drive unit for forcedly feeding the profile strip from an inside of the shaping frame, and a joint unit for pinching previous windings of the profile strip passed through the drive unit from an inside and an outside of the shaping frame. The profile strip includes a main joint portion and a subsidiary joint portion at each of opposite edge portions thereof, wherein one of the edge portions is fitted with the other edge portion in a width direction. The main joint portions of adjacent windings of the profile strip helically wound by the drive unit are joined by the guide roller, and subsequently, the subsidiary joint portions are joined via the joint unit.

According to such a configuration of the present invention, when a tubular structure is formed, main joint portions of a profile strip are first joined so as to regulate the external diameter of the tubular structure, and next, subsidiary joint portions of the profile strip are joined. Therefore, the strength and the water leakage preventing ability of the tubular structure can be improved, and a tubular structure can be produced without a gap between the tubular structure and the inner peripheral surface of an existing pipe.

The present invention is also characterized in that, in the thus-configured pipe producing apparatus, the joint unit includes an inner surface roller rotatably provided in the shaping frame, and an outer surface pressing means for pressing the profile strip against the inner surface roller outside the shaping frame, wherein the outer surface pressing means is provided farther inside than an outer shape of the tubular structure.

Thereby, the inner surface roller supports the profile strip pressed by the outer surface pressing means from the outside while contacting the profile strip, thereby making it possible to smoothly join subsidiary joint portions.

Here, the outer surface pressing means preferably has a pressing section between an inner peripheral surface of an existing pipe and previous windings of the profile strip. The pressing section is used to join the subsidiary joint portions of the previous windings of the profile strip.

Also, the profile strip preferably includes, as the main joint portion, a joint concave portion at a first edge portions thereof and a joint convex portion at a second edge portion thereof, the joint concave portion and the joint convex portion overlapping and interlocking with each other, and as the subsidiary joint portion, a bent piece for elastically interlocking with the second edge portion. The pressing section of the joint unit preferably causes the bent piece of a winding of the profile strip to interlock with the second edge portion of an adjacent winding of the profile strip.

Further, in the above pipe producing apparatus, the outer surface pressing means is preferably a roller including a pressing section rotatably provided on and protruding from an outer peripheral surface thereof.

With such a configuration, main joint portions of the profile strip are first joined to form a tubular structure having any outer shape, and further, the joint unit is used to smoothly join subsidiary joint portions, so that the pipe producing process can be smoothly performed. Such a profile strip can be used to form a tubular structure having a high level of strength and a high level of water leakage preventing ability.

The present invention is also characterized in that, in the thus-configured pipe producing apparatus, the joint unit is provided at a position such that the profile strip is elastically deformed to be positioned farther inside than an outer shape of the tubular structure.

Thereby, even if a joint unit for joining subsidiary joint portions of the profile strip is provided, a tubular structure whose cross-section conforms to that of an existing pipe can be formed without a loss in the cross-sectional shape of the existing pipe, and windings of the profile strip can be joined within an elastic deformation range of the tubular structure.

The present invention is also characterized in that, in the thus-configured pipe producing apparatus, the outer surface pressing means includes a sliding mechanism that allows the outer surface pressing means to slide in a pipe axial direction with respect to the shaping frame.

Thereby, the pipe producing apparatus can flexibly handle cases where the width of the profile strip or the internal diameter of an existing pipe varies, so that the outer surface roller can be prevented from being displaced, so that windings of the profile strip can be smoothly joined.

The present invention is also characterized in that, in the thus-configured pipe producing apparatus, a plurality of linking bodies including a pair of linking elements rotatably coupled via coupling shafts, are coupled with the drive unit and a joint frame in the shaping frame.

The present invention is further characterized in that, in the thus-configured pipe producing apparatus, the joint unit includes a rotation blocking frame for blocking rotation of the coupling shaft, wherein the rotation blocking frame is provided, spanning between the pair of linking elements of the linking body.

With such a configuration, the joint unit can be formed by a simple structure. Even a back-filling material can be smoothly loaded since it is not interfered by the outer surface pressing means of the joint unit. Thus, the process of loading a back-filling material and the pipe producing process can be simultaneously performed.

Also, in the pipe producing apparatus of the present invention, coupling elements are desirably rotatably coupled via coupling shafts with opposite ends of the drive unit.

Also, in the pipe producing apparatus, a feeding unit for forcedly feeding the profile strip to the drive unit may be provided via a stay inside the shaping frame.

Also, in the pipe producing apparatus, a guide plate for helically guiding the profile strip may be provided between the feeding unit and the drive unit.

Further, in the pipe producing apparatus, the guide roller is preferably provided at a plurality of portions of the shaping frame.

With such a configuration, the shaping frame of the pipe producing apparatus is formed by coupling the linking bodies, the bending link, and the drive unit. Therefore, for example, by releasing the junction of the coupling portion of adjacent linking bodies, the shaping frame can be changed to a single line of the linking bodies, the bending link, and the drive unit, so that the pipe producing apparatus can be easily disassembled and assembled. Therefore, the maintenance of the pipe producing apparatus can be easily performed. The pipe producing apparatus can also be easily carried into or out of an existing pipe.

Also, as is different from a conventional pipe producing apparatus having a frame at a center thereof, during pipe production, the pipe producing apparatus does not clog an existing pipe, so that a tubular structure can be produced in the existing pipe even when water is passed through the existing pipe. In addition, since the structure of the pipe producing apparatus is simple, waste, paper or other junk that flows along with water in an existing pipe substantially does not get stuck in movable portions, such as the drive unit and the like, of the pipe producing apparatus. Even if an object gets stuck in any movable portion of the pipe producing apparatus, the object can be easily removed.

Note that the linking bodies, the bending link, and the drive unit may be coupled by coupling the bending link via a coupling element with an end of a line of the linking bodies coupled with each other, and coupling the drive unit via a coupling element with the other end of the line. The bending link and the drive unit may be coupled by directly coupling their coupling elements or by interposing one or more linking bodies between the coupling the coupling element of the bending link and the coupling element of the drive unit.

To achieve the object, the present invention is characterized by a rehabilitation method for rehabilitating an existing pipe by using a pipe producing apparatus to continuously feed an elongated profile strip into the existing pipe, helically wind the profile strip, and join adjacent windings of the profile strip to form a tubular structure, and further feed a new winding of the profile strip to a front of the tubular structure, thereby progressively and additionally forming a tubular structure. In the pipe producing apparatus, the shaping frame provided in the existing pipe has a drive unit for forcedly feeding the profile strip from an inside of the shaping frame, and a bending link provided in a bent state and having an actuator for changing the bent shape. A diameter of the shaping frame is expanded or contracted into any outer shape by changing the bent shape of the bending link, so that tension is applied to a previous winding of the profile strip, and a new winding of the profile strip is newly forcedly sent by the drive unit to the previous winding of the profile strip, so that the previous winding of the profile strip is joined with the newly fed winding of the profile strip.

According to the present invention, a tubular structure having any external diameter can be produced in an existing pipe even when water is flowing through the existing pipe. In addition, the pipe producing apparatus can be easily carried into or out of the existing pipe.

To achieve the object, the present invention is characterized by a rehabilitation method for rehabilitating an existing pipe by using a pipe producing apparatus to continuously feed an elongated profile strip into the existing pipe, helically wind the profile strip, and join adjacent windings of the profile strip to form a tubular structure, and further feed a new winding of the profile strip to a front of the tubular structure, thereby progressively and additionally forming a tubular structure. In the pipe producing apparatus, the shaping frame provided in the existing pipe has a drive unit for forcedly feeding the profile strip from an inside of the shaping frame, and a joint unit for pinching previous windings of the profile strip passed through the drive unit from an inside and an outside of the shaping frame. The profile strip includes a main joint portion and a subsidiary joint portion at each of opposite edge portions thereof, wherein one of the edge portions is fitted with the other edge portion in a width direction. The main joint portions of adjacent windings of the profile strip helically wound by the drive unit are joined by the guide roller, and subsequently, the subsidiary joint portions are joined via the joint unit.

According to the present invention, a tubular structure having any external diameter and having a high level of strength and water leakage preventing ability can be produced in an existing pipe even when water is flowing through the existing pipe. In addition, the pipe producing apparatus can be easily carried into or out of the existing pipe.

Effects of the Invention

According to the thus-configured pipe producing apparatus and existing pipe rehabilitating method of the present invention, a tubular structure having any external diameter can be produced in an existing pipe even when water is flowing through the existing pipe, and the pipe producing apparatus can be easily carried into or out of the existing pipe. In addition, the main joint portion and the subsidiary joint portion of the profile strip can be successively joined, thereby smoothly performing pipe production.

BRIEF DESCRIPTION OF DRAWINGS

FIG. 26(a) is an explanatory diagram showing that a main joint portion is formed in the profile strip, and FIG. 26(b) is an explanatory diagram showing that a subsidiary joint portion is formed in the profile strip, following FIG. 26(a).

Figure 1:
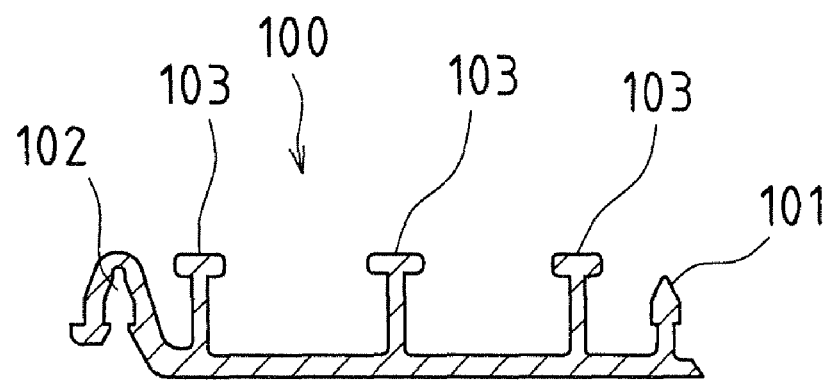
FIG. 1 is a cross-sectional view showing an exemplary profile strip for use in a pipe producing apparatus according to the present invention.
Figure 2:
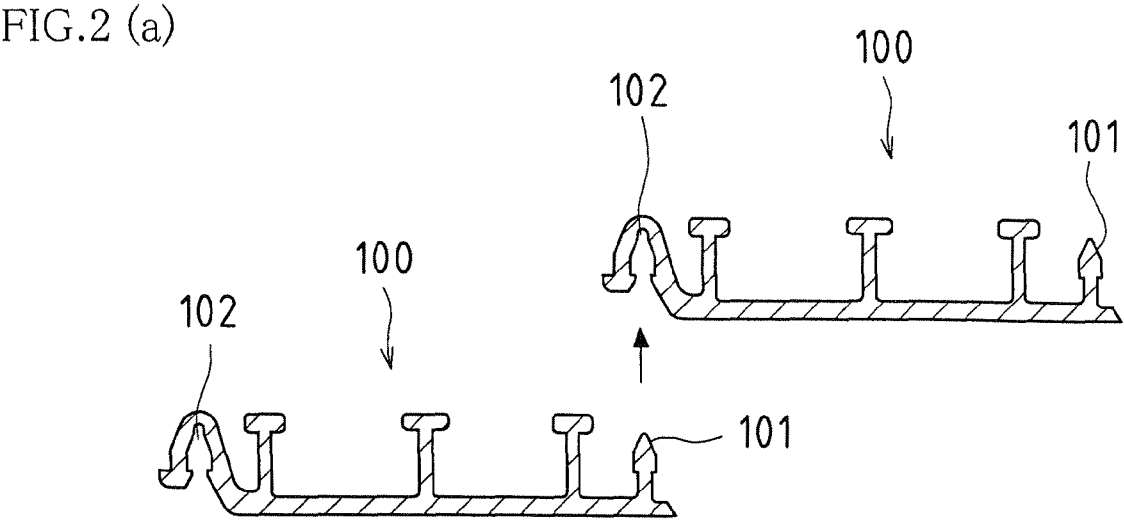
FIGS. 2(a) and 2(b) are cross-sectional views showing a joined state of the profile strip of FIG. 1.
Figure 2:
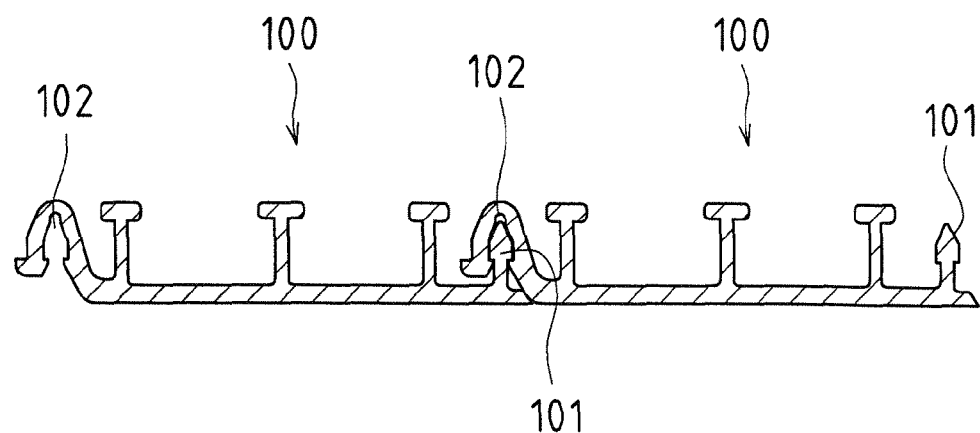

DESCRIPTION OF REFERENCE NUMERALS 1 pipe producing apparatus
2 shaping frame 20 linking body
21, 22 linking element
23 coupling shaft
24, 25 coupling element
26 adjusting means
30 bending link
34 hydraulic cylinder
40 drive unit
50 guide roller
60 feeding unit
67 stay
70 guide plate
80 joint unit
83 inner surface roller
84 outer surface roller
100 profile strip
101 joint convex portion
102 joint concave portion
103 rib
110 main joint portion
120 subsidiary joint portion
130 tubular structure
200 existing pipe

DESCRIPTION OF THE INVENTION

Hereinafter, a best mode for carrying out a pipe producing apparatus according to the present invention and an existing pipe rehabilitating method employing the pipe producing apparatus will be described with reference to the accompanying drawings.

First Embodiment

A first embodiment of a pipe producing apparatus and an existing pipe rehabilitating method of the present invention will be described. Firstly, a profile strip that is used to rehabilitate an existing pipe in the first embodiment will be described with reference to FIGS. 1 to 4.

FIG. 1 is a cross-sectional view showing an exemplary profile strip that is used to form a tubular structure. FIG. 2(a) is a cross-sectional view showing windings of the profile strip of FIG. 1 that are about to be joined with each other. FIG. 2(b) is a cross-sectional view showing a joined state of the profile strip of FIG. 1.

The profile strip 100 of FIG. 1 is obtained by molding a synthetic resin (e.g., a hard vinyl chloride, polyethylene, polypropylene, etc.) into an elongated shape. A plurality of ribs 103, ..., and 103 are formed along a longitudinal direction of the profile strip 100. A joint convex portion 101 and a joint concave portion 102 are formed at opposite edge portions of the profile strip 100 along the longitudinal direction. The joint convex portion 101 and the joint concave portion 102 overlap and interlock with each other, where the joint convex portion 101 is positioned inside the joint concave portion 102 and, in other words, the joint concave portion 102 is positioned outside the joint convex portion 101.

The profile strip 100 having such a structure is helically wound by a pipe producing apparatus described below. During this winding process, as shown in FIGS. 2(a) and 2(b), two adjacent windings of the profile strip 100 are joined with each other by fitting the joint convex portion 101 of one of the windings of the profile strip 100 into the joint concave portion 102 of the other winding of the profile strip 100 from the inside (the inner side of the previous winding of the profile strip 100).

Figure 3:
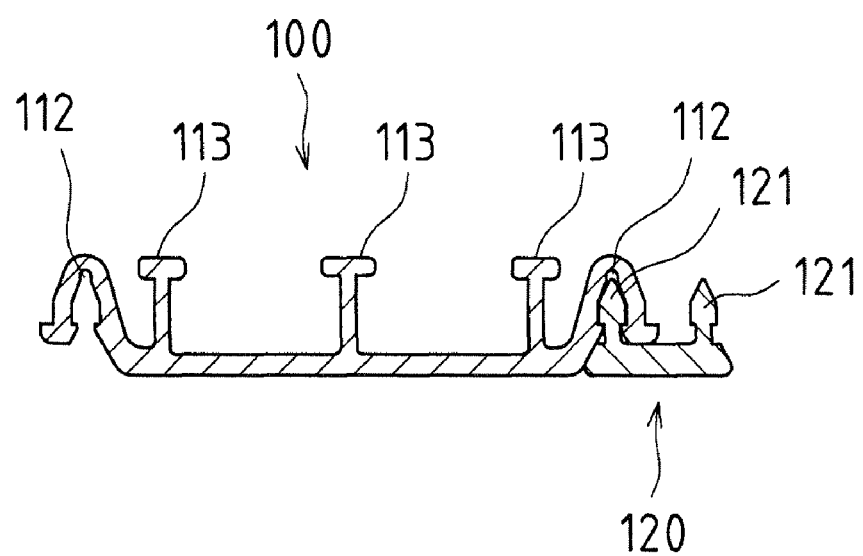
FIG. 3 is a cross-sectional view showing another exemplary profile strip for use in the pipe producing apparatus of the present invention.
Figure 4:
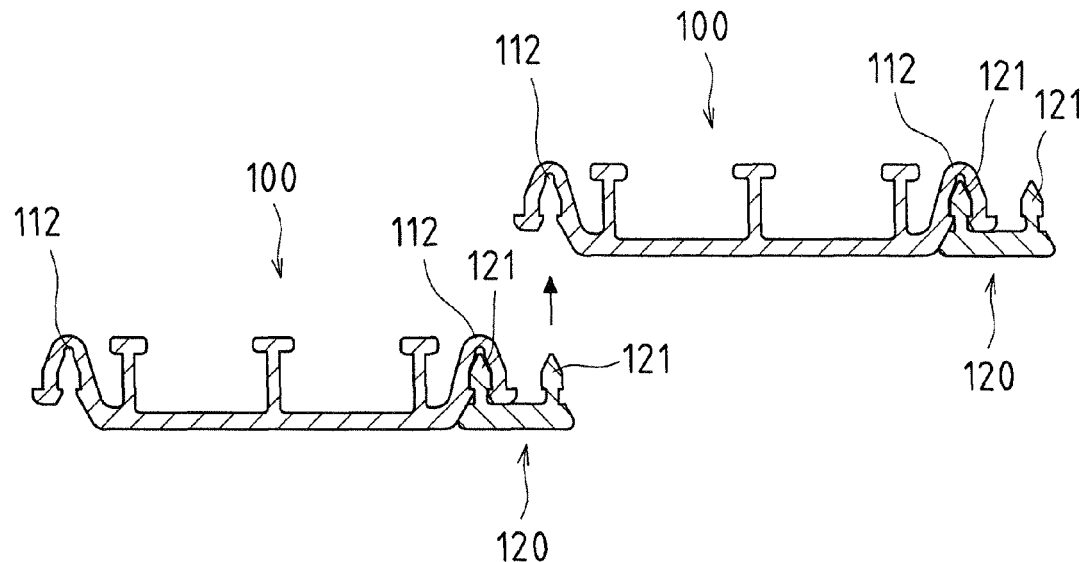
FIGS. 4(a) and 4(b) are cross-sectional views showing a joined state of the profile strip of FIG. 3.
Figure 4:
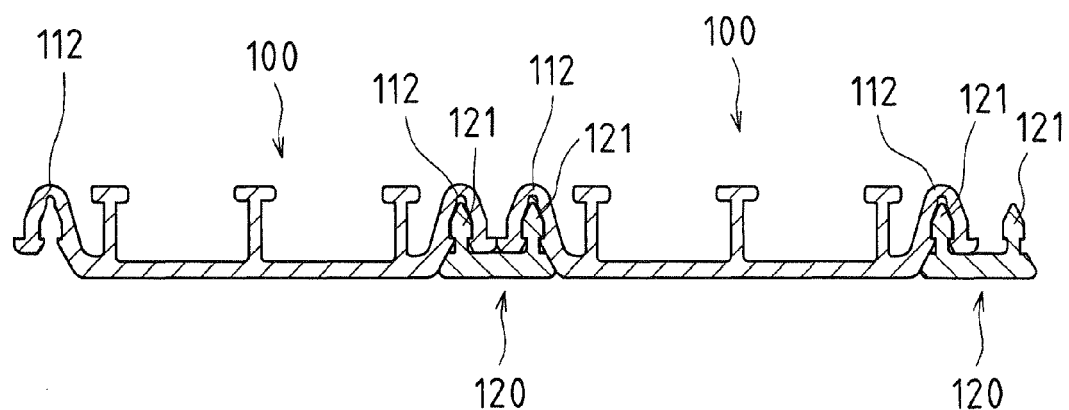

FIG. 3 is a cross-sectional view showing another exemplary profile strip for forming a tubular structure. FIG. 4(a) is a cross-sectional view windings of the profile strip of FIG. 3 that are about to be joined with each other. FIG. 4(b) is a cross-sectional view showing a joined state of the profile strip of FIG. 3.

The profile strip 100 of FIG. 3 is obtained by molding a synthetic resin (e.g., a hard vinyl chloride, polyethylene, polypropylene, etc.) into an elongated shape. A plurality of ribs 113, ..., and 113 are formed along a longitudinal direction of the profile strip 100. Windings of the profile strip 100 of this example are joined with each other using an elongated strip-shaped connector 120.

A joint concave portion 112 is formed at each of opposite edge portions of the profile strip 100 along a longitudinal direction thereof. A connector 120 has two joint convex portions 121 capable of being joined with the joint concave portions 112 of the profile strip 100. The two joint convex portions 121 are formed in parallel along the longitudinal direction.

The profile strip 100 having such a structure is helically wound by a pipe producing apparatus described above with one of the joint convex portions 121 of the connector 120 being fitted in one of the joint concave portions 112 and 112 at the opposite edge portions. During this winding process, as shown in FIGS. 4(a) and 4(b), adjacent windings of the profile strip 100 can be joined with each other by fitting the joint convex portion 121 of the connector 120 fitted in the joint concave portion 112 of one of two adjacent windings of the profile strip 100 into the joint concave portion 112 of the other winding of the profile strip 100 from the inside (the inner side of the previous winding of the profile strip 100).

Figure 5:
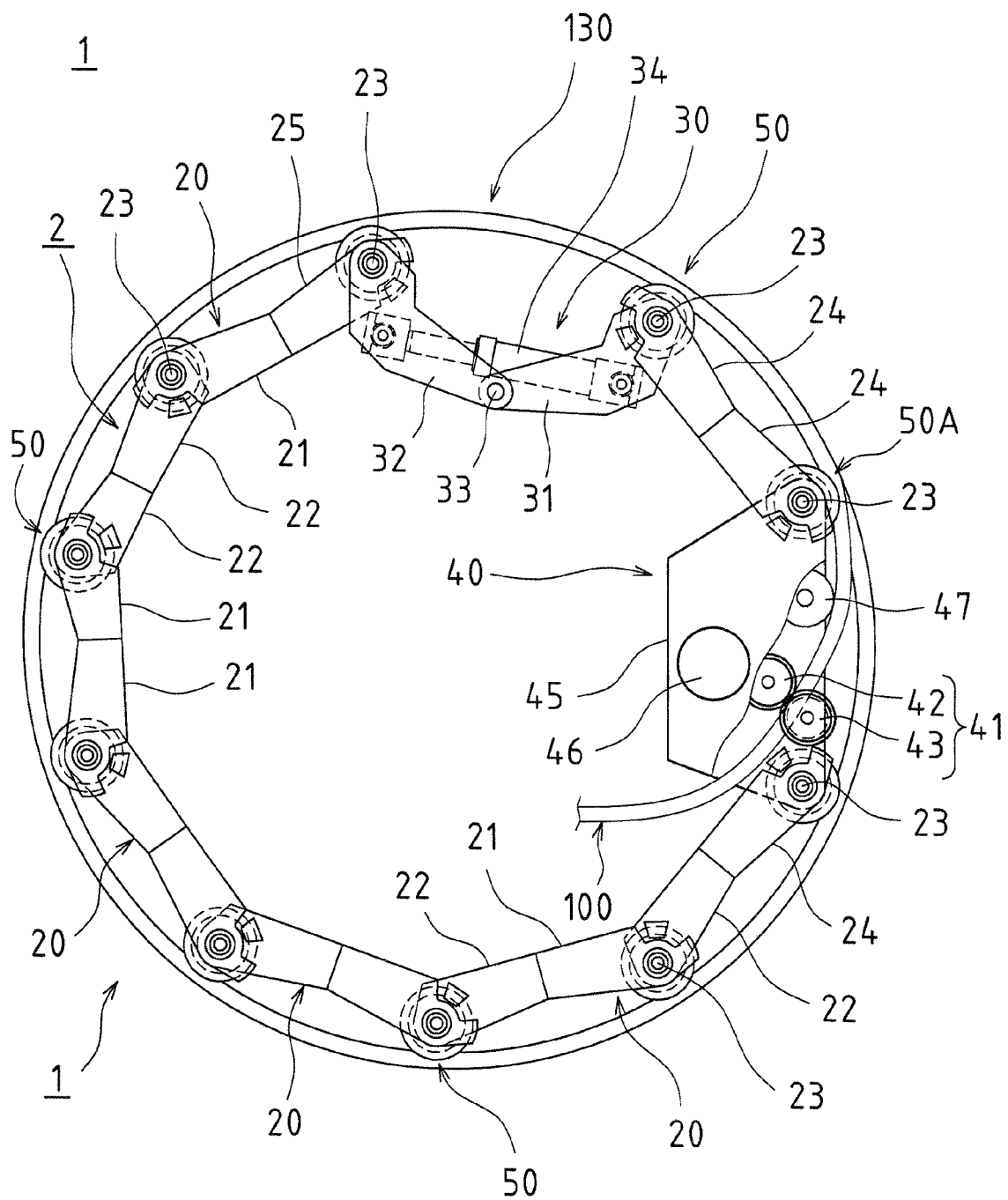
FIG. 5 is a front view showing a first embodiment of the pipe producing apparatus of the present invention.
Figure 6:
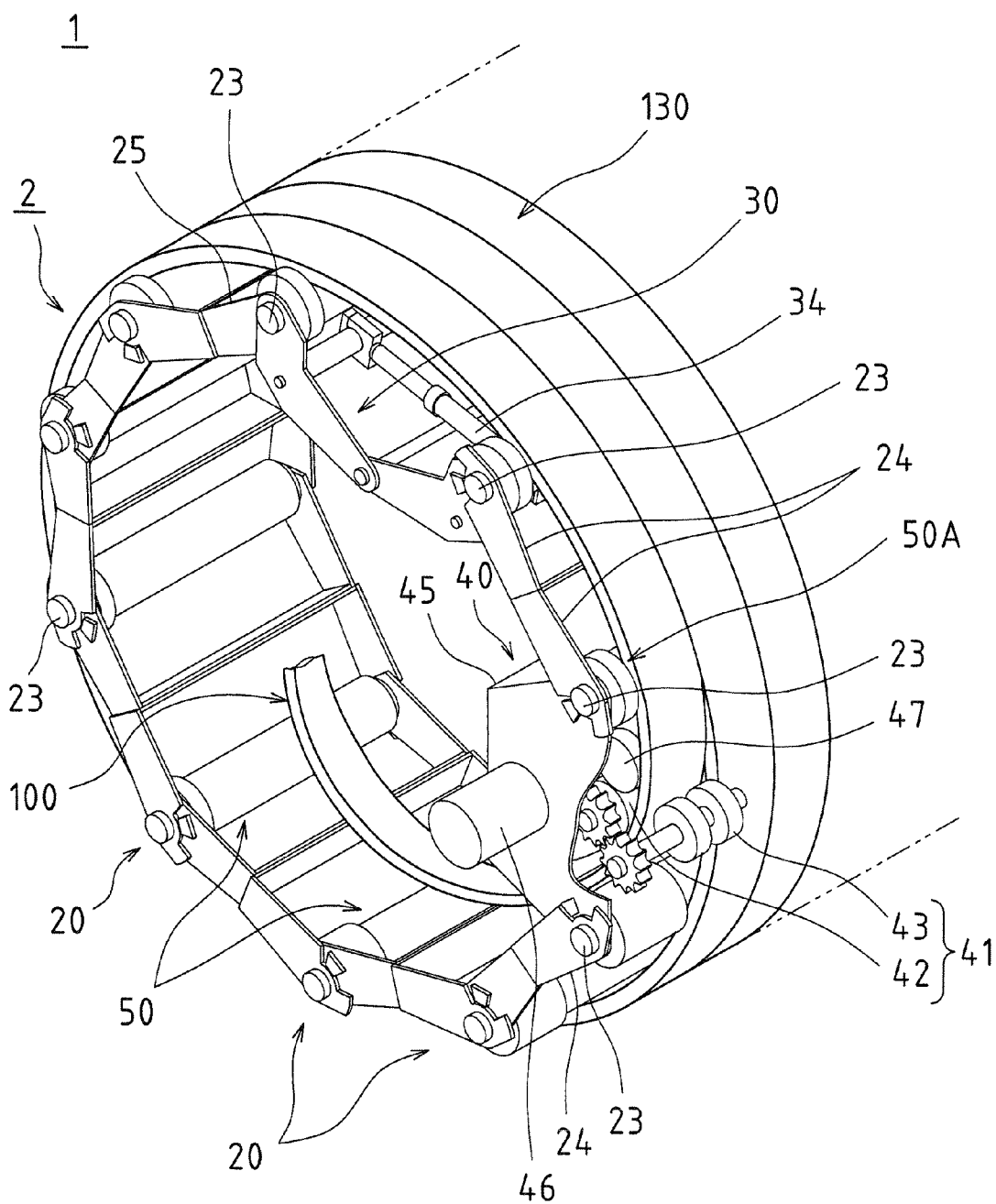
FIG. 6 is a perspective view of the pipe producing apparatus of FIG. 5.

Next, a pipe producing apparatus according to the first embodiment of the present invention will be described. FIG. 5 is a front view of the pipe producing apparatus of the first embodiment of the present invention. FIG. 6 is a perspective view of the pipe producing apparatus of FIG. 5. Note that, in the following description, a direction in which the pipe producing apparatus 1 is advanced in a pipe channel when producing a tubular structure is a forward direction, and its opposite direction is a backward direction for the sake of convenience.

The pipe producing apparatus 1 comprises a shaping frame 2 and a plurality of guide rollers 50 rotatably provided in the shaping frame 2. As shown in FIG. 5, the shaping frame 2 comprises a plurality of linking bodies 20 each including a pair of linking elements 21 and 22 and a coupling shaft 23, where the linking elements 21 and 22 are rotatably coupled with each other via the coupling shaft 23, a bending link 30 to opposite ends of which coupling elements 24 and 25 are rotatably coupled via coupling shafts 23, and a drive unit 40 to opposite ends of which coupling elements 24 and 24 are rotatably coupled via coupling shafts 23. The shaping frame 2 is formed in substantially an annular shape by coupling the linking bodies 20, the coupling elements 24 and 25 of the bending link 30, and the coupling elements 24 and 24 of the drive unit 40 with each other, where the bending link 30 is bent inward.

More specifically, the shaping frame 2 comprises the bending link 30, which is provided in a bent state and has an actuator that changes the bent shape. Also, in the shaping frame 2, while the bending link 30 is bent inward, the linking element 21 at one end of the linking bodies 20 coupled in a line is coupled with the coupling element 25 coupled with the bending link 30. The linking element 22 at the other end of the linking bodies 20 coupled in a line is coupled with one of the coupling elements 24 coupled with the drive unit 40. Further, the coupling element 24 coupled with the bending link 30 is coupled with the other of the coupling elements 24 coupled with the drive unit 40. Thus, the shaping frame 2 is formed in substantially an annular shape.

FIG. 7(a) is a front view for describing the linking body in the pipe producing apparatus of FIG. 5. FIG. 7(b) is a plan view thereof. As shown in these figures, the linking elements 21 and 22 constituting each linking body 20 comprise front side plates 21a and 22a, rear side plates 21b and 22b, and coupling plates 21c and 22c provided spanning between first end portions facing each other of the front side plates 21a and 22a and the rear side plates 21b and 22b, which are arranged in a square U shape. Also, in the linking body 20, second end portions facing each other of the front side plate 21a and the rear side plate 21b of the linking element 21 and second end portions facing each other of the front side plate 22a and rear side plate 22b of the linking element 22 are caused to overlap each other and are rotatably coupled with each other via the coupling shaft 23.

Also, adjacent linking bodies 20 and 20 are detachably coupled with each other via a bolt and a nut (not shown) by appropriately combining the coupling plates 21c and 22c of the linking elements 21 and 22 constituting the linking body 20 and the coupling plates 21c and 22c of the linking elements 21 and 22 constituting the linking body 20.

Note that, as described above, if particular adjacent linking bodies 20 and 20 can be detached so that the shaping frame 2 can be formed into a straight line, the coupling plates 21c and 22c of the remaining linking bodies 20 may be undetachably fixed by welding or the like.

Further, a rotation regulating piece 28 is provided at each of the second end portions of the front side plate 22a and the rear side plate 22b of the linking element 22. Also, a notch portion 27 corresponding to the rotation regulating piece 28 is formed at each of the second end portions of the front side plate 21a and the rear side plate 21b of the linking element 21. The notch portion 27 is formed, extending across a predetermined range on a set radius where the rotational axle of the coupling shaft 23 is a center. A range within which the linking element 22 can be rotated with respect to the linking element 21 is regulated by the rotation regulating piece 28 abutting the notch portion 27. Thereby, the inward bending of the linking body 20 is regulated.

Figure 8:
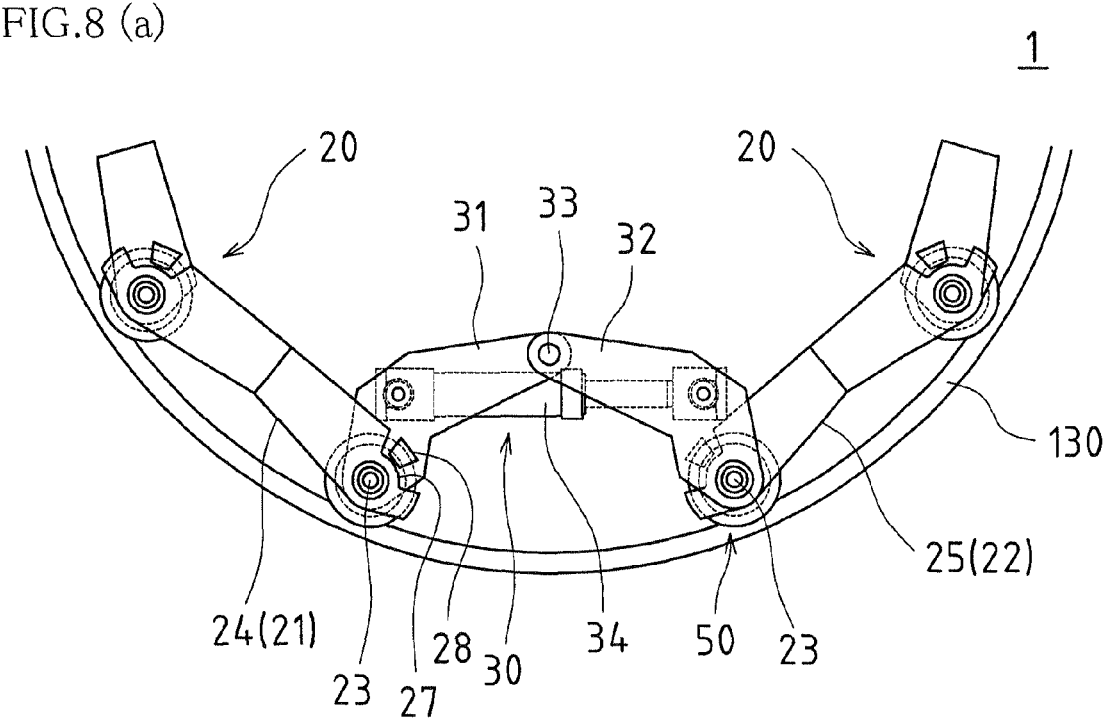
FIG. 8(a) is a front view for describing a bending link in the pipe producing apparatus of FIG. 5.
FIG. 8(b) is a plan view thereof.
Figure 8:
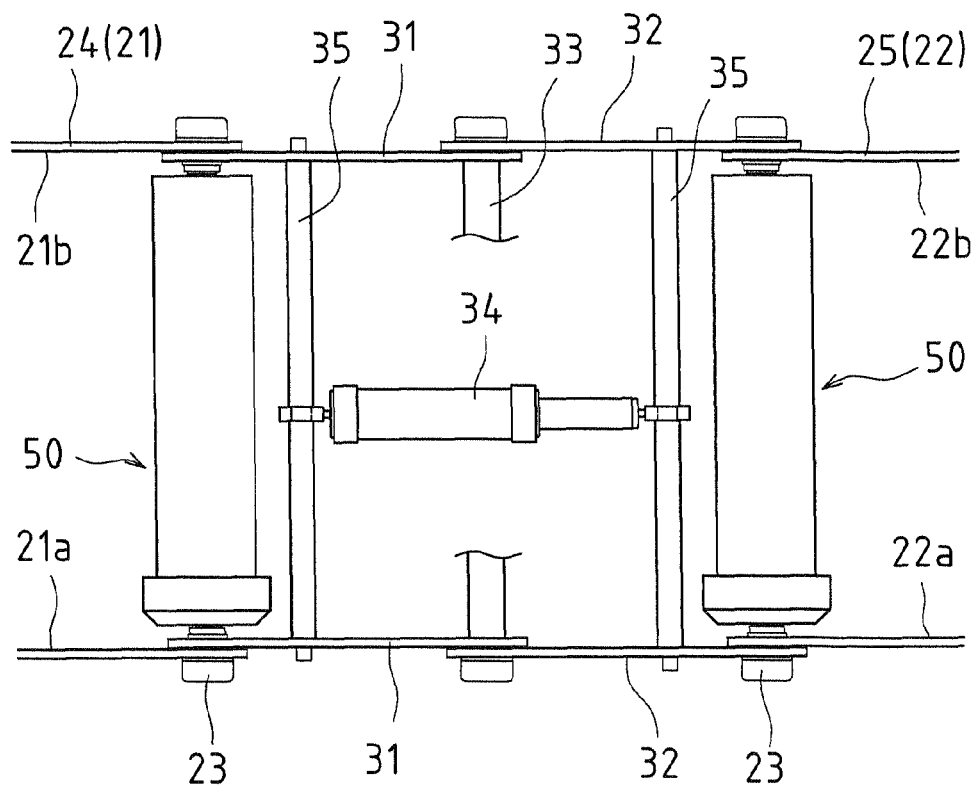
Figure 9:
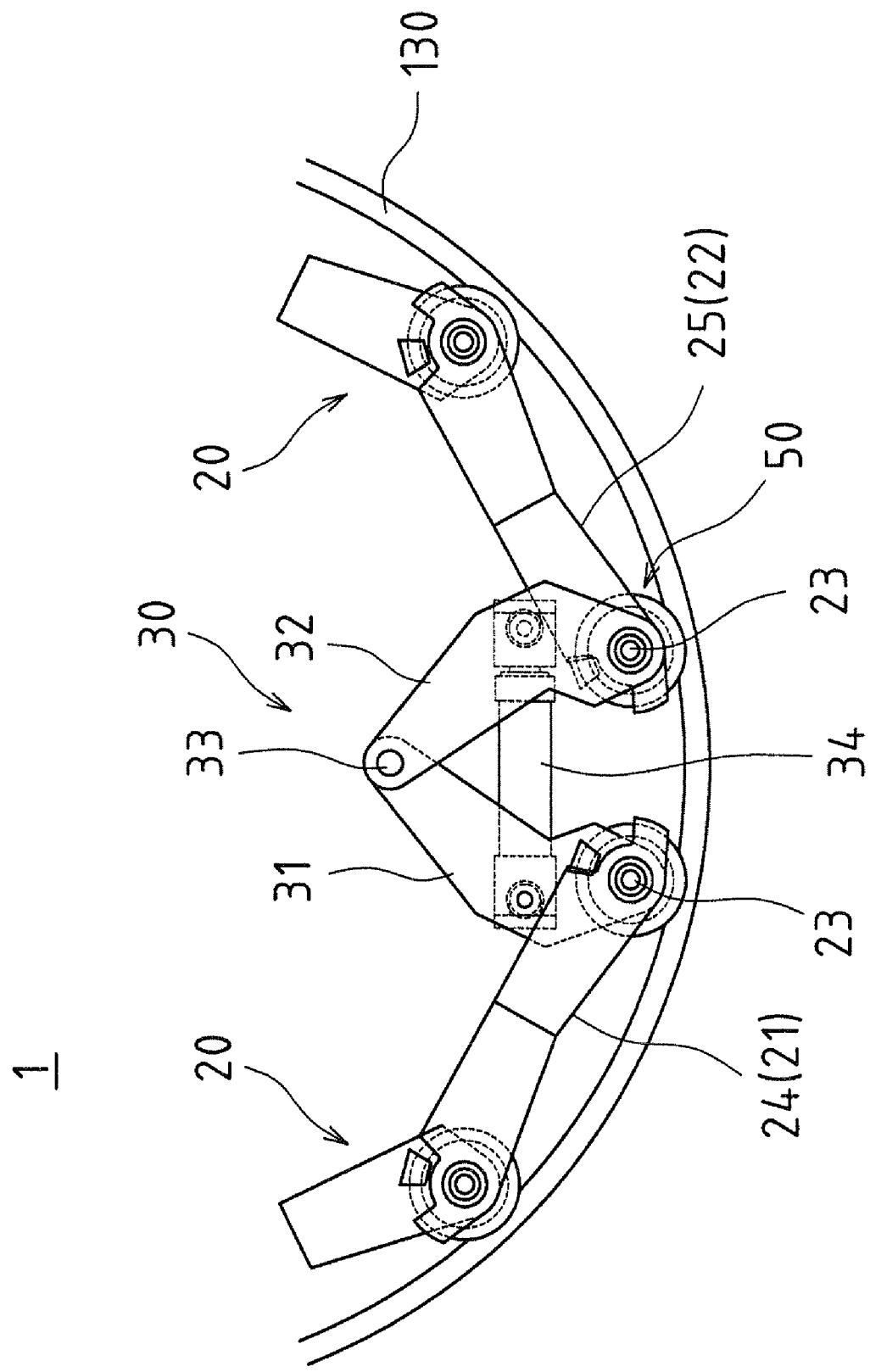
FIG. 9 is a front view for describing a bending action of the bending link in the first embodiment.

FIG. 8(a) is a front view for describing the bending link in the pipe producing apparatus of FIG. 5. FIG. 8(b) is a plan view thereof. FIG. 9 is a front view for describing a bending operation of the bending link.

As shown in these figures, the bending link 30 comprises a pair of first arms 31 and 31 (front and rear arms) and a pair of second arms 32 and 32 (front and rear arms). First end portions of the first front arm 31 and the second front arm 32 and first end portions of the first rear arm 31 and the second rear arm 32 are rotatably coupled with each other via a rotational axle 33. The coupling element 24 is rotatably coupled with second end portions of the first front and rear arms 31 and 31 via a coupling shaft 23. Also, the coupling element 25 is rotatably coupled with second end portions of the second front and rear arms 32 and 32 via a coupling shaft 23. A synchronizing rod 35 is coupled between the first front and rear arms 31 and 31 and between the second front and rear arms 32 and 32. The synchronizing rods 35 and 35 allow the first front and rear arms 31 and 31 and the second front and rear arms 32 and 32 to rotate in synchronization with each other.

Note that the coupling elements 24 and 25 are the same as the linking elements 21 and 22 included in the linking body 20. The front side plates 21a and 22a, the rear side plates 21b and 22b, and the coupling plates 21c and 22c are coupled into a square U shape. The second end portions of the first front and rear arms 31 and 31 of the bending link 30 are rotatably coupled with the second end portions of the front side plate 21a and the rear side plate 21b of the coupling element 24 via the coupling shaft 23. The second end portions of the second front and rear arms 32 and 32 of the bending link 30 are rotatably coupled with the second end portions of the front side plate 22a and the rear side plate 22b of the coupling element 25 via the coupling shaft 23.

Also, as described above, the rotation regulating piece 28 is provided at each of the second end portions of the first arms 31 and 31 of the bending link 30. On the other hand, at each of the second end portions of the front side plate 21a and the rear side plate 21b of the coupling element 24, the notch portion 27 corresponding to the rotation regulating piece 28 is formed, extending across a predetermined range on a set radius where the rotational axle of the coupling shaft 23 is a center. Thereby, a range within which the coupling element 24 is rotated with respect to the first arms 31 and 31 of the bending link 30 is regulated by the rotation regulating piece 28 abutting the notch portion 27. The rotation regulating piece 28 is provided in an inner surface of each of the second end portions of the second arms 32 and 32 of the bending link 30. On the other hand, at each of the second end portions of the front side plate 22a and the rear side plate 22b of the coupling element 25, the notch portion 27 corresponding to the rotation regulating piece 28 is formed, extending across a predetermined range on a set radius where the rotational axle of the coupling shaft 23 is a center, so that a range within which the coupling element 25 is rotated with respect to the second arms 32 and 32 of the bending link 30 is regulated by the rotation regulating piece 28 abutting the notch portion 27. Thereby, the inward bending of the bending link 30 and the coupling elements 24 and 25 is regulated.

The bending link 30, which is coupled with the shaping frame 2 while being bent inward, includes an actuator for changing the bent shape. In the illustrated example, a hydraulic cylinder 34 is used as an actuator.

As shown in FIGS. 8(a) and 8(b), the hydraulic cylinder 34 is provided between the pair of synchronizing rods 35 and 35 provided in the bending link 30. By expanding or contracting the hydraulic cylinder 34, a bent angle of the bending link 30 can be adjusted. Specifically, when the hydraulic cylinder 34 is expanded, an angle between the first arm 31 and the second arm 32 of the bending link 30 is increased, so that the diameter of the shaping frame 2 can be increased. Thereby, the tubular structure 130 formed can be pressed outward.

On the other hand, as shown in FIG. 9, when the hydraulic cylinder 34 is contracted, the angle between the first arm 31 and the second arm 32 of the bending link 30 is decreased, so that the diameter of the shaping frame 2 can be decreased. Thereby, the shaping frame 2 can be inserted into the tubular structure 130 or can be removed from the tubular structure 130.

Note that the actuator of the bending link 30 is not limited to that described above, and any means that can change, i.e., open and close, the bent shape of the bending link 30 may be used. In addition to the hydraulic cylinder 34, an air cylinder that is expanded and contracted by air pressure may be used. Alternatively, the bending link 30 may be opened and closed by a mechanical action of a ball screw or the like.

Figure 10:
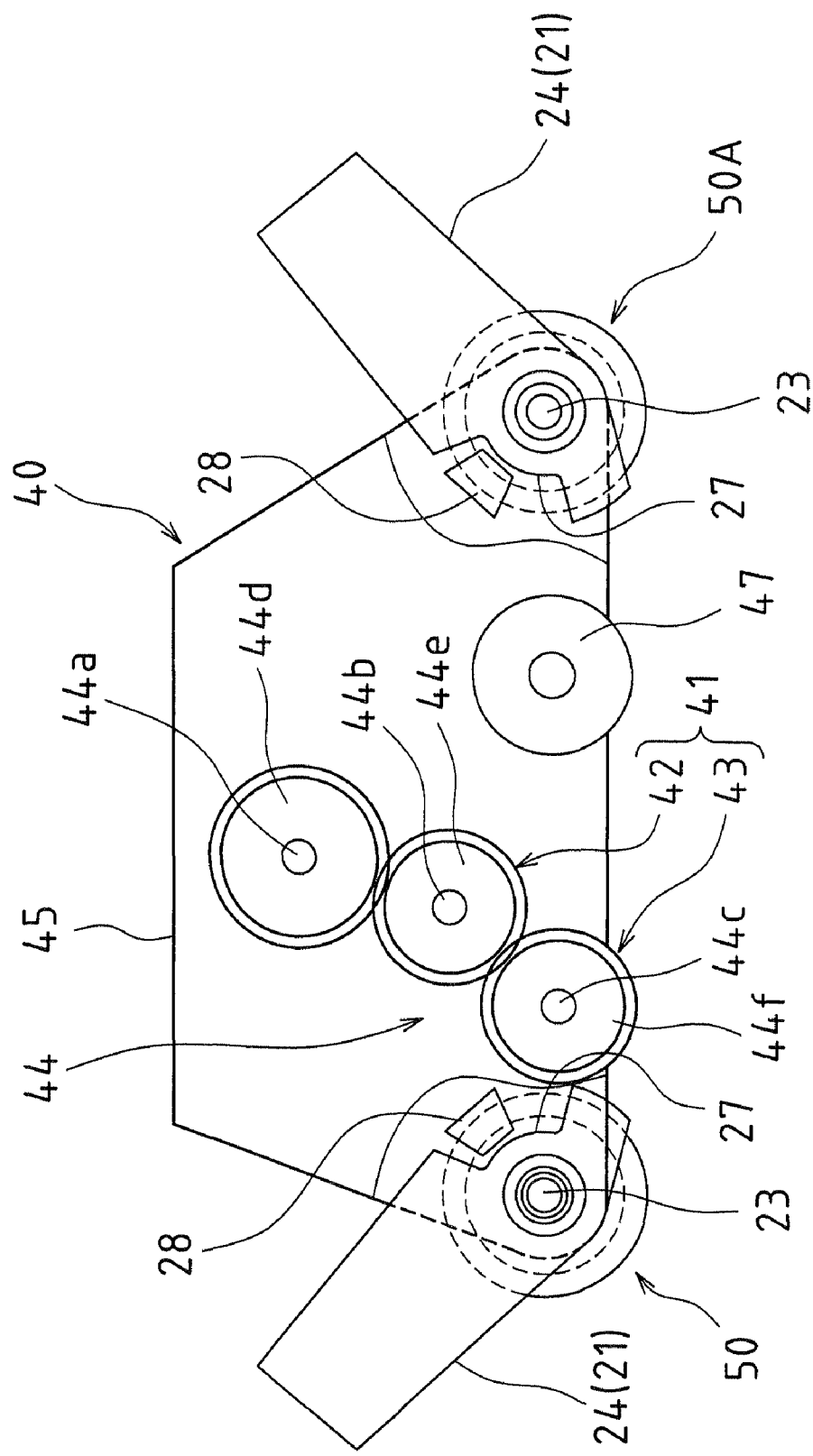
FIG. 10 is a schematic diagram for describing a gear mechanism of a drive unit in the pipe producing apparatus of FIG. 5.
Figure 11:
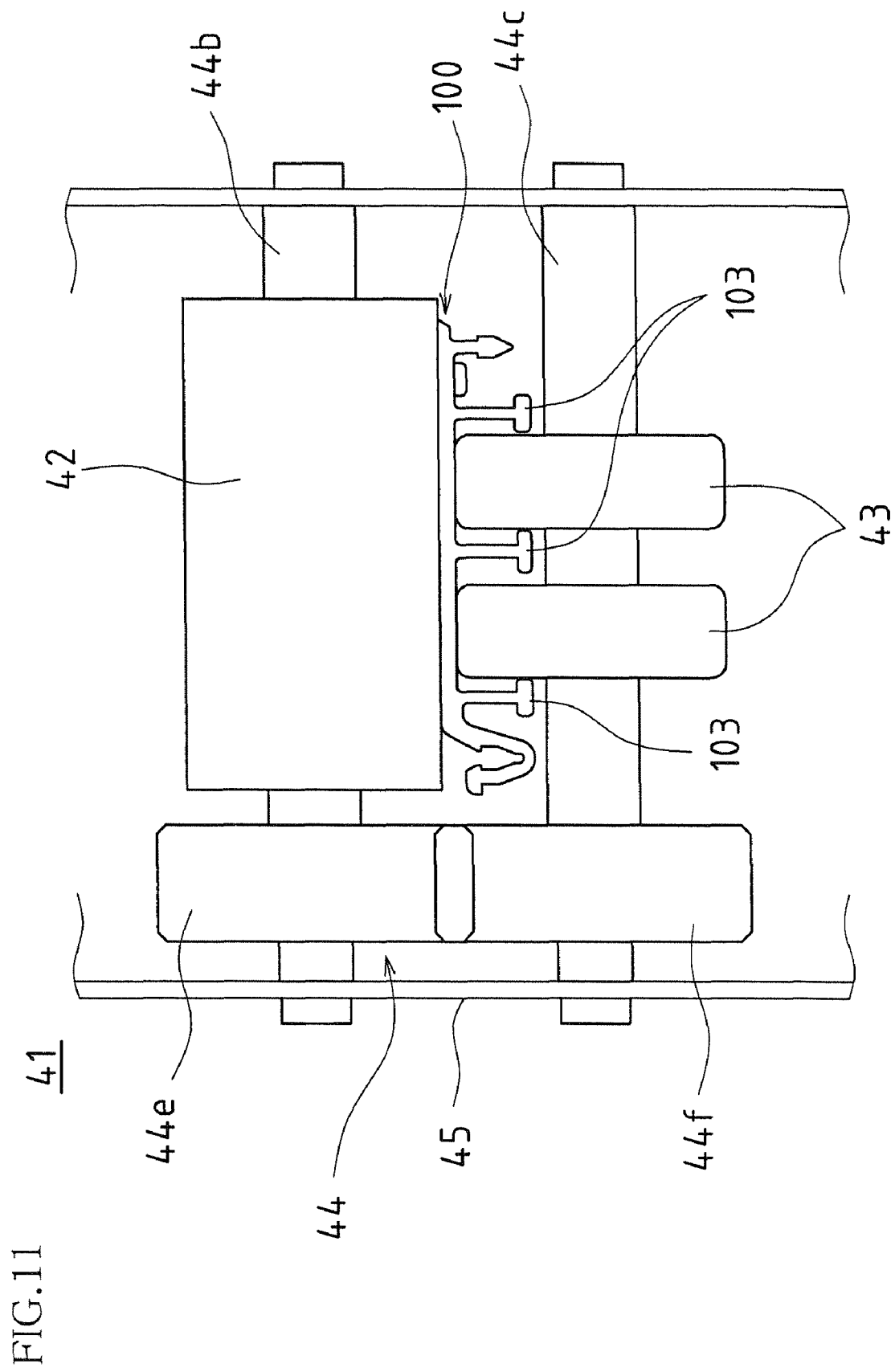
FIG. 11 is a schematic diagram showing a detailed structure of a pinch roller of the drive unit in the first embodiment.

FIG. 10 is a diagram schematically showing a gear mechanism of the drive unit in the pipe producing apparatus of FIG. 5. FIG. 11 is a diagram schematically showing a detailed structure of a pinch roller of the drive unit.

As shown in FIGS. 5, 6 and 10, the drive unit 40 comprises a box body 45, a hydraulic motor 46 provided in the box body 45, a pinch roller 41 including a set of an inner surface roller 42 and an outer surface roller 43, a gear mechanism 44 for synchronously rotating the inner surface roller 42 and the outer surface roller 43, and a guide roller 47 that is rotatably supported by the box body 45. The box body 45 is rigid and is formed in the shape of a box. The gear mechanism 44 is provided in the box body 45.

The gear mechanism 44 comprises a first rotational axle 44*a*, a second rotational axle 44*b* and a third rotational axle 44*c* that are rotatably supported by the box body 45 and extend in a front-to-rear direction, a first gear 44*d* that is fixed to the first rotational axle 44*a*, a second gear 44*e* that is fixed to the second rotational axle 44*b* and engages with the first gear 44*d*, and a third gear 44*f* that is fixed to the third rotational axle 44*c* and engages with the second gear 44*e*. The first rotational axle 44*a* is integrally coupled with the output axle of the hydraulic motor 46 provided in the box body 45. Thereby, the drive force of the hydraulic motor 46 is transferred to the first rotational axle 44*a* and then to the first gear 44*d*, to the second gear 44*e*, and to the third gear 44*f* in this order, so that the rotation of the third rotational axle 44*c* is appropriately slowed down.

Figure 12:
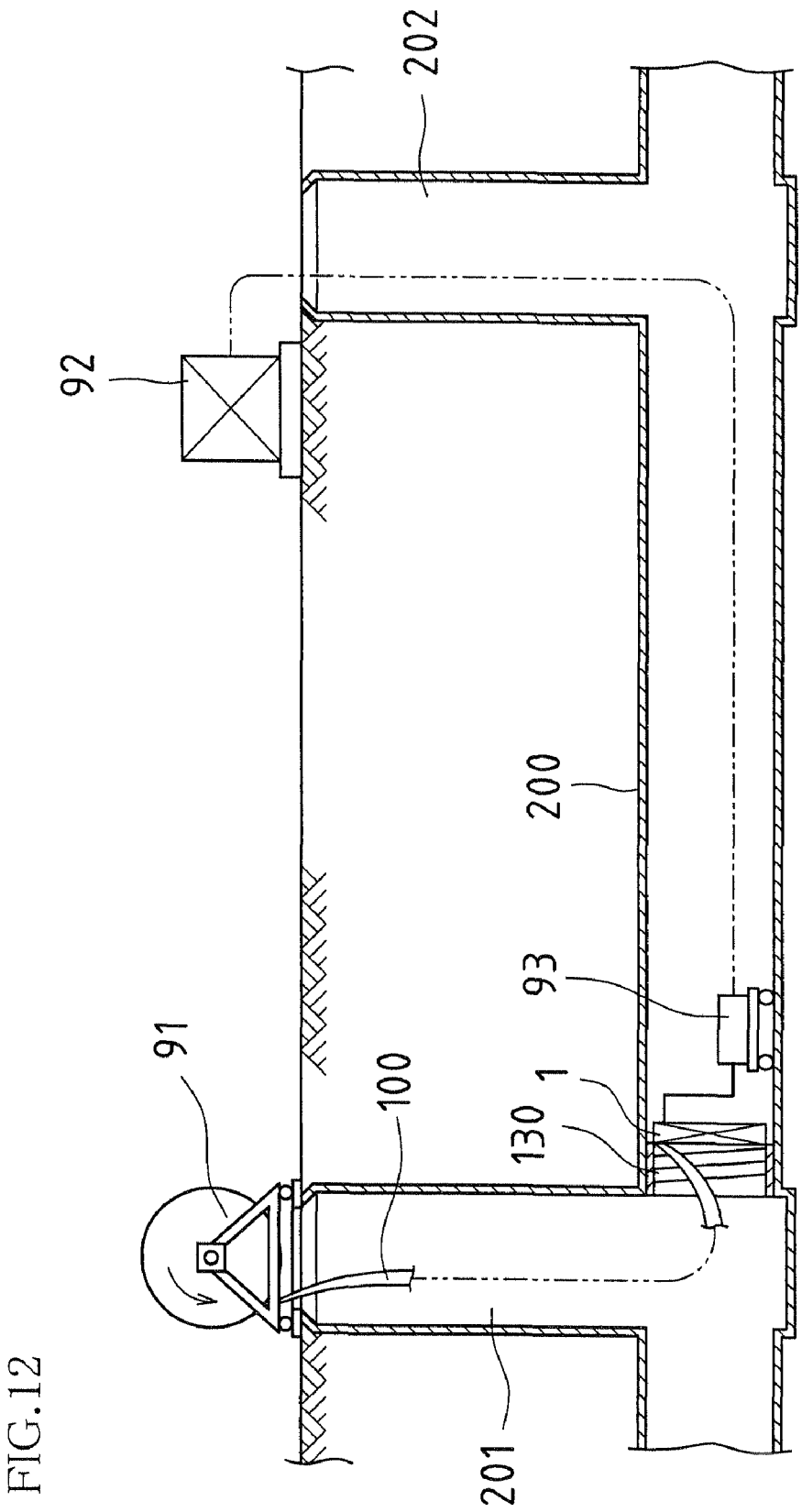
FIG. 12 is a step diagram for describing a rehabilitation method employing the pipe producing apparatus of the present invention.

Note that the hydraulic motor 46 is driven by pressure oil supplied via a hydraulic hose from a hydraulic unit 93 shown in FIG. 12. The hydraulic unit 93 is driven by electric power supplied from a generator 92. In this case, the hydraulic hose extending from the hydraulic unit 93 is connected via a rotational joint to the hydraulic motor 46, so that the pressure oil can be supplied without influence on the rotation of the pipe producing apparatus 1.

As shown in detail in FIG. 11, the pinch roller 41 comprises the inner surface roller 42 provided at the second rotational axle 44*b*, and the outer surface roller 43 provided at the third rotational axle 44*c* that rotates in a direction opposite to that of the second rotational axle 44*b*. The direction of the rotation is set so that the profile strip 100 pinched between the inner surface roller 42 and the outer surface roller 43 is sent out.

Here, the inner surface roller 42 is formed in the shape of a cylinder having a width that is substantially equal to the width of the profile strip 100. An outer peripheral surface of the inner surface roller 42 has an external diameter that is set so that the inner surface roller 42 is rotated while the outer peripheral surface contacts a flat inner surface of the profile strip 100 that will become an inner peripheral surface of the tubular structure 130.

A plurality of outer surface rollers 43 are provided between the ribs 103 and 103 of the profile strip 100 and have widths that allow the outer surface rollers 43 to be inserted between the adjacent ribs 103 and 103 of the profile strip 100. Each outer surface roller 43 has an external diameter that is set so that the outer peripheral surface thereof and the inner surface roller 42 have a gap corresponding to the thickness of the profile strip 100. Therefore, the outer surface rollers 43 are rotated between the adjacent ribs 103 and 103 of the profile strip 100 while the outer peripheral surfaces thereof contact the outer surface of the profile strip 100 that will become an outer peripheral surface of the tubular structure 130.

Thereby, the profile strip 100 newly fed can be pinched and sent out toward the previous helical winding of the profile strip 100 by the inner surface roller 42 and the outer surface roller 43 being rotated in opposite directions via the hydraulic motor 46 and the gear mechanism 44.

Note that the outer peripheral surface of the outer surface roller 43 is knurled so that the profile strip 100 can be sent out without slippery.

The guide roller 47 is supported by a front portion of the box body 45 in a direction in which the profile strip 100 is sent out by the pinch roller 41. The guide roller 47 guides the profile strip 100 fed in from the pinch roller 41 to the previous winding of the profile strip 100.

Here, the coupling element 24 is identical to the linking element 21 included in the linking body 20 as described above. The second end portions of the front side plate 21*a* and the rear side plate 21*b* are rotatably coupled with the opposite ends of the drive unit 40 via the coupling shafts 23.

Further, the rotation regulating piece 28 is provided at each of the second end portions of the front and rear surfaces of the box body 45. On the other hand, at each of the second end portions of the front side plate 21*a* and the rear side plate 21*b* of the coupling element 24, the notch portion 27 corresponding to the rotation regulating piece 28 is formed, extending across a predetermined range on a set radius where the rotational axle of the coupling shaft 23 is a center, so that a range within which the coupling element 24 is rotated with respect to the box body 45 is regulated by the rotation regulating piece 28 abutting the notch portion 27. Thereby, the inward bending of the box body 45 and the coupling element 24 is regulated.

Figure 7:
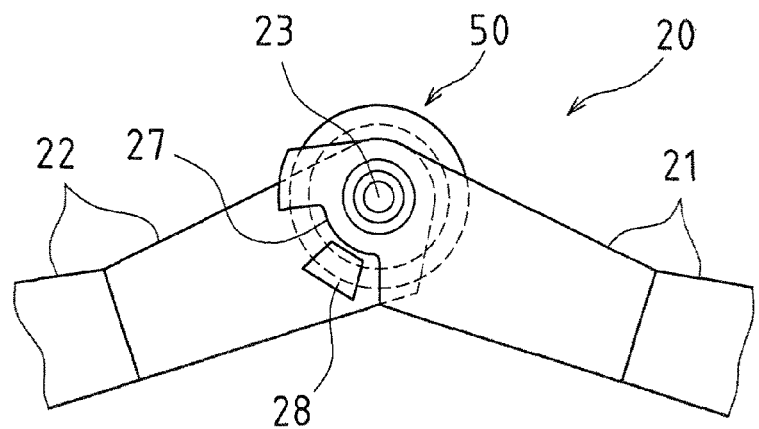
FIG. 7(a) is a front view for describing a linking body in the pipe producing apparatus of FIG. 5.
FIG. 7(b) is a plan view thereof.
Figure 7:
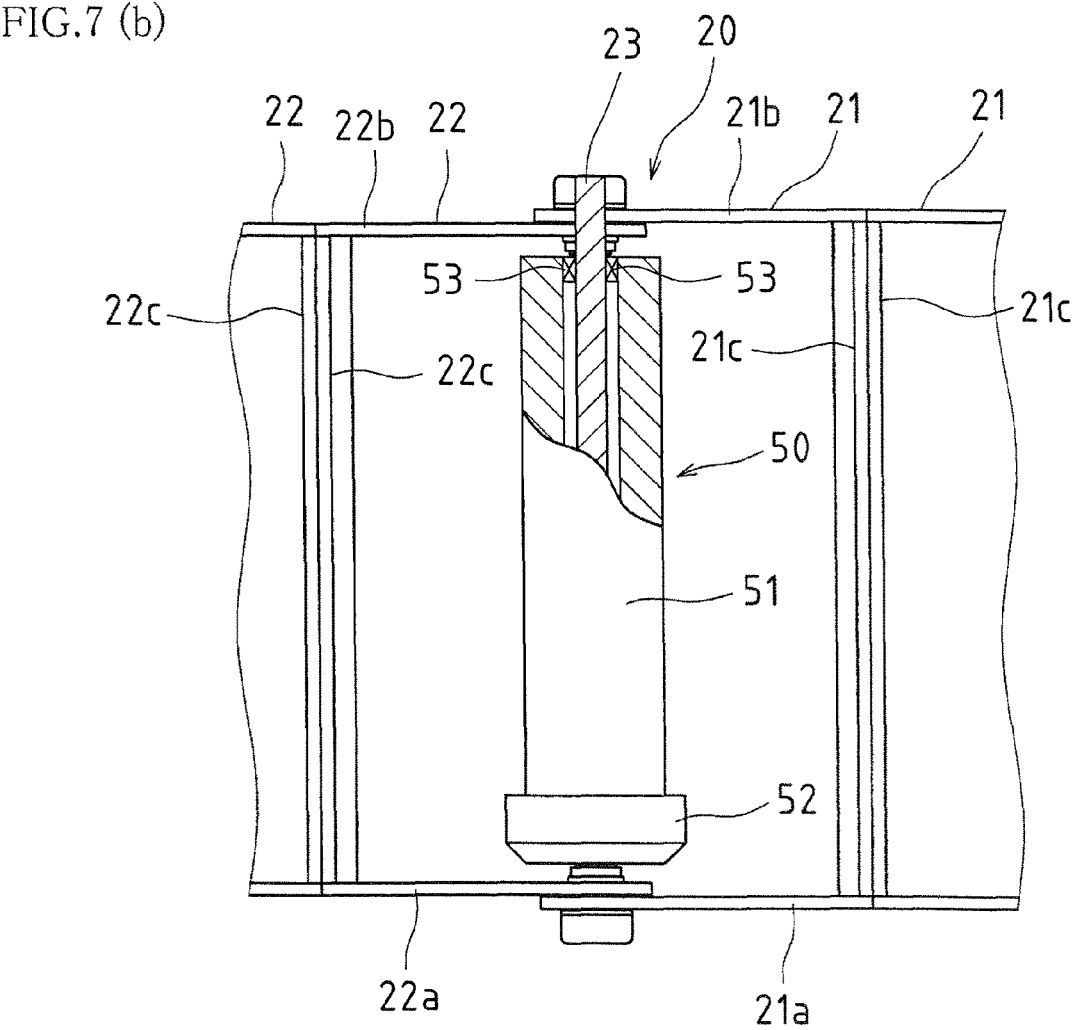

As shown in FIGS. 5 to 10, the guide rollers 50 are rotatably supported by the coupling shafts 23 of the shaping frame 2, i.e., the coupling shafts 23 of the linking bodies 20, the coupling shafts 23 of the bending link 30 and the coupling elements 24 and 25, and the coupling shafts 23 of the drive unit 40 and the coupling elements 24. Here, the guide roller 50 is a guide roller that comprises a roller body 51 and a collar portion 52 having a diameter larger than that of the roller body 51. The guide roller 50 is also made of a synthetic resin or a metal, and as shown in FIG. 7(*a*), is supported by a bearing 53 in a manner that allows the guide roller 50 to free rotate about the coupling shaft 23, and contacts the inner surface of the profile strip 100. Alternatively, the guide roller 50 may be either a smooth guide roller having a cylindrical shape or a guide roller having a collar 52 for guiding one edge portion of the profile strip 100. In all the examples, a guide roller with a collar is employed.

The guide roller 50 is also arranged perpendicular to the profile strip 100 for constructing the tubular structure 130, so as to cause the pipe producing apparatus 1 to move forward while helically winding the profile strip 100 in the existing pipe 200 to produce the tubular structure 130. The method for causing the guide roller 50 to be perpendicular to the profile strip 100 for constructing the tubular structure 130 is not particularly limited. For example, in the shaping frame 2, one of the linking bodies 20 or the coupling elements 24 may be moved in the pipe axial direction with respect to the other linking body 20 or coupling element 24 and may then be fixed to at least one of a coupling portion of adjacent linking bodies 20 and 20, a coupling portion of an adjacent linking body 20 and coupling element 24, and a coupling portion of a pair of adjacent coupling elements 24 and 24.

Next, a specific exemplary rehabilitation method using the pipe producing apparatus 1 will be described with reference to FIGS. 12 and 13.

Figure 13:
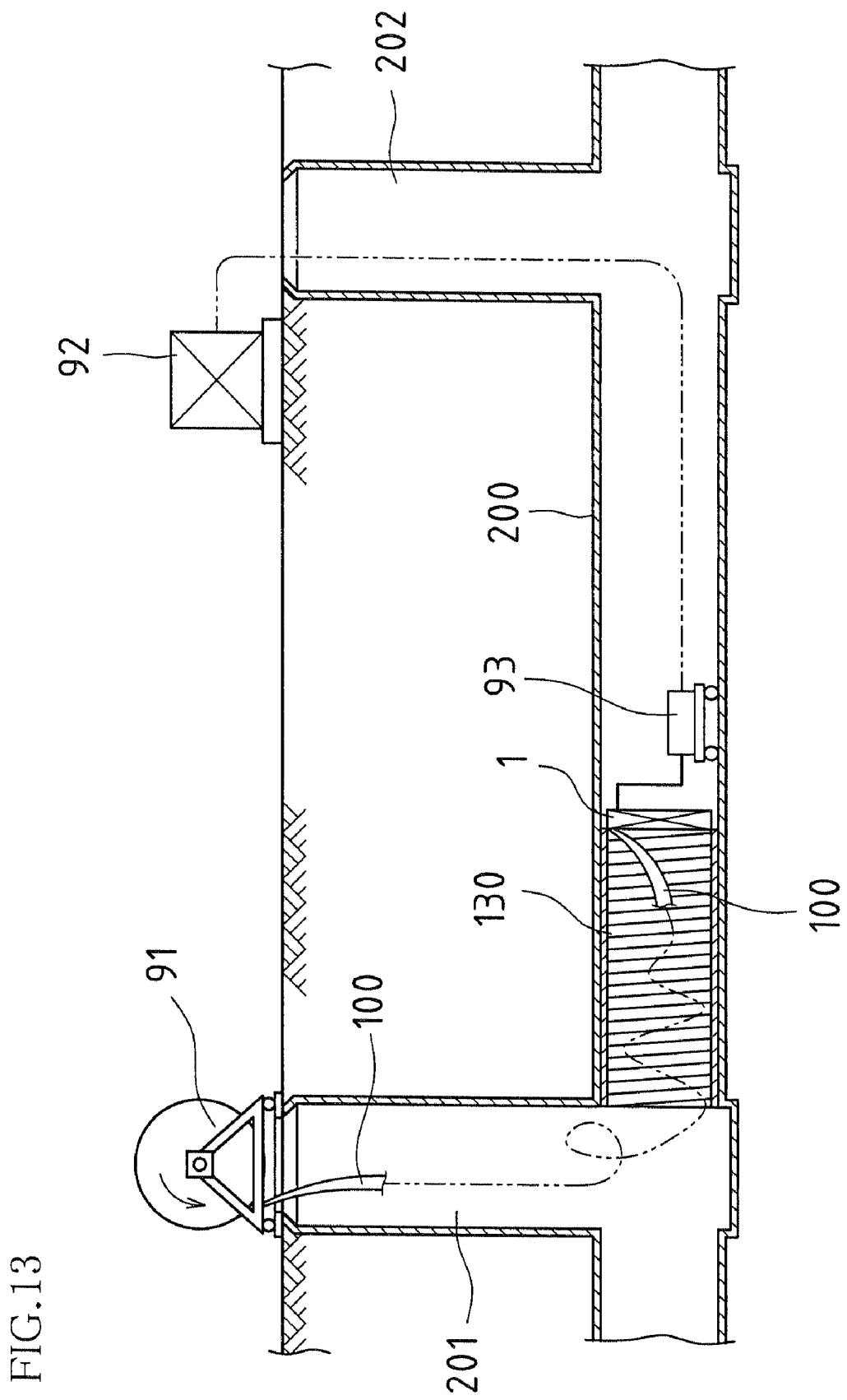
FIG. 13 is a step diagram for describing the rehabilitation method employing the pipe producing apparatus of the present invention.

FIGS. 12 and 13 are diagrams for describing the rehabilitation method using the pipe producing apparatus of the present invention.

The existing pipe 200 is provided with manholes 201 and 202 that are spaced by a predetermined distance. In this example, the tubular structure 130 is produced in the existing pipe 200 using the upstream manhole 201 and the downstream manhole 202 in a region to be treated (rehabilitation region). The tubular structure 130 is produced from the upstream to the downstream of the existing pipe 200.

A drum 91 (with a rotation pedestal) into which the profile strip 100 having the structure of FIG. 1 has been rolled, the pipe producing apparatus 1, the hydraulic unit 93, the generator 92 and the like are used to produce the tubular structure 130. Of them, the drum 91 is provided on the ground at the upstream manhole 201, and the generator 92 is provided on the ground at the downstream manhole 202. The pipe producing apparatus 1 and the hydraulic unit 93 are introduced and installed through the upstream manhole 201 into an upstream end portion of the existing pipe 200 to be rehabilitated. In this case, the junction of the coupling portions of adjacent linking bodies 20 and 20 of the shaping frame 2 of the pipe producing apparatus 1 is released, so that the shaping frame 2 is carried as a single line of the linking bodies 20, the bending link 30, and the drive unit 40.

Note that the length of a circumference of the shaping frame 2 (the number of linking bodies 20) of the pipe producing apparatus 1 is previously adjusted, depending on a pipe size of the tubular structure 130 to be produced.

Also, the helical pitch of the pipe producing apparatus 1 is adjusted, depending on the internal diameter of the existing pipe 200 to be rehabilitated and the width of the profile strip 100 to be used.

Next, as shown in FIG. 12, the profile strip 100 is pulled out of the drum 91 provided on the ground and is then introduced into the upstream manhole 201. After a tip portion of the profile strip 100 is passed through the pinch roller 41 of the drive unit 40, the tip portion of the profile strip 100 is wound around an outer surface of the guide roller 47, and is then inserted and pinched between the guide roller 50 and the inner peripheral surface of the existing pipe 200. In this situation, the whole pipe producing apparatus 1 is manually rotated to wind the profile strip 100 several turns (about 1 to 3), so that several windings of tubular structure 130 are prepared for initiation of pipe production (see FIG. 6).

Next, by expanding the hydraulic cylinder 34, the diameter of the shaping frame 2 is expanded, so that the previous windings of the tubular structure 130 for initiation are pressed outward by the guide rollers 50, and therefore, the tubular structure 130 is held with tension being applied thereto.

After the several windings of the tubular structure 130 for initiation of pipe production are prepared to complete the installation of the pipe producing apparatus 1, the drive unit 40 of the pipe producing apparatus 1 is then driven (the hydraulic motor 46 is driven). Thereby, as shown in FIGS. 5 and 6, the pinch roller 41 of the drive unit 40 is rotated, so that the profile strip 100 is pinched and forcedly sent out by the inner surface roller 42 and the outer surface roller 43 of the pinch roller 41, and is guided by the guide roller 47 so that the profile strip 100 is arranged adjacent to the several previous windings of the tubular structure 130. By reactive force occurring when the profile strip 100 is sent out by the pinch roller 41, the pipe producing apparatus 1 orbits (revolves) along the inner peripheral surface of the previous winding of the tubular structure 130 in a direction opposite to a direction in which the profile strip 100 is sent out.

Here, in the drive unit 40, the profile strip 100 is newly fed from the pinch roller 41. When the newly fed profile strip 100 reaches the first guide roller 50A, the joint convex portion 101 of the new winding of the profile strip 100 is pressed, from the inside, against the joint concave portion 102 of the previous winding of the tubular structure 130 to which tension is applied, so that the joint convex portion 101 of the new winding of the profile strip 100 fits in the joint concave portion 102 of the tubular structure 130 (see FIG. 2(b)).

Further, when the guide roller 50 rotates about one turn around the inner circumference of the previous winding of the tubular structure 130 by the orbiting (revolution) of the pipe producing apparatus 1, the joint convex portion 101 of the newly fed profile strip 100 is joined with the joint concave portion 102 of the profile strip 100 of the tubular structure 130 by the guide roller 50A, so that the tubular structure 130 is progressively produced.

Figure 37:
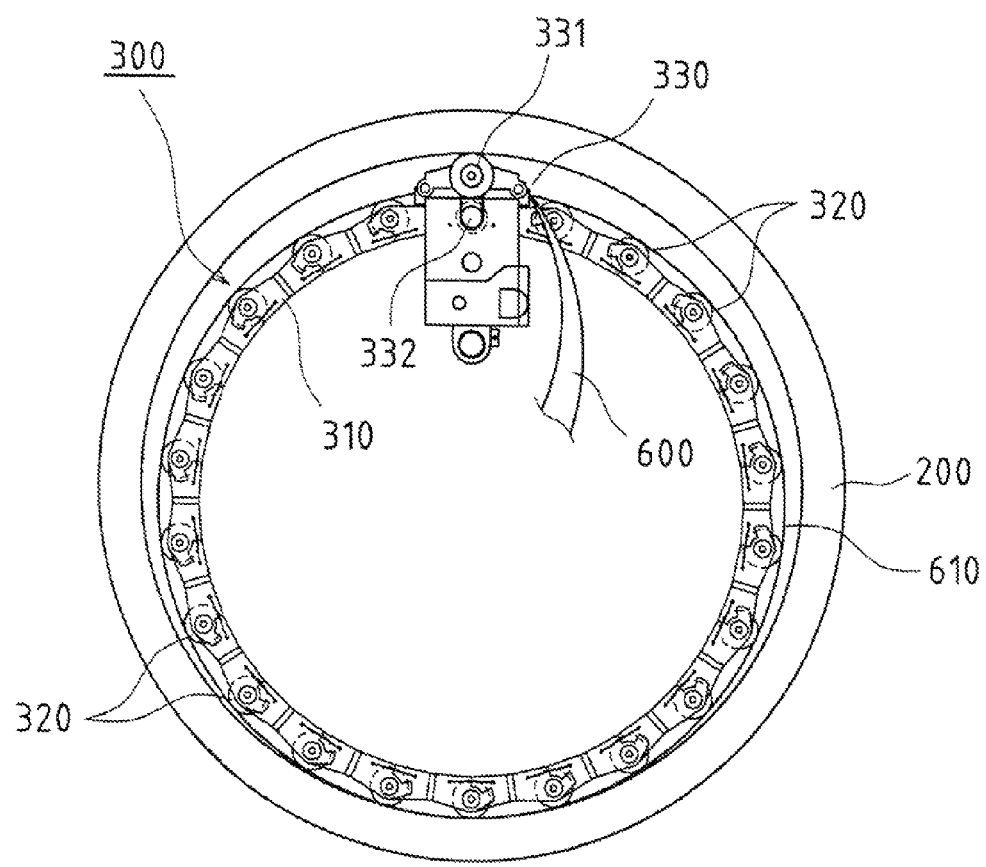
FIG. 37 is a front view showing an exemplary conventional pipe producing apparatus.
Figure 38:
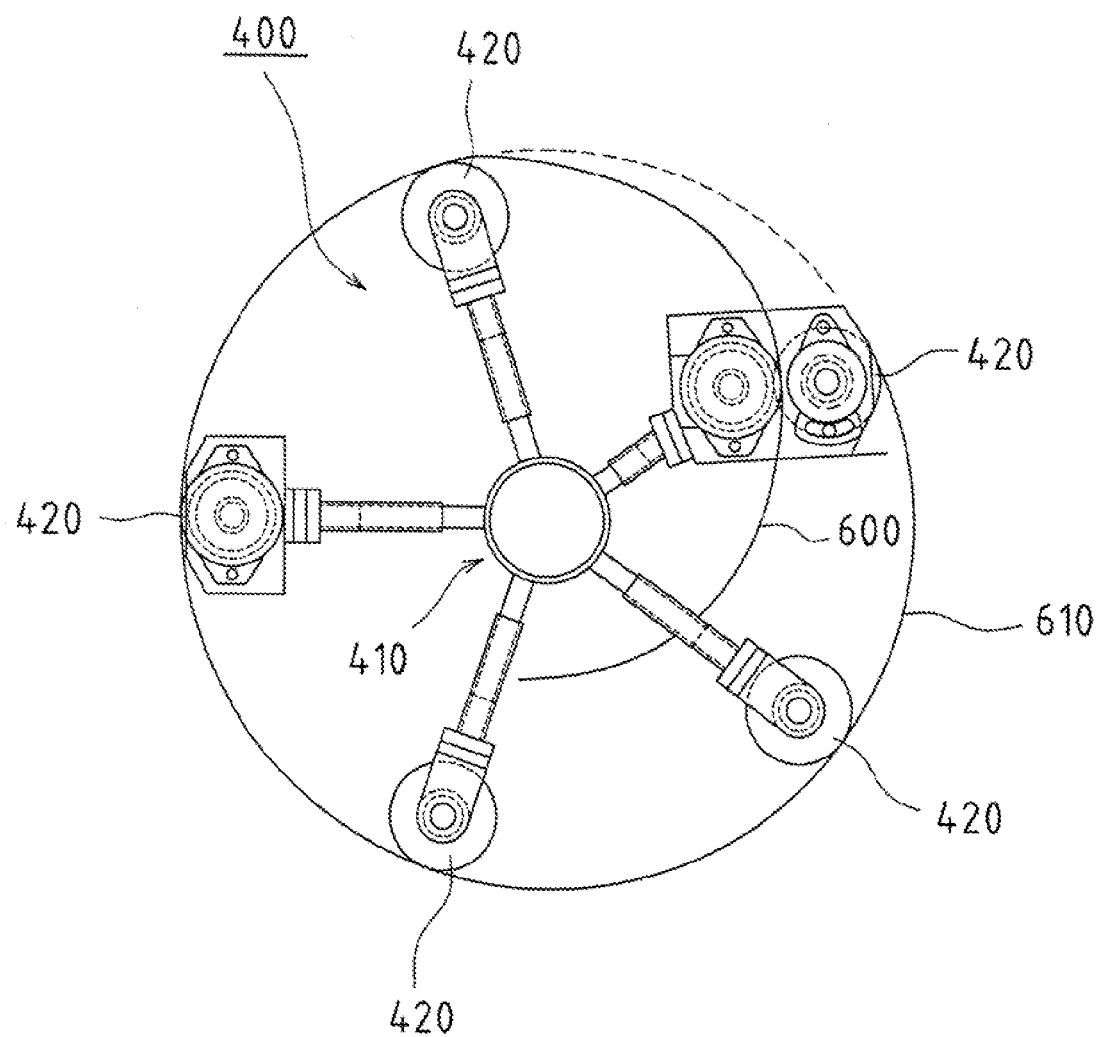
FIG. 38 is a schematic diagram showing another exemplary conventional pipe producing apparatus.

By such a pipe producing process, the pipe producing apparatus 1 can produce the tubular structure 130 having any external diameter. In addition, the pipe producing apparatus 1 does not have an outer roller outside the shaping frame 2, as is different from the conventional pipe producing apparatus 300 of FIG. 37, so that the tubular structure 130 can be produced on the inner peripheral surface of the existing pipe 200 without a gap.

Figure 39:
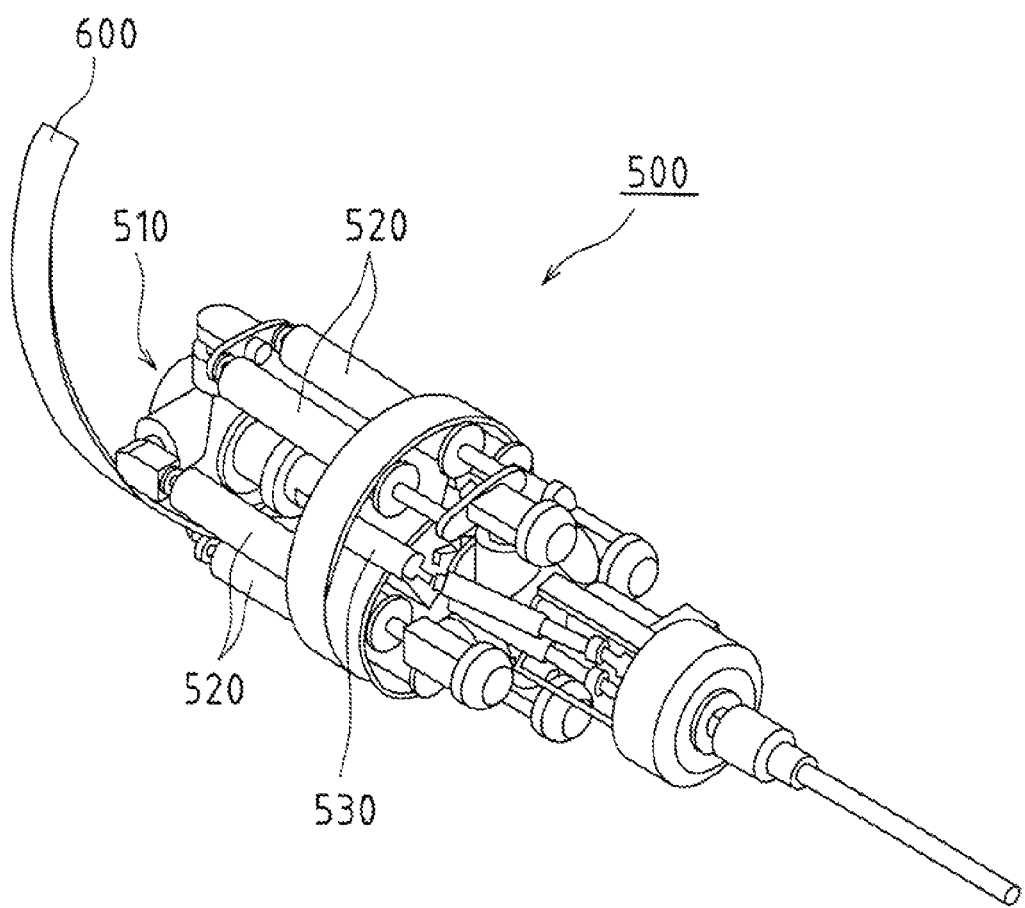
FIG. 39 is a perspective view showing still another exemplary conventional pipe producing apparatus.

Also, as is different from the conventional pipe producing apparatus 500 of FIG. 39, the pipe producing apparatus 1 has substantially an annular structure. Therefore, during pipe production, the pipe producing apparatus 1 does not clog the existing pipe 200, so that the tubular structure 130 can be produced in the existing pipe 200 even when water is passed through the existing pipe 200. In addition, since the structure of the pipe producing apparatus 1 is simple, waste, paper or other junk that flows along with water in the existing pipe 200 substantially does not get stuck in the movable portions (e.g., the drive unit 40, etc.) of the pipe producing apparatus 1. Even if an object gets stuck in any movable portion of the pipe producing apparatus 1, the object can be easily removed.

When the production of the tubular structure 130 is completed over the whole length of a region to be treated (rehabilitation region) of the existing pipe 200, the profile strip 100 at a pipe end portion of the tubular structure 130 is cut. Next, the pipe producing apparatus 1 is disassembled, and the apparatuses, such as the pipe producing apparatus 1, the hydraulic unit 93 and the like, are pull out.

Specifically, the shaping frame 2 of the pipe producing apparatus 1 is formed by coupling the linking bodies 20, the bending link 30, and the drive unit 40 with each other. Therefore, by releasing the junction of the coupling portion of adjacent linking bodies 20, the shaping frame 2 can be changed to a single line of the linking bodies 20, the bending link 30, and the drive unit 40, so that the pipe producing apparatus 1 can be easily disassembled and assembled. Therefore, the maintenance of the pipe producing apparatus 1 can be easily performed. The pipe producing apparatus 1 can also be easily carried into or out of the existing pipe 200.

Next, a variation of the pipe producing apparatus 1 will be described.

Figure 14:
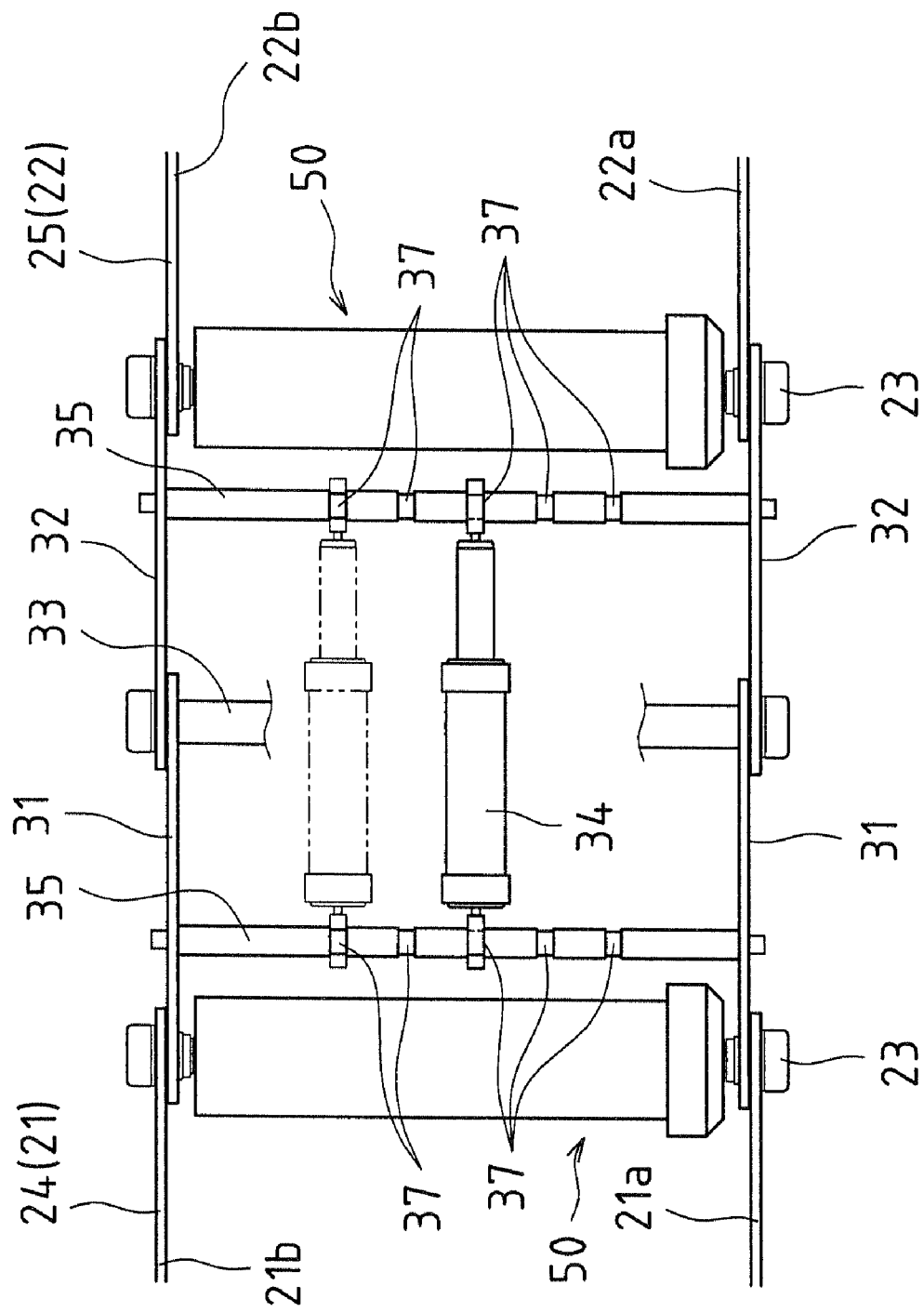
FIG. 14 is a side view showing another exemplary bending link in the pipe producing apparatus of the present invention.

FIG. 14 is a side view showing another form of the hydraulic cylinder 34 of the bending link 30 in the pipe producing apparatus 1.

In the illustrated form, the hydraulic cylinder 34 can be shifted in parallel to the pipe axial direction. Specifically, a plurality of cylinder shift grooves 37 having a diameter smaller than that of the synchronizing rods 35 and 35 are provided at predetermined positions of the synchronizing rods 35 and 35 of the bending link 30 (five for each of the synchronizing rods 35 and 35). The hydraulic cylinder 34 may be provided in a pair of cylinder shift grooves 37 selected from them, i.e., the hydraulic cylinder 34 can be shifted in parallel to the pipe axial direction.

Thereby, when the hydraulic cylinder 34 is shifted to a front portion in an advancing direction of the pipe producing apparatus 1 and is then expanded, the shaping frame 2 is expanded at the front portion more than at a rear portion. Conversely, when the hydraulic cylinder 34 is shifted to a rear portion and is then expanded, the shaping frame 2 is expanded at the rear portion more than at a front portion. Therefore, even if the internal diameter of the existing pipe 200 gradually increases or decreases in the pipe axial direction, the tubular structure 130 can be produced, depending on a change in the internal diameter of the existing pipe 200, by expanding the diameter of the shaping frame 2 at a front portion more or less than at a rear portion by the hydraulic cylinder 34.

Figure 15:
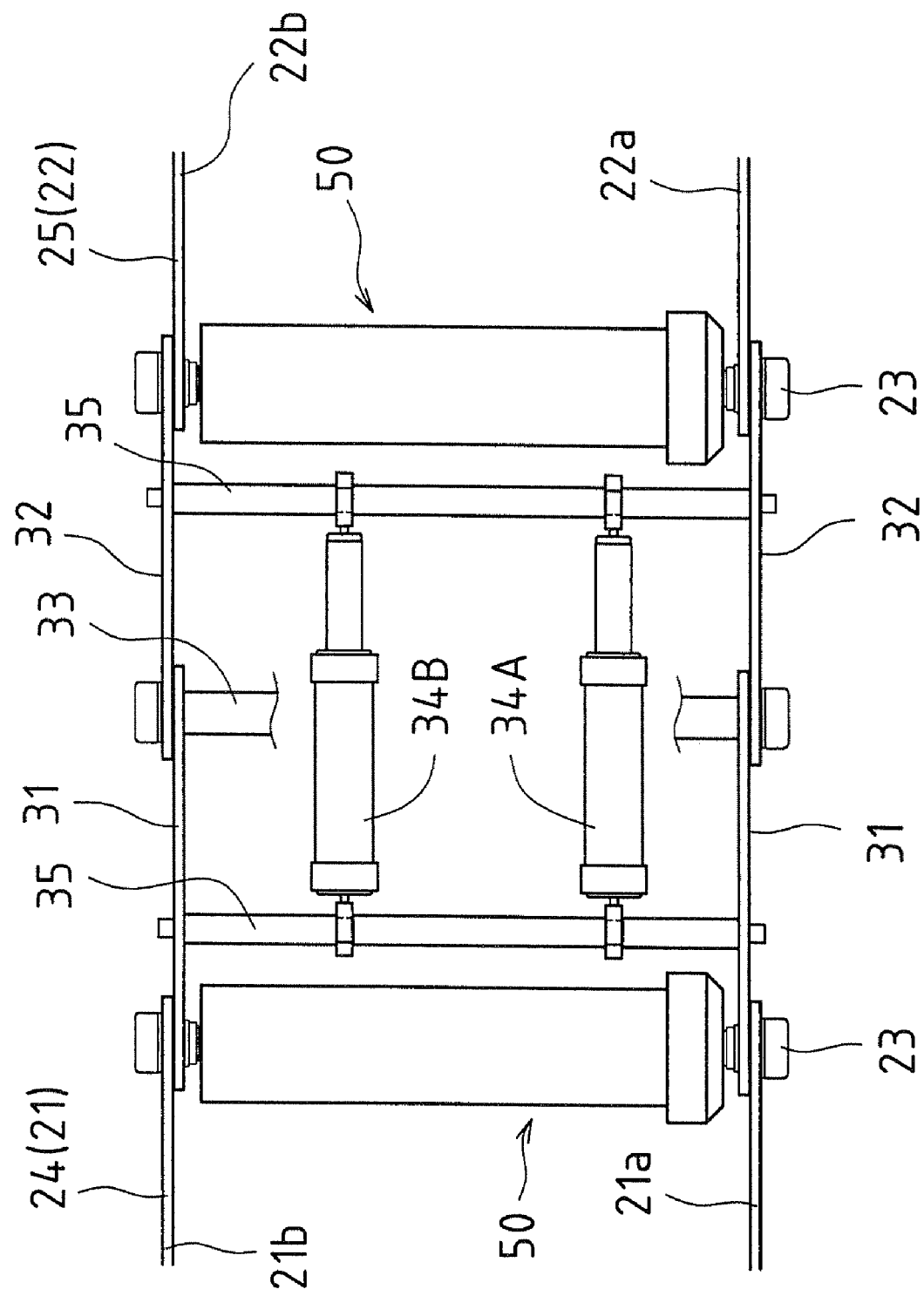
FIG. 15 is a side view showing still another exemplary bending link in the pipe producing apparatus of the present invention.

FIG. 15 is a side view showing still another example the hydraulic cylinder 34 of the bending link 30.

In this example, two hydraulic cylinders 34 are provided and separated by a space in the pipe axial direction. Specifically, hydraulic cylinders 34A and 34B are provided between the synchronizing rods 35 and 35 of the bending link 30 and are separated by a space in the pipe axial direction.

Thereby, the hydraulic cylinders 34 are provided at a front portion and at a rear portion in the advancing direction of the pipe producing apparatus 1. Therefore, when the front hydraulic cylinder 34A is expanded, the shaping frame 2 is expanded at a front portion more than at a rear portion. Conversely, when the rear hydraulic cylinder 34B is expanded, the shaping frame 2 is expanded at a rear portion more than at a front portion. Therefore, even if the internal diameter of the existing pipe 200 gradually increases or decreases in the pipe axial direction, the tubular structure 130 can be produced, depending on a change in the internal diameter of the existing pipe 200, by expanding the shaping frame 2 at a front portion more or less than a rear portion by expanding the selected one of the hydraulic cylinders 34A and 34B.

Figure 16:
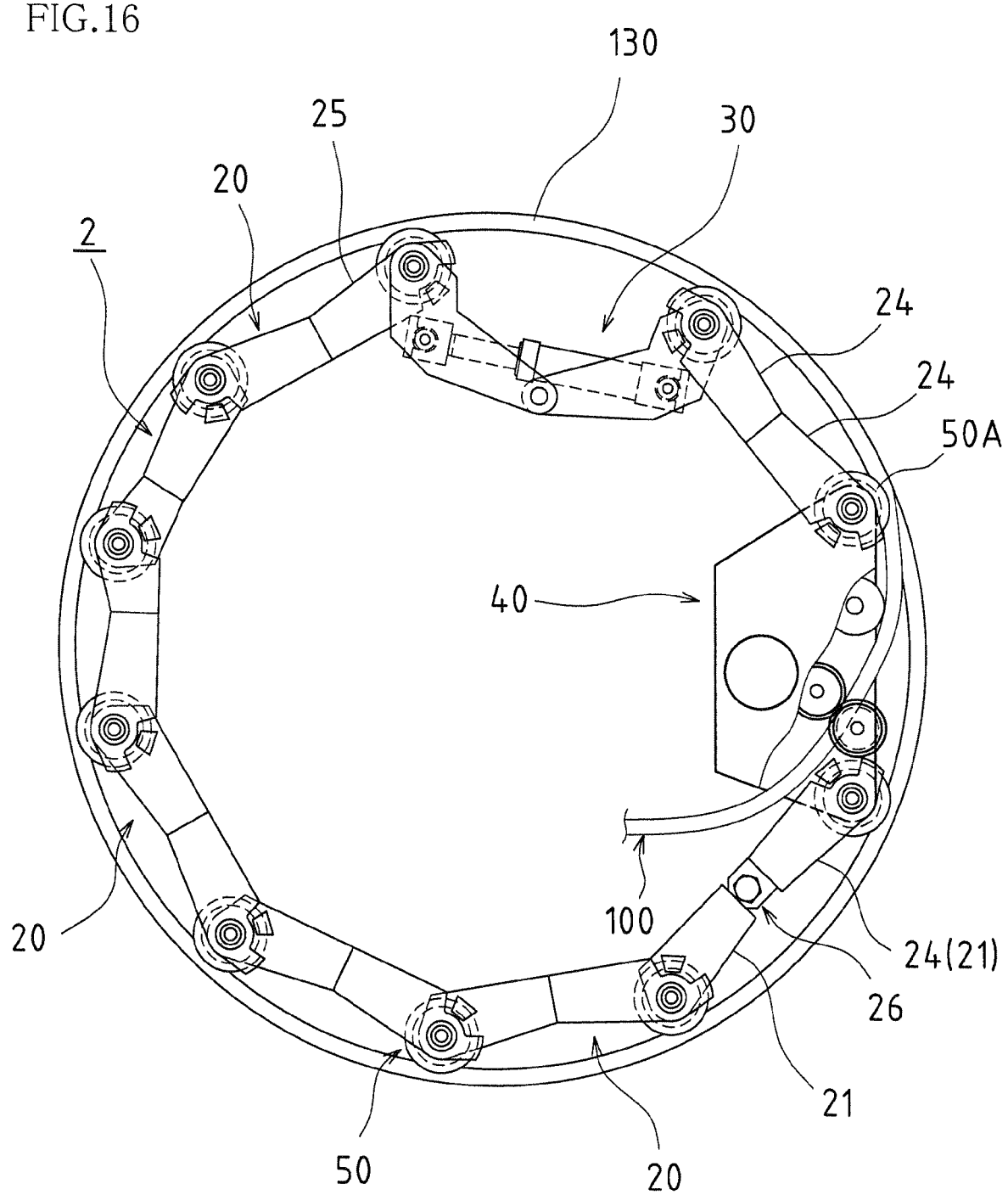
FIG. 16 is a front view showing a variation of the pipe producing apparatus of the first embodiment.
Figure 17:
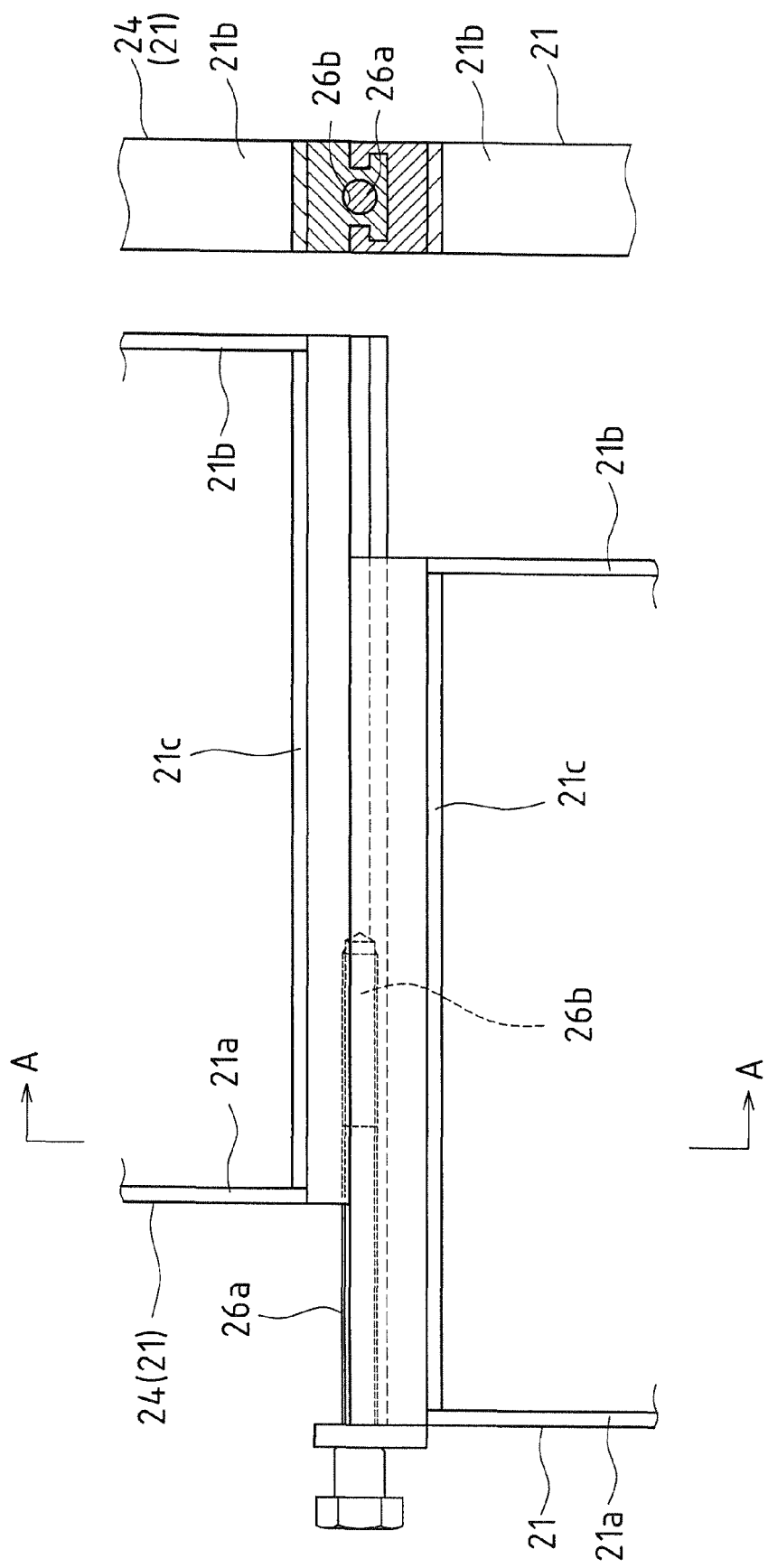
FIG. 17(a) is a plan view for describing an adjusting means of the pipe producing apparatus of FIG. 16.
FIG. 17(b) is a cross-sectional view taken along line A-A of FIG. 17(a).

FIG. 16 is a front view showing another embodiment of the pipe producing apparatus of the present invention. FIG. 17(a) is a plan view for describing means for adjusting the pipe producing apparatus of FIG. 16. FIG. 17(b) is a cross-sectional view taken along line A-A of FIG. 17(a).

In this example, in order to cause the guide roller 50 to be perpendicular to the profile strip 100 constituting the tubular structure 130, an adjusting means 26 for moving one linking body 20 or coupling element 24 or 25 with respect to the other linking body 20 or coupling element 24 or 25 in the pipe axial direction is provided at least one coupling portion of the shaping frame 2. In other words, the adjusting means 26 is provided between a linking body 20 and a linking body 20 adjacent to each other, between a linking body 20 and a coupling element 24 or 25 adjacent to each other, or between a coupling element 24 or 25 and a coupling element 24 or 25 adjacent to each other.

As shown in detail in FIGS. 17(a) and 17(b), the coupling plate 21c of the linking body 20 and the coupling plate 21c of the coupling element 24 interlock with each other in a manner that allows them to slide in the pipe axial direction. The adjusting means 26 includes an elongated bolt 26a that is rotatably supported at an end portion of the coupling plate 21c of the linking body 20, and an elongated nut 26b that is provided at an end portion of the coupling plate 21c of the coupling element 24 and that is threadably engaged with the bolt 26a.

The linking body 20 can be moved in the pipe axial direction with respect to the coupling element 24 by rotating the bolt 26a of the adjusting means 26, so that the helical pitch of the profile strip 100 of the produced tubular structure 130 can be easily changed. Therefore, even if the helical pitch of the profile strip 100 of the tubular structure 130 varies depending on the internal diameter of the existing pipe 200 and the width of the profile strip 100, the adjusting means 26 can adjust the various helical pitches.

Figure 18:
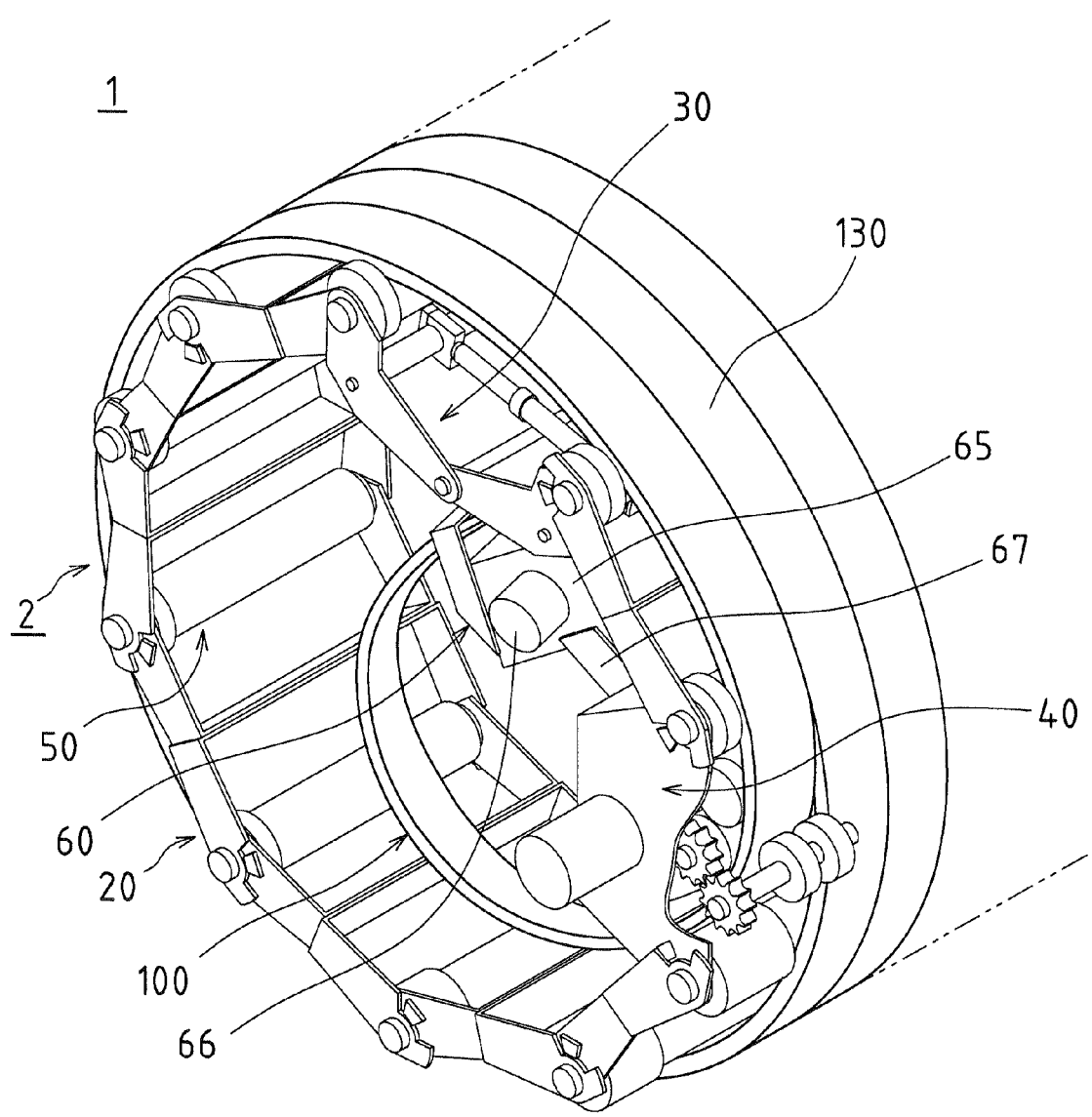
FIG. 18 is a perspective view showing another variation of the pipe producing apparatus of the first embodiment.
Figure 19:
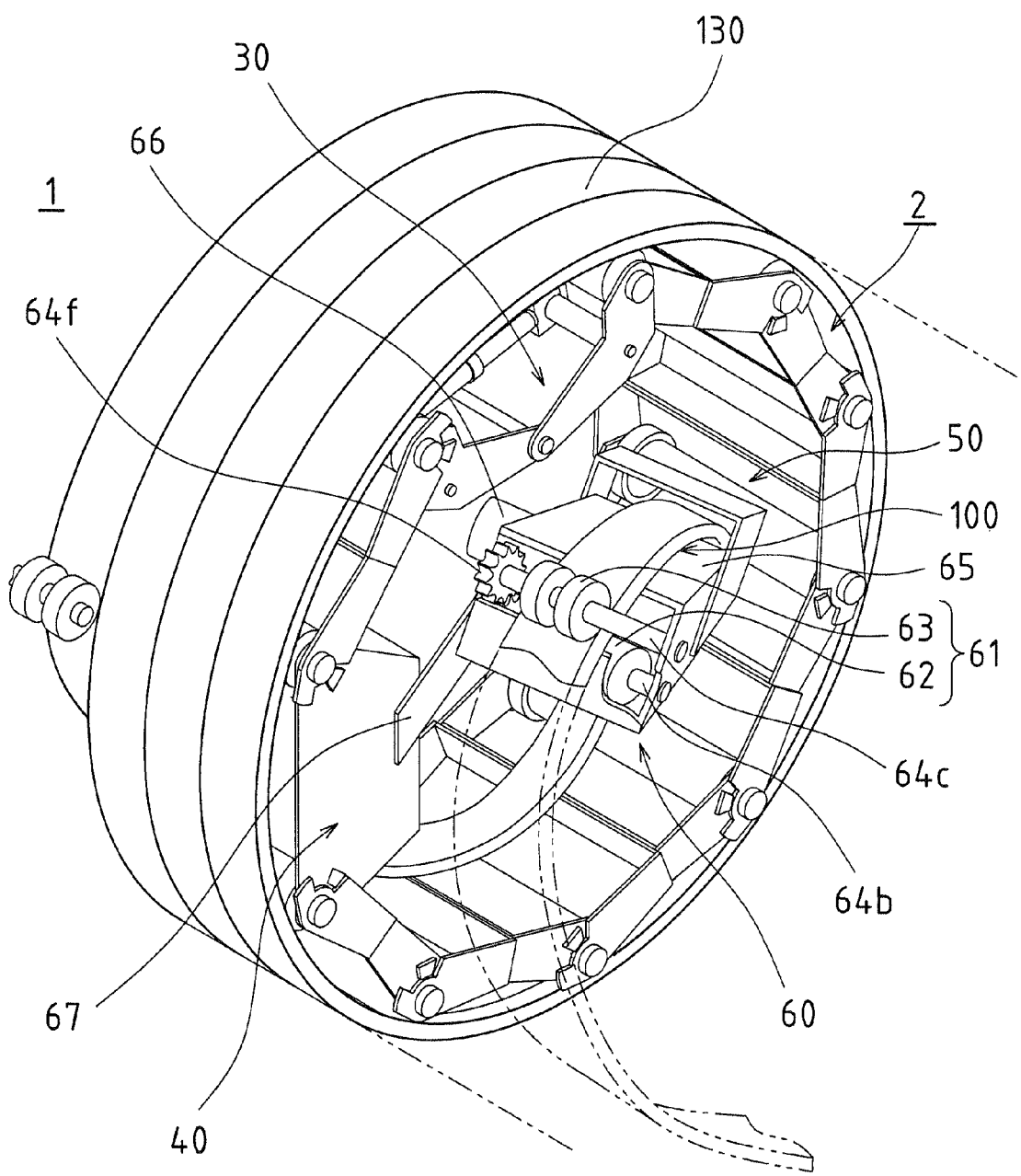
FIG. 19 is a perspective view of the pipe producing apparatus of FIG. 18 as viewed from the back.
Figure 20:
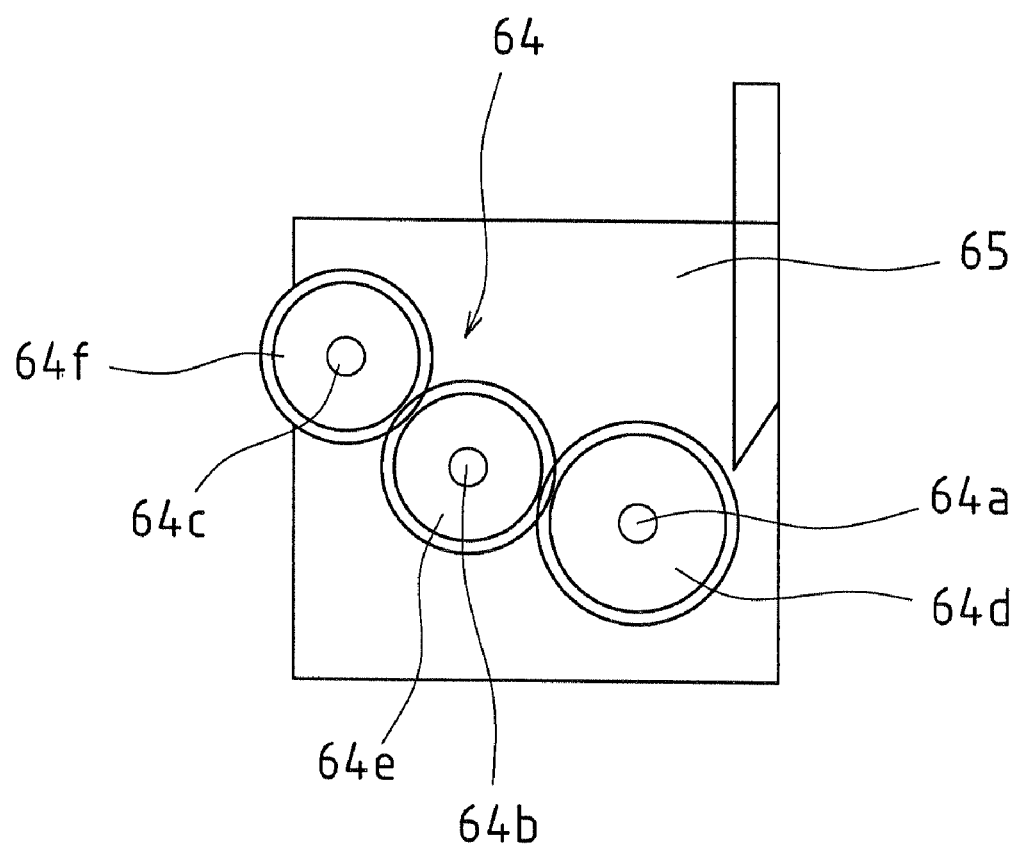
FIG. 20 is a schematic diagram for describing a gear mechanism of a feeding unit in the pipe producing apparatus of FIG. 18.

FIGS. 18 and 19 are perspective views showing a variation of the pipe producing apparatus 1 of the first embodiment. FIG. 20 is a schematic diagram showing a gear mechanism of a feeding unit in the pipe producing apparatus of FIG. 18.

The pipe producing apparatus 1 of this variation comprises a feeding unit 60 for feeding the profile strip 100 to the drive unit 40 that is provided via a stay 67 at an inner portion of the substantially annular shaping frame 2.

Note that the pipe producing apparatus 1 of this variation has the same structure as the pipe producing apparatus 1 described above, except for the feeding unit 60 and the stay 67. Therefore, the same parts are indicated by the same reference symbols and will not be described. Only the difference, i.e., the feeding unit 60 and the stay 67, will be described.

As shown in FIGS. 18, 19 and 20, the feeding unit 60 comprises a box body 65, a hydraulic motor 66 provided in the box body 65, a pinch roller 61 including a pair of an inner surface roller 62 and an outer surface roller 63, and a gear mechanism 64 for rotating the inner surface roller 62 and the outer surface roller 63 in synchronization with each other.

The box body 65 is rigid and is formed in the shape of a box, in which the gear mechanism 64 is provided. The gear mechanism 64 comprises a first rotational axle 64a, a second rotational axle 64b and a third rotational axle 64c that are rotatably supported by the box body 65 and extend in a front-to-rear direction, a first gear 64d that is fixed to the first rotational axle 64a, a second gear 64e that is fixed to the second rotational axle 64b and engages with the first gear 64d, and a third gear 64f that is fixed to the third rotational axle 64c and engages with the second gear 64e. The first rotational axle 64a is integrally coupled with the output axle of the hydraulic motor 66 provided in the box body 65. Thereby, the drive force of the hydraulic motor 66 is transferred to the first rotational axle 64a, and then to the first gear 64d, to the second gear 64e and to the third gear 64f in this order, so that the rotation of the third rotational axle 64c is appropriately slowed down.

Note that the hydraulic motor 66 is driven by pressure oil supplied via a hydraulic hose from the hydraulic unit 93 (see FIG. 12). In this case, the hydraulic hose extending from the hydraulic unit 93 is connected via a rotational joint (not shown) to the hydraulic motor 66 as described above, so that the pressure oil can be supplied without influence on the rotation of the pipe producing apparatus 1.

Figure 21:
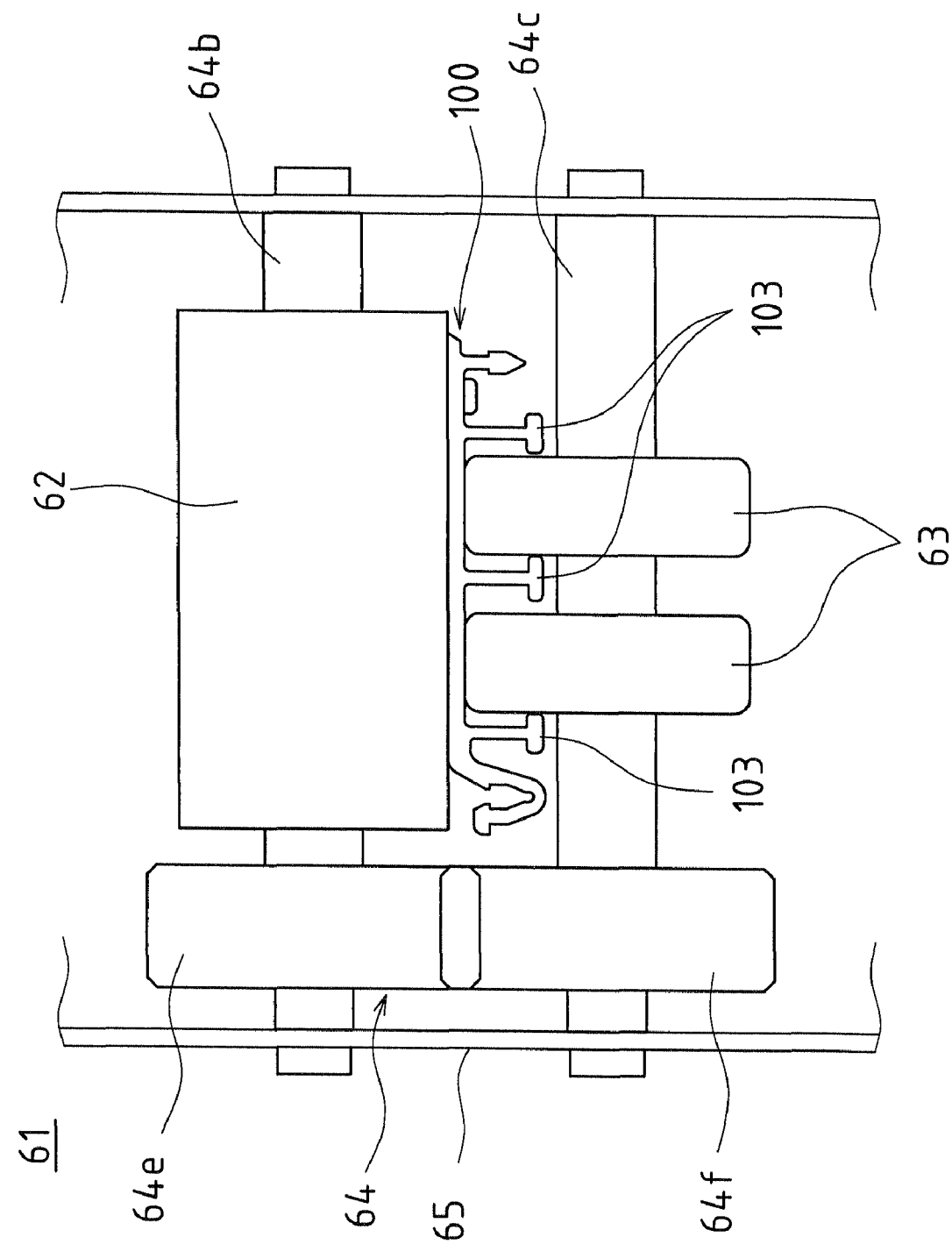
FIG. 21 is a schematic diagram showing a detailed structure of a pinch roller of a feeding unit in the pipe producing apparatus of FIG. 18.

FIG. 21 is a schematic diagram showing a detailed structure of the pinch roller of the feeding unit in the pipe producing apparatus of FIG. 18. The pinch roller 61 comprises the inner surface roller 62 provided at the second rotational axle 64b, and the outer surface roller 63 that is provided at the third rotational axle 64c and is rotated in a direction opposite to that of the second rotational axle 64b. Their rotation directions are set such that the profile strip 100 pinched between the inner surface roller 62 and the outer surface roller 63 is sent out.

Here, the inner surface roller 62 is formed in the shape of a cylinder having a width that is substantially equal to the width of the profile strip 100. An outer peripheral surface of the inner surface roller 62 has an external diameter that is set so that the inner surface roller 62 is rotated while the outer peripheral surface contacts a flat inner surface of the profile strip 100 that will become an inner peripheral surface of the tubular structure 130.

A plurality of outer surface rollers 63 are provided between the ribs 103 and 103 of the profile strip 100 and have widths that allow the outer surface rollers 63 to be inserted between the adjacent ribs 103 and 103 of the profile strip 100. Each outer surface roller 63 has an external diameter that is set so that the outer peripheral surface thereof and the inner surface roller 62 have a gap corresponding to the thickness of the profile strip 100. Therefore, the outer surface rollers 63 are rotated between the adjacent ribs 103 and 103 of the profile strip 100 while the outer peripheral surfaces thereof contact the outer surface of the profile strip 100 that will become an outer peripheral surface of the tubular structure 130.

Thereby, the profile strip 100 newly fed can be pinched and sent out toward the drive unit 40 by the inner surface roller 62 and the outer surface roller 63 being rotated in opposite directions via the hydraulic motor 66 and the gear mechanism 64.

Note that the outer peripheral surface of the outer surface roller 63 is knurled so that the profile strip 100 can be sent out without slippery.

The stay 67, which has rigidity, integrally couples the feeding unit 60 with the drive unit 40 inside the substantially annular shaping frame 2. An end portion of the stay 67 is welded to a predetermined position of the box body 65 of the feeding unit 60, and the other end portion of the stay 67 is welded to a predetermined position of the box body 45 of the drive unit 40.

Thus, in the pipe producing apparatus 1 of this variation, the feeding unit 60 for feeding the profile strip 100 to the drive unit 40 is provided via the stay 67 to the drive unit 40 of the shaping frame 2. Therefore, the drive force of the drive unit 40 that corrects and feeds the profile strip 100 that is fed in a twisted state so that the profile strip 100 is arranged adjacent to the previous winding of the profile strip 100, can be assisted by the feeding unit 60. Therefore, the drive unit 40 can be made more compact.

Therefore, a large load is not likely to be applied on the movable portions of the drive unit 40 and the profile strip 100 during pipe production, so that a failure of the drive unit 40 or damage on the profile strip 100 can be suppressed. Also, the pipe producing apparatus 1 does not clog the existing pipe 200.

Figure 22:
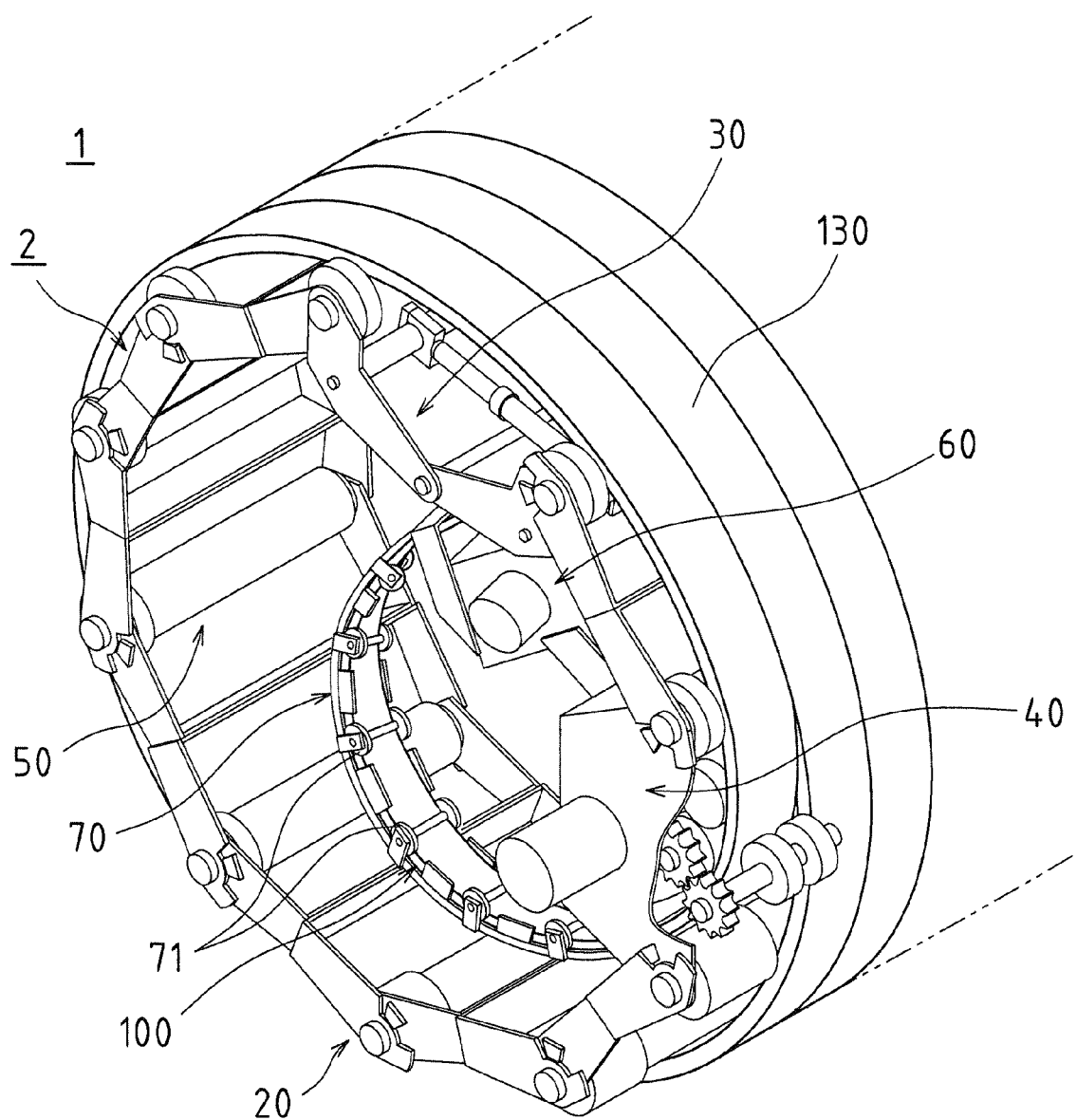
FIG. 22 is a perspective view showing another embodiment of the pipe producing apparatus of the present invention.
Figure 23:
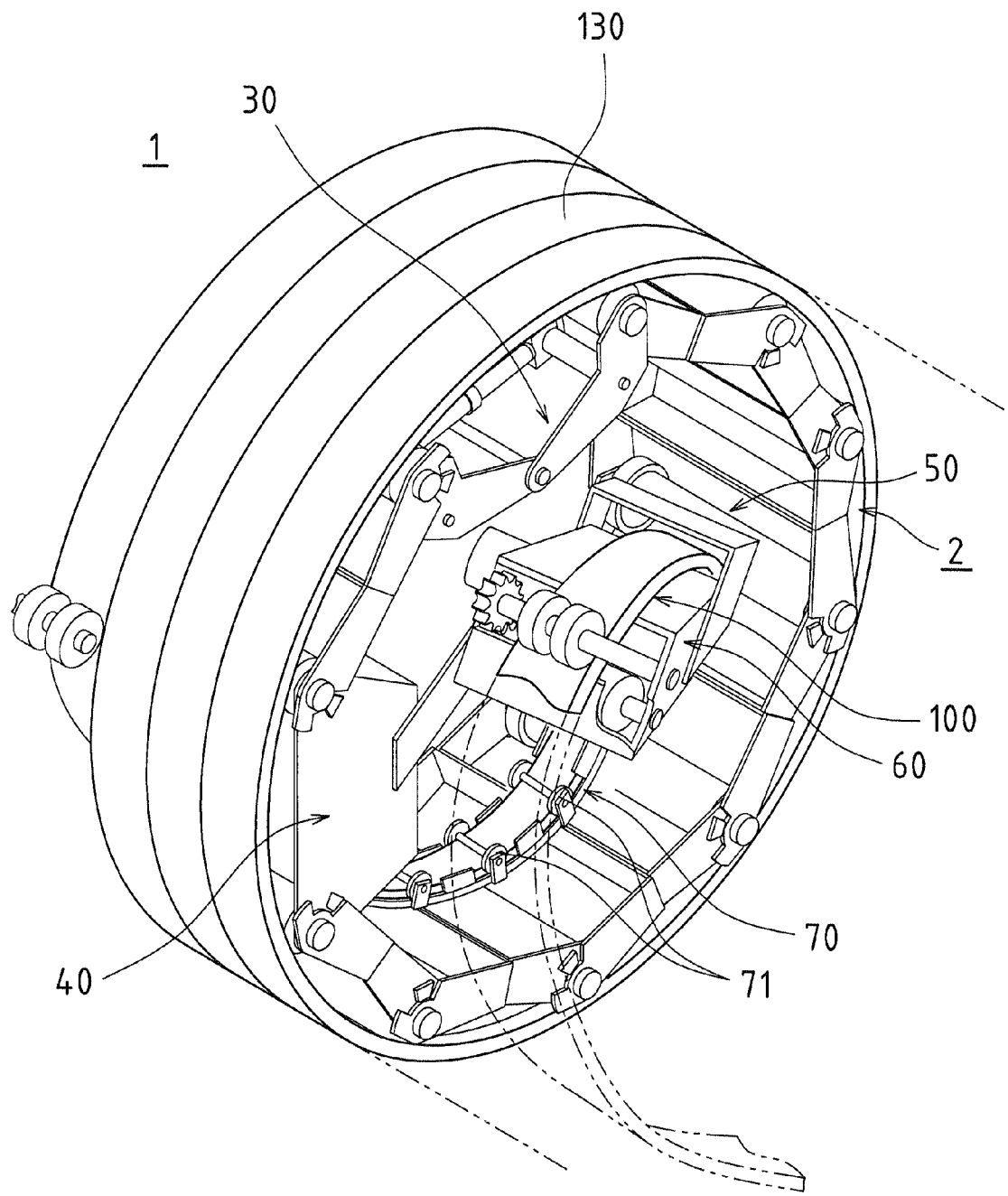
FIG. 23 is a perspective view of the pipe producing apparatus of FIG. 22 as viewed from the back.

FIGS. 22 and 23 are perspective views showing another variation of the pipe producing apparatus 1 of the first embodiment. The pipe producing apparatus 1 of this variation comprises a guide plate 70 for helically guiding the profile strip 100 into between the feeding unit 60 and the drive unit 40.

Note that the pipe producing apparatus 1 of this variation has the same structure as that of the pipe producing apparatus 1 of the above-described variation, except for the guide plate 70. Therefore, the same parts are indicated by the same reference symbols and will not be described. Only the difference, i.e., the guide plate 70, will be described.

The guide plate 70 helically guides the profile strip 100 from the feeding unit 60 to the drive unit 40. As shown in the figures, the guide plate 70 comprises a plurality of guide plate rollers 71 for causing the profile strip 100 to extend along the guide plate 70.

Thereby, the guide plate 70 can guide the profile strip 100 to the drive unit 40 while correcting the profile strip 100 that is fed in a twisted state, so that the profile strip 100 is arranged adjacent to the previous winding of the profile strip 100. Therefore, the drive unit 40 can be made more compact.

Therefore, a large load is not likely to be applied on the movable portions of the drive unit 40 and the profile strip 100 during pipe production, so that a failure of the drive unit 40 or damage on the profile strip 100 can be suppressed. Also, the pipe producing apparatus 1 does not clog the existing pipe 200, and therefore, the pipe producing process can be continuously executed.

Second Embodiment

Next, a pipe producing apparatus according to a second embodiment of the present invention and an existing pipe rehabilitating method employing the pipe producing apparatus will be described.

Firstly, a profile strip used in this embodiment will be described with reference to the drawings before describing the pipe producing apparatus and the existing pipe rehabilitating method of this embodiment.

Figure 24:
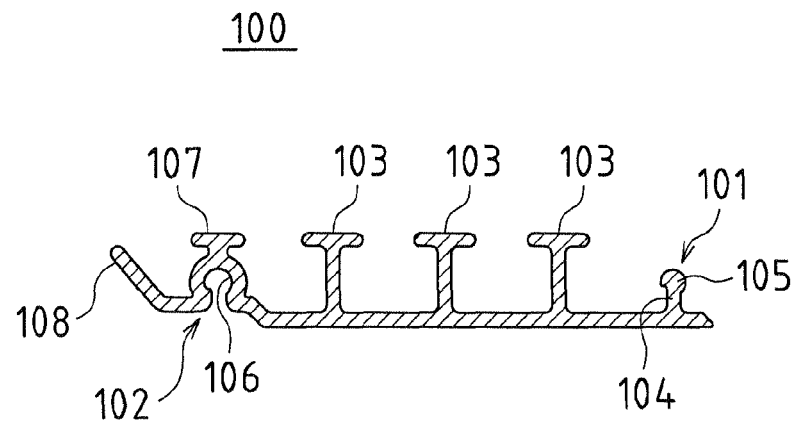
FIG. 24 is a cross-sectional view showing an exemplary profile strip for use in the present invention.
Figure 25:
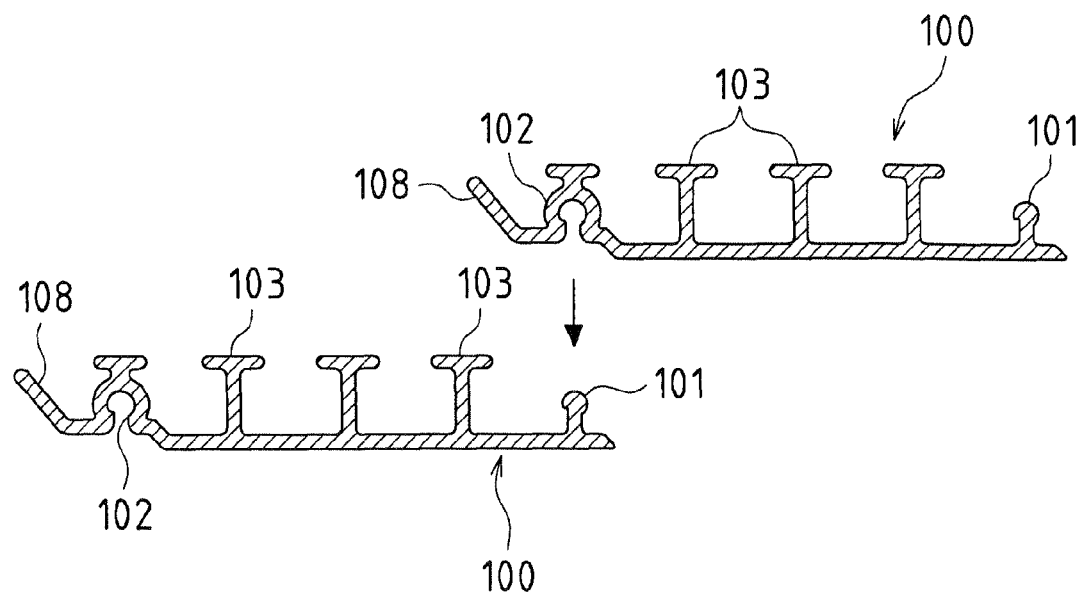
FIG. 25 is an explanatory diagram showing adjacent windings of a profile strip that are about to be joined with each other.
Figure 26:
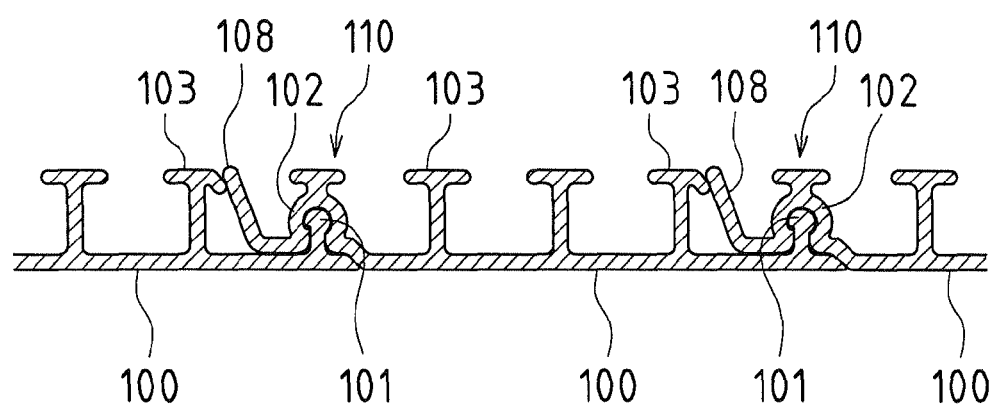
FIG. 26 shows a joined state of the profile strip.
Figure 26:
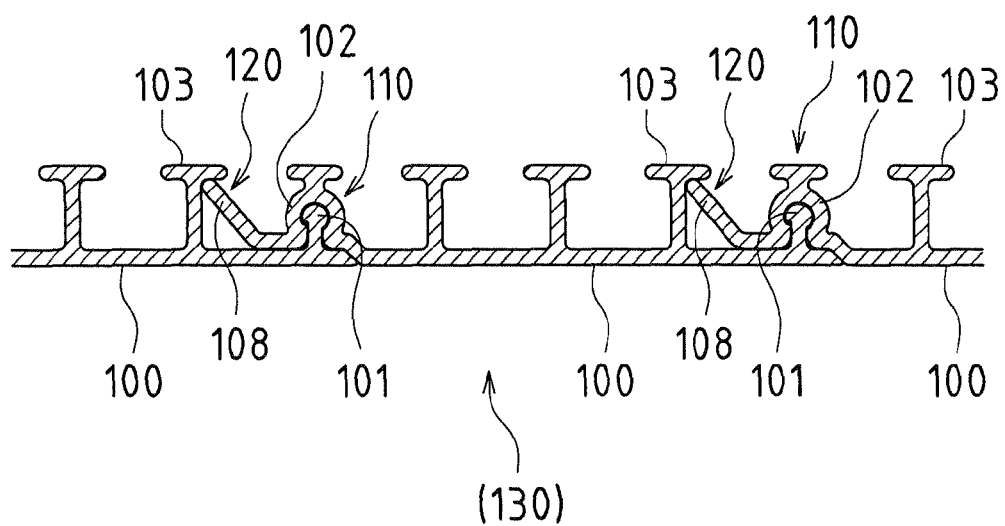

FIG. 24 is a cross-sectional view showing an exemplary profile strip for forming a tubular structure. FIG. 25 is an explanatory diagram showing adjacent windings of the profile strip of FIG. 24 that are about to be joined with each other. FIG. 26(a) is an explanatory diagram showing a joined state of main joint portions of the profile strip. FIG. 26(b) is an explanatory diagram showing a complete joined state in which subsidiary joint portions of the profile strip are also joined, following FIG. 26(a).

The profile strip 100 of FIG. 24 is formed of a synthetic resin material, such as a hard vinyl chloride, polyethylene, polypropylene or the like, and in the shape of an elongated band. A joint convex portion 101 and a joint concave portion 102 are formed at opposite edge portions of the profile strip 100 along the longitudinal direction.

The joint convex portion 101 comprises a column portion 104 and a male interlocking portion 105 that is provided at a tip thereof and has substantially a circular cross-section. The joint concave portion 102 comprises a female interlocking portion 106 having substantially a circular cross-section and a flange portion 107 that is formed outside (above in the figure) of the female interlocking portion 106. A strip-shaped soft elastic material made of an elastomer or the like that prevents adjacent windings of the profile strip 100 from slipping when they are joined with each other and attaches them tightly together, may be provided in the vicinity of the joint convex portion 101.

A plurality of ribs 103, . . . , and 103 are provided at substantially a middle portion in the width direction of the profile strip 100, standing upright along the longitudinal direction. The ribs 103, . . . , and 103 each have substantially a T-shaped tip portion that forms a flange that is similar to the flange portion 107 of the joint concave portion 102.

The profile strip 100 also has a bent piece 108 that is bent and extended in a slanting direction at an outer edge of the joint concave portion 102. A tip portion of the bent piece 108 is formed so that, when the joint concave portion 102 is fitted with the joint convex portion 101 of the adjacent winding of the profile strip 100, the tip portion of the bent piece 108 interlocks with the substantially T-shaped tip portion of the rib 103 formed at a side portion of the joint convex portion 101.

The profile strip 100 having such a structure is helically wound by a pipe producing apparatus 1 described below. During the winding process, as shown in FIG. 25, the joint concave portion 102 of one of adjacent windings of the profile strip 100 is fitted with the joint convex portion 101 of the other winding of the profile strip 100 from the inside (the inside of the previous winding of the profile strip 100). Thereby, as shown in FIG. 26(a), the adjacent windings of the profile strip 100 are connected with each other, so that a main joint portion 110 of the profile strip 100 is formed. When the main joint portion 110 of windings of the profile strip 100 is formed, a tubular structure is formed in an existing pipe. In this case, the bent piece 108 of the profile strip 100 is elastically deformed into a further bent state, and only abuts a side portion of a rib 103 of the adjacent winding of the profile strip 100.

Further, from this state, the bent piece 108 of the profile strip 100 is pressed, so that the bent piece 108 slips over a side portion of the rib 103. As a result, the bent piece 108 is elastically repelled back to its original shape, so that the bent piece 108 is fitted with a tip portion of the rib 103 of the adjacent winding of the profile strip 100. Thereby, as shown in FIG. 26(b), the bent piece 108 and the rib 103 of the profile strip 100 interlock with each other, so that the subsidiary joint portion 120 of the adjacent windings of the profile strip 100 is formed. As a result, the adjacent windings of the profile strip 100 are completely joined with each other.

Thus, the profile strip 100 has the main joint portion 110 and the subsidiary joint portion 120. When such a profile strip 100 is used to produce the tubular structure 130, the main joint portion 110 is formed into a tubular shape, thereby making it possible to determine the diameter and circumferential length of the pipe in an existing pipe. Thereafter, the subsidiary joint portion 120 is formed, thereby making it possible to improve the ability to prevent water leakage of the tubular structure 130.

Next, the pipe producing apparatus 1 of the second embodiment will be described.

Note that the pipe producing apparatus 1 of the second embodiment described below has the same basic structure as that of the pipe producing apparatus 1 of the first embodiment, except that the pipe producing apparatus 1 of the second embodiment additionally comprises a joint unit 80, which is a characteristic feature. The joint unit 80 will be described in detail. The other parts are indicated by the same reference symbols as those of the first embodiment and will not be described.

Figure 27:
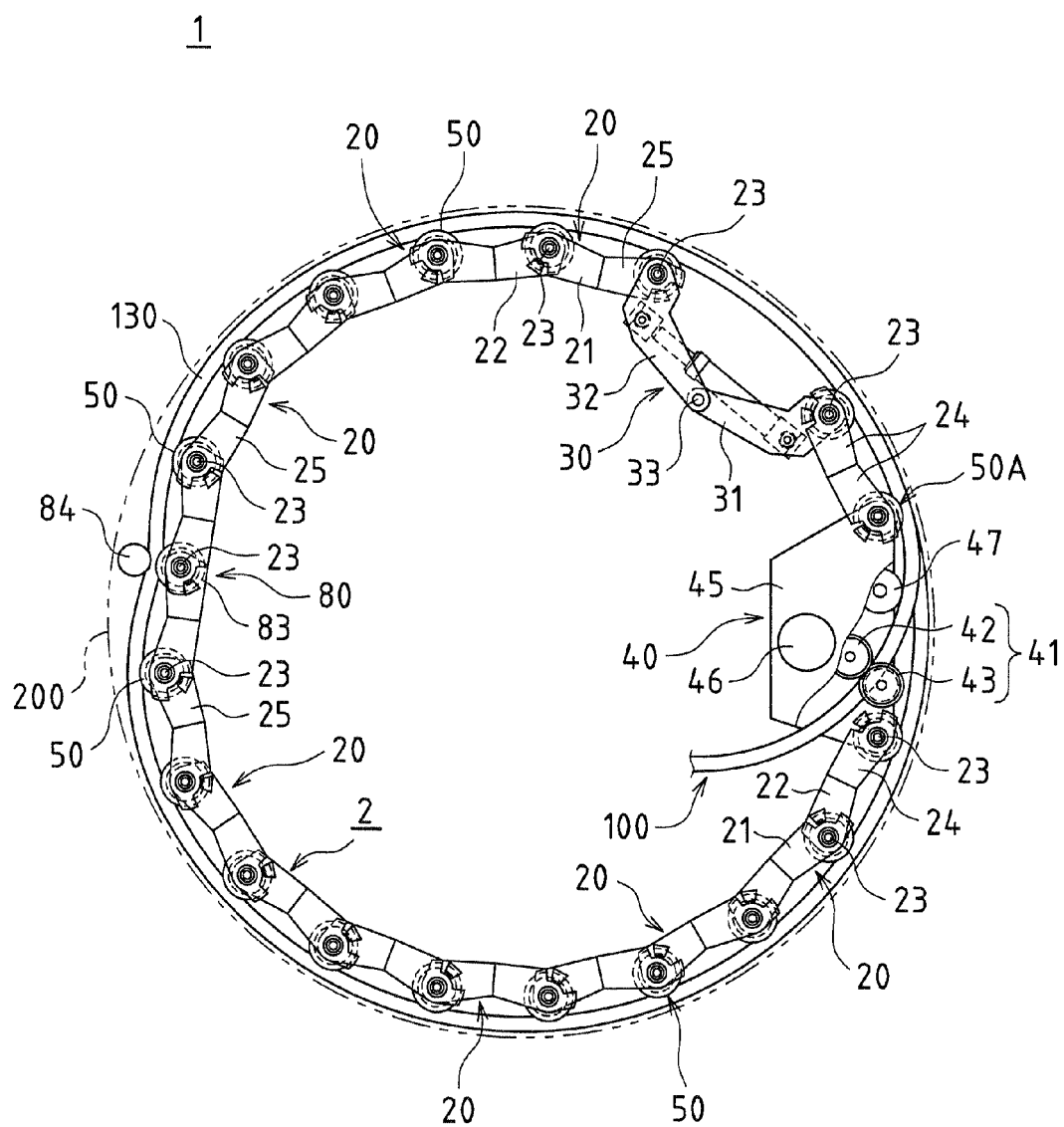
FIG. 27 is a front view showing a second embodiment of the pipe producing apparatus of the present invention.
Figure 28:
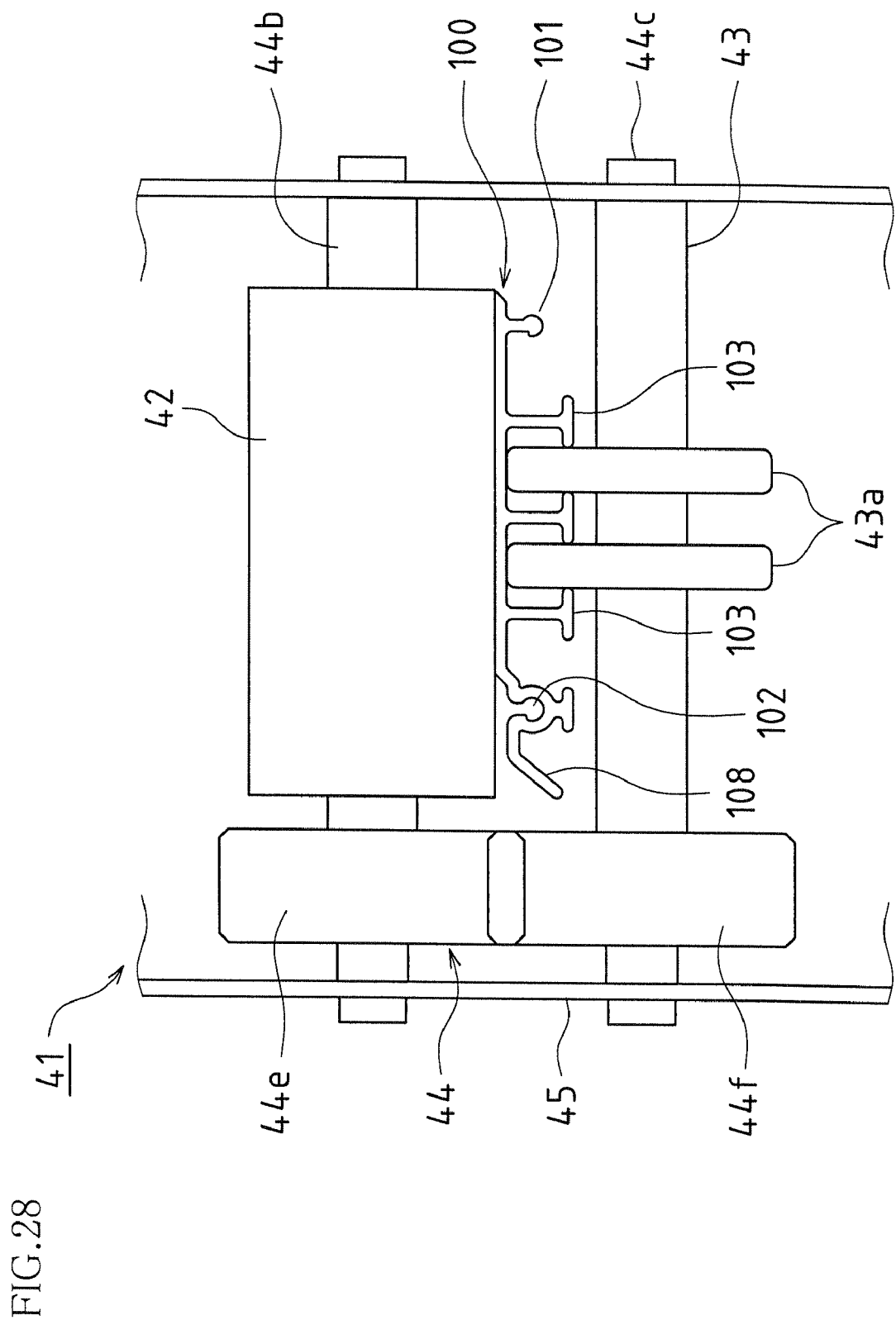
FIG. 28 is a schematic diagram showing a detailed structure of a pinch roller of a drive unit in the pipe producing apparatus of the second embodiment.

FIG. 27 is a front view showing an embodiment of the pipe producing apparatus of the present invention. FIG. 28 is an explanatory diagram showing a pinch roller 41 of a drive unit 40. The pipe producing apparatus 1 comprises a shaping frame 2 that is installed in an existing pipe 200 and guide rollers 50, . . . , and 50 that are rotatably supported in the shaping frame 2.

The shaping frame 2 comprises a plurality of linking bodies 20 in which a pair of linking elements 21 and 22 is rotatably coupled with each other via a coupling shaft 23, a bending link 30 with opposite ends of which coupling elements 24 and 25 are rotatably coupled via coupling shafts 23, a drive unit 40 with opposite ends of which coupling elements 24 and 24 are rotatably coupled via coupling shafts 23, and the joint unit 80 that is provided and separated from the drive unit 40. The shaping frame 2 is formed in substantially an annular shape by coupling the coupling elements 24 and 25 of the bending link 30, the linking bodies 20, the joint unit 40, and the coupling elements 24 and 24 of the drive unit 40 with each other, where the bending link 30 is bent inward.

Figure 29:
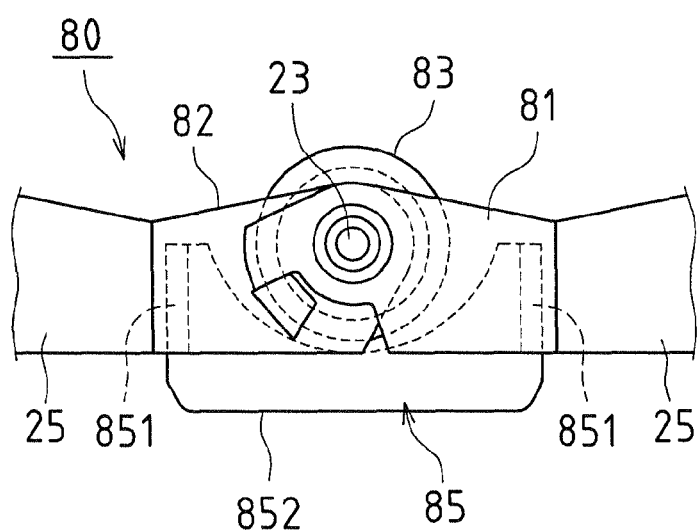
FIG. 29 is a front view showing a joint unit in the pipe producing apparatus of the second embodiment.
Figure 30:
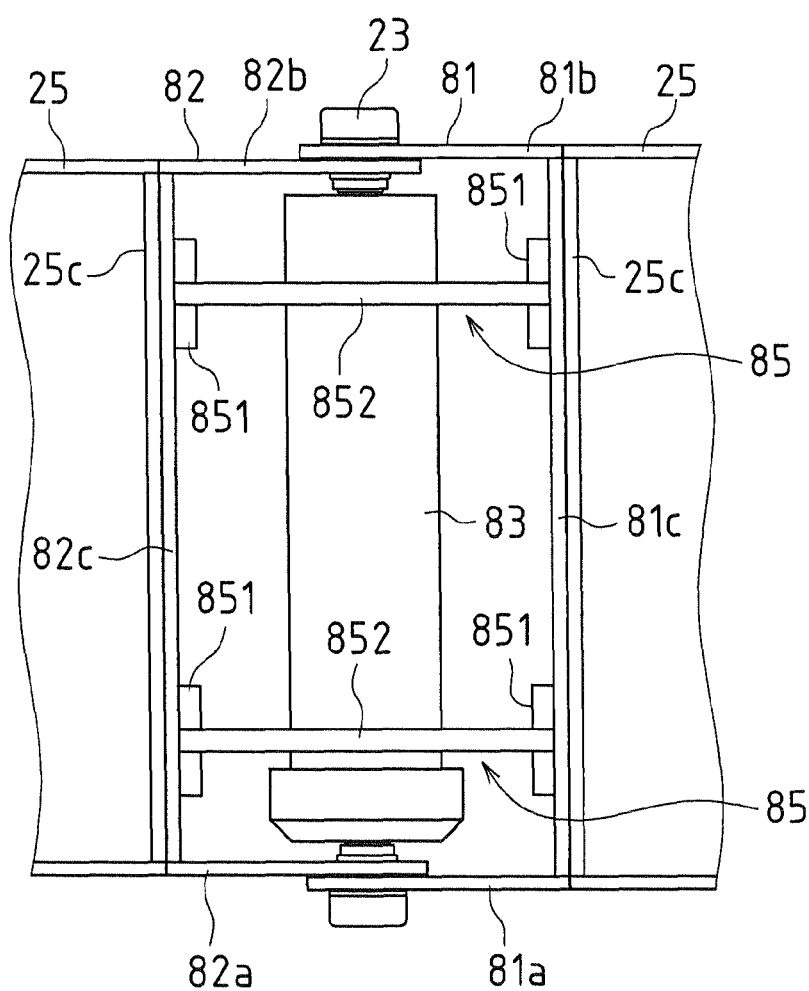
FIG. 30 is a plan view of the joint unit.
Figure 31:
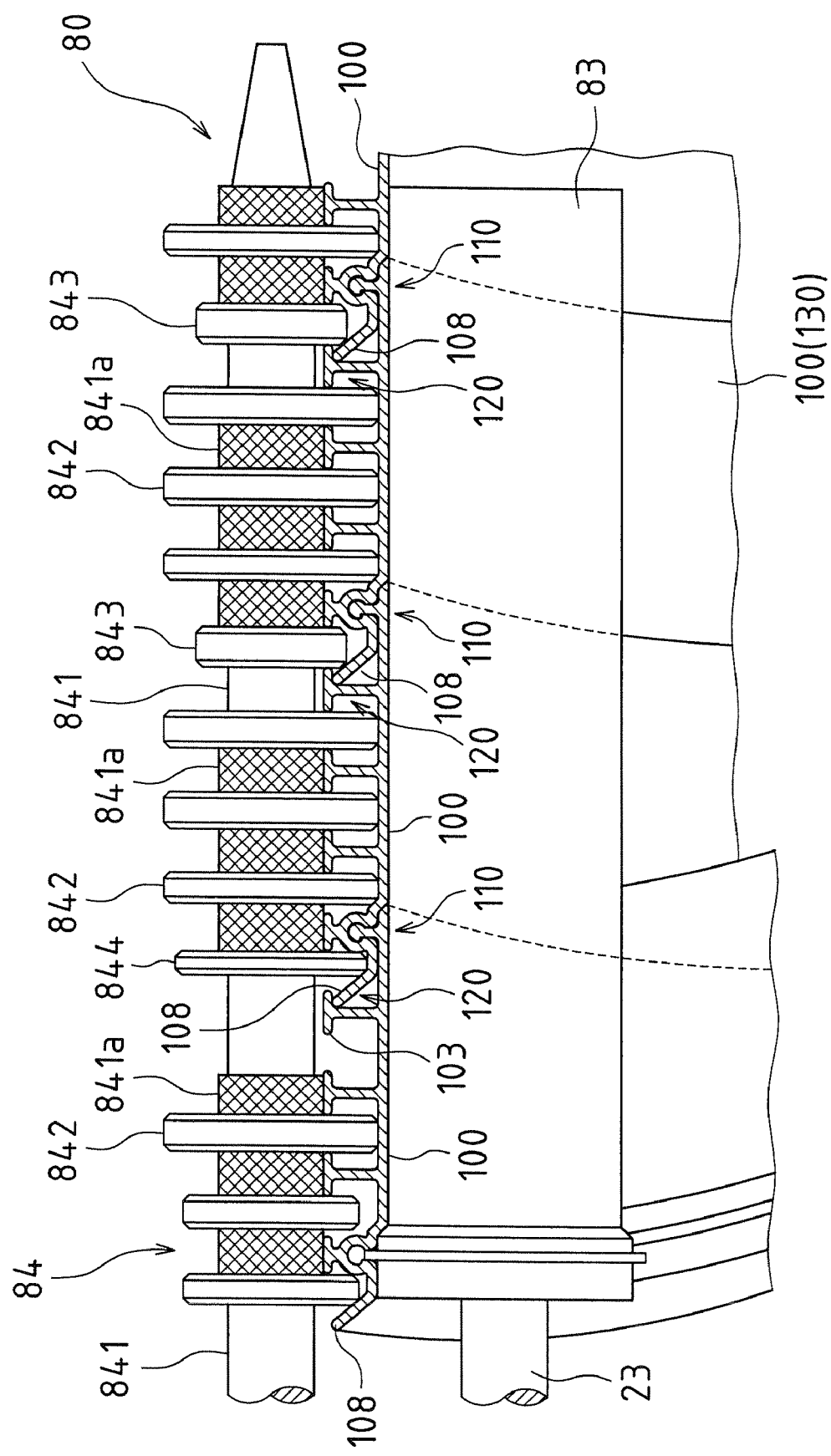
FIG. 31 is a side view of the joint unit.

The shaping frame 2 includes the joint unit 80 that pinches previous windings of the profile strip 100 that have been passed through the drive unit 40, from the inner side and the outer side of the shaping frame 2. FIGS. 29 to 31 show an example of the joint unit 80. FIG. 29 is a front view of the joint unit 80. FIG. 30 is a plan view of the joint unit 80. FIG. 31 is a side view of the joint unit 80.

As shown in FIG. 27, the joint unit 80 is coupled with the linking elements 21 and 22 of a linking body 20 in the shaping frame 2, and is provided and separated from the drive unit 40 (at a position where the joint unit 80 can be opposed to the drive unit 40 in the illustrated form).

As shown in FIGS. 29 and 30, the illustrated joint unit 80 comprises a pair of unit elements 81 and 82 including front side plates 81a and 82a, rear side plates 81b and 82b, and coupling plates 81c and 82c provided between first end portions facing each other of the front side plates 81a and 82a and the rear side plates 81b and 82b, which are arranged in the shape of a square-U frame. The unit elements 81 and 82 overlap each other at their first end portions and are rotatably coupled with each other via a coupling shaft 23, which structure is substantially similar to that of the linking body 20. The coupling elements 25 and 25 each including a coupling shaft 23 and a guide roller 50 are coupled with the unit elements 81 and 82, where coupling plates 25c and 25c of the coupling elements 25 and 25 are attached to second end portions of the unit elements 81 and 82.

As shown in FIG. 27, the unit elements 81 and 82 coupled via the coupling shaft 23 comprise an inner surface roller 83 rotatably provided in the shaping frame 2, and an outer surface pressing means for pressing the profile strip 100 against the inner surface roller 83 outside the shaping frame 2. In the illustrated form, in the joint unit 80, the inner surface roller 83 and the outer surface roller 84 as the outer surface pressing means are arranged side by side in the pipe axial direction, keeping a predetermined gap therebetween in which the profile strip 100 is pinched.

The inner surface roller 83 for junction is supported by the coupling shaft 23 in the unit elements 81 and 82. The outer surface roller 84 is provided closer to the inner peripheral surface of the existing pipe 200 than the inner surface roller 83 is and is provided father inside than an outer shape of the tubular structure 130.

The inner surface roller 83, which has a cylindrical shape, is supported by the coupling shaft 23. The inner surface roller 83 does not have drive force, as is similar to the guide rollers 50 of the other linking bodies 20, and is caused to freely rotate while contacting the inner surface of the profile strip 100. Also, the inner surface roller 83 is tightly attached to the inner surface of the profile strip 100 while the profile strip 100 is pressed and supported by the outer surface roller 84 for junction, from the outside.

As shown in FIG. 31, the outer surface roller 84 as the outer surface pressing means includes a cylindrical body 841 and a plurality of annular collar portions 842 that are formed on the cylindrical body 841 and spaced from each other. A collar portion 842 is fitted in between each rib 103 of the profile strip 100. Also, the substantially T-shaped tip portion of the rib 103 of the profile strip 100 is pressed against and contacts an outer peripheral surface 841a of the cylindrical body 841. The outer peripheral surface 841a of the cylindrical body 841 is knurled so as to prevent slippery of the profile strip 100. The collar portion 842 does not need to particularly contact the profile strip 100, and essentially needs to fit in a groove portion between the ribs 103 and 103.

The outer peripheral surface of the outer surface roller 84 rotates by itself by contacting the profile strip 100, i.e., can freely rotate without drive force to send out the profile strip 100.

The outer surface roller 84 has a pressing section 844 for forming the subsidiary joint portion 120 of the profile strip 100. Specifically, in the illustrated form, the collar-shaped pressing section 844 is provided, protruding, at a portion where the outer surface roller 84 contacts and presses the subsidiary joint portion 120. The pressing section 844 has a small diameter that allows overlapping of adjacent windings joined of the profile strip 100. The pressing section 844 presses the bent piece 108 of one of the windings of the profile strip 100. Thereby, the pressing section 844 fits the bent piece 108 of the profile strip 100 into the tip portion of the rib 103 of the adjacent winding of the profile strip 100, thereby interlocking the adjacent windings of the profile strip 100.

Therefore, in the subsidiary joint portion 120 of the profile strip 100, the bent piece 108 and the rib 103 are pressed and interlocked with each other by a pinching action of the inner surface roller 83 and the outer surface roller 84 of the joint unit 80. The outer surface roller 84 interlocks with groove portions between the ribs 103 and 103 of the profile strip 100, and moves forward in the pipe axial direction in a predetermined pitch along with the newly fed winding of the profile strip 100, and the joint unit 80 is invariably located at the joint portion of the subsidiary joint portion 120.

Figure 32:
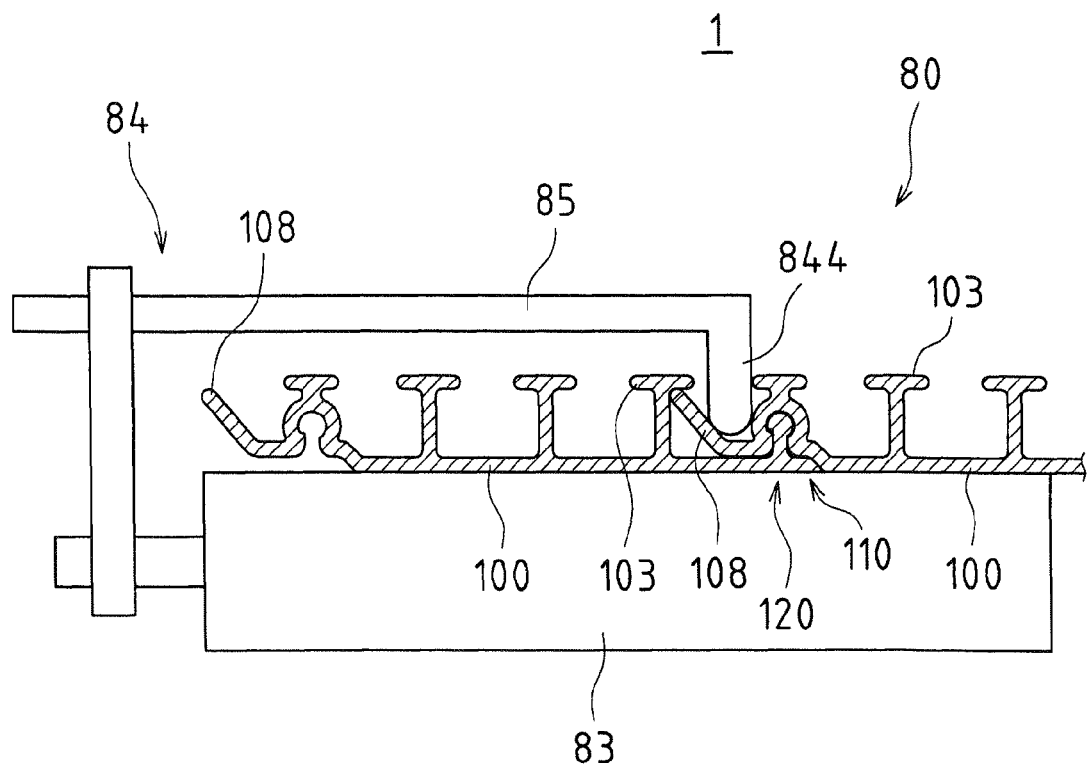
FIG. 32 is a side view showing another form of the joint unit in the pipe producing apparatus of the second embodiment.

As the outer surface pressing means, only the pressing section 844 for pressing the subsidiary joint portion 120 of windings of the profile strip 100 against the inner surface roller 83 may be directly attached to a shaft portion 85, as schematically shown in FIG. 32, in addition to the outer surface roller 84 as described above. Also in this case, as is similar to that described above, the inner surface roller 83 is tightly attached to the inner surface of the profile strip 100 and transports the profile strip 100, and assists the pressing section 844 in pressing and interlocking the bent piece 108 with the rib 103 of the adjacent winding of the profile strip 100.

Further, as shown in FIGS. 29 and 30, in the unit elements 81 and 82 of the joint unit 80, two rotation blocking frames 85 and 85 are provided, straddling the inner surface roller 83. Each frame 85 comprises abutting plates 851 and 851 that abut inner surfaces of the coupling plates 81c and 82c of the unit elements 81 and 82, and a frame body 852 that is provided, spanning between the abutting plates 851 and 851. By providing the rotation blocking frames 85 in the unit elements 81 and 82, the gap between the unit elements 81 and 82 can be maintained constant, so that the unit elements 81 and 82 that would otherwise freely rotate about the coupling shaft 23, are blocked from being rotated and are maintained in a fixed state. Also, as shown in FIG. 27, the coupling shafts 23 and 23 of the coupling elements 25 and 25 at the opposite ends of the joint unit 80 and the inner surface roller 83 for junction are provided in the same plane, and are arranged side by side in the pipe axial direction of the existing pipe 200.

Therefore, in the existing pipe 200, while the linking bodies 20 of the shaping frame 2 are coupled with each other and are arranged into substantially an annular shape along the tubular structure 130 produced by helically winding the profile strip 100, the joint unit 80 is separated from the inner peripheral surface of the existing pipe 200, and is positioned so that windings to be joined of the profile strip 100 are elastically deformed and positioned father inside than the outer shape of the tubular structure 130.

The outer surface pressing means (outer surface roller 84) is provided farther inside than the outer shape of the tubular structure 130 formed of the previous windings of the profile strip 100. The inner surface roller 83 and the unit elements 81 and 82 are provided farther inside than the outer surface roller 84. Helical windings of the profile strip 100 are pinched between the joining outer surface roller 84 and the joining inner surface roller 83.

Figure 33:
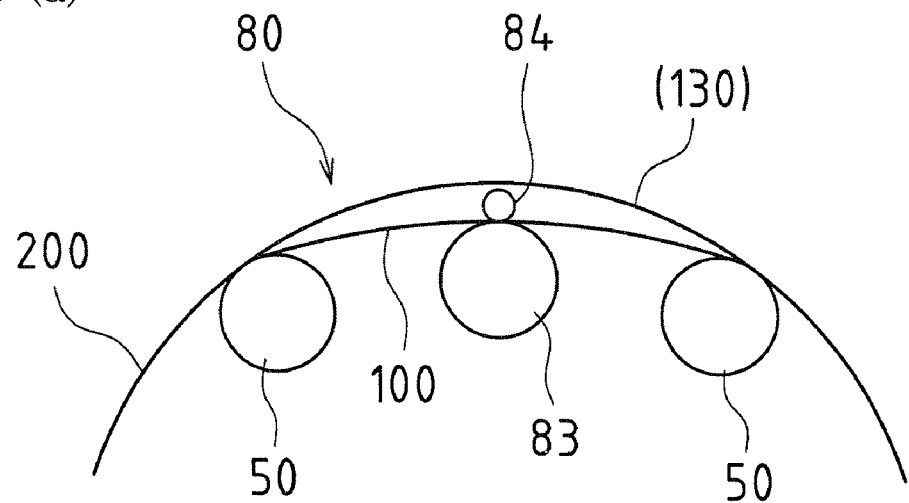
FIGS. 33(a) and 33(b) are explanatory diagrams illustrating arrangements of the joint unit in the pipe producing apparatus of the second embodiment.
Figure 33:
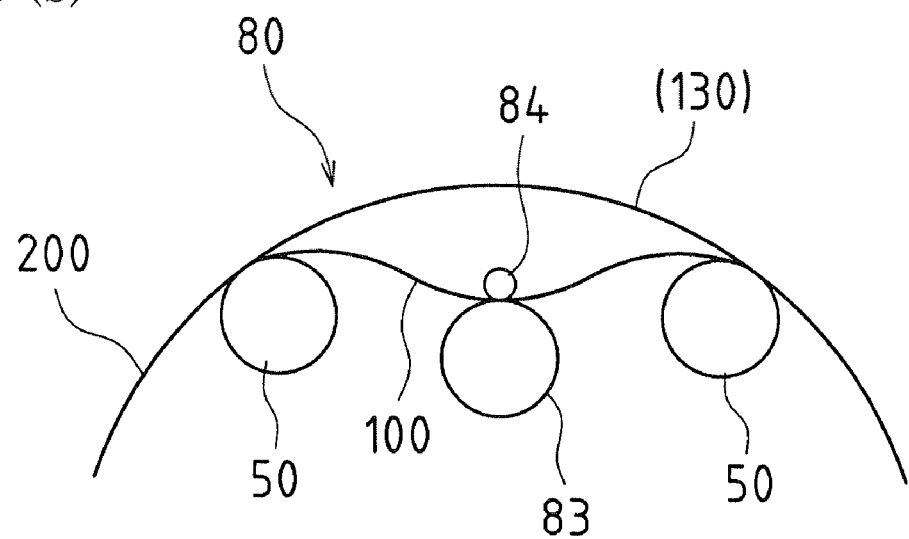

Thus, the joint unit 80 secures a space for providing the outer surface roller 84 between the joint unit 80 and the inner peripheral surface of the existing pipe 200. For example, as shown in FIG. 33(a), the space in which the outer surface roller 84 is provided between the joint unit 80 and the existing pipe 200 by the joint unit 80, may be such that the outer surface roller 84 is positioned close to, but not in contact with, the inner peripheral surface of the existing pipe 200 (or the inner surface of the tubular structure 130), and the outer surface roller 84 and the inner surface roller 83 can pinch the profile strip 100. Alternatively, in the joint unit 80, the outer surface roller 84 may be provided farther inside so that the profile strip 100 may be bent inward and pinched as shown in FIG. 33(b).

In any of the cases, the joint unit 80 is preferably formed within the range of 15% or less with respect to the diameter of the existing pipe 200. Thereby, the subsidiary joint portion 120 can be formed within an elastic deformation region without the outer surface roller 84 (outer surface pressing means) contacting the existing pipe 200 and without buckling occurring in the tubular structure 130 obtained by winding.

Also, in the joint unit 80, the outer surface pressing means (the joining outer surface roller 84) may comprise a sliding mechanism that can slide in the pipe axial direction with respect to the shaping frame 2, so that the outer surface pressing means can be caused to move in the pipe axial direction. Thus, by sliding the outer surface roller 84 in the pipe axial direction, the helical pitch of the profile strip 100 of the produced tubular structure 130 can be easily changed. Therefore, even when the width of the profile strip 100 of the tubular structure 130 or the internal diameter of the existing pipe 200 varies, the collar portions 842 and 843 of the outer surface roller 84 are appropriately fitted in between the ribs 103 and 103, thereby preventing the collar portions 842 and 843 from being displaced, so that the subsidiary joint portion 120 can be smoothly formed.

Figure 34:
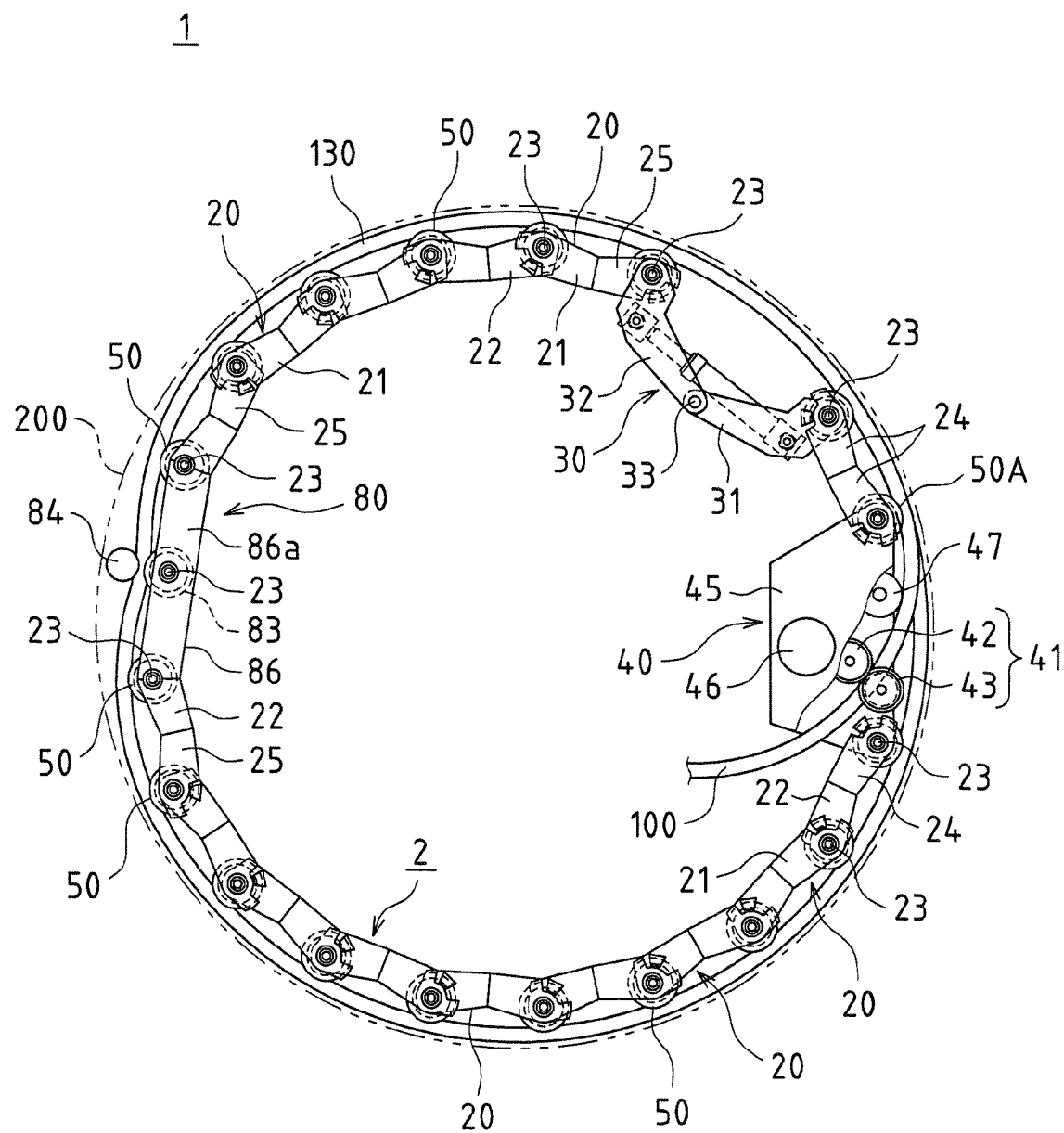
FIG. 34 is a front view showing a variation of the pipe producing apparatus of the second embodiment.
Figure 35:
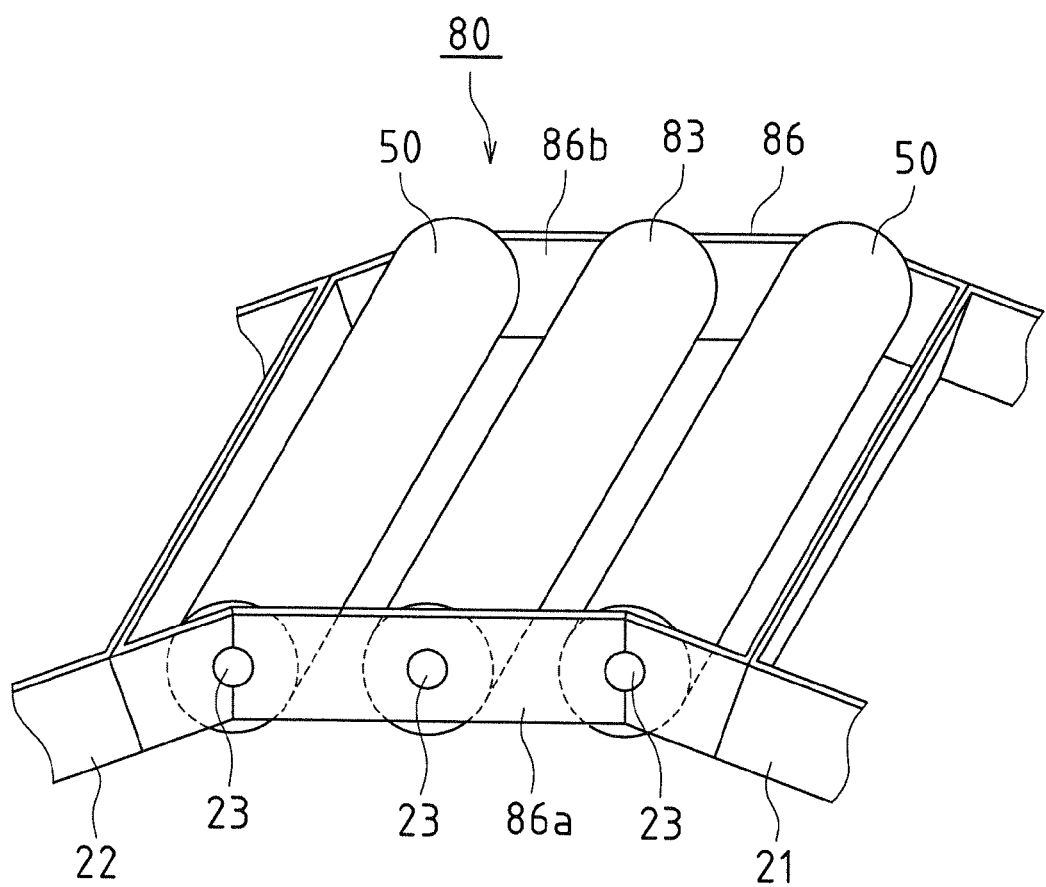
FIG. 35 is a perspective view showing a joint unit in the pipe producing apparatus of FIG. 34.
Figure 36:
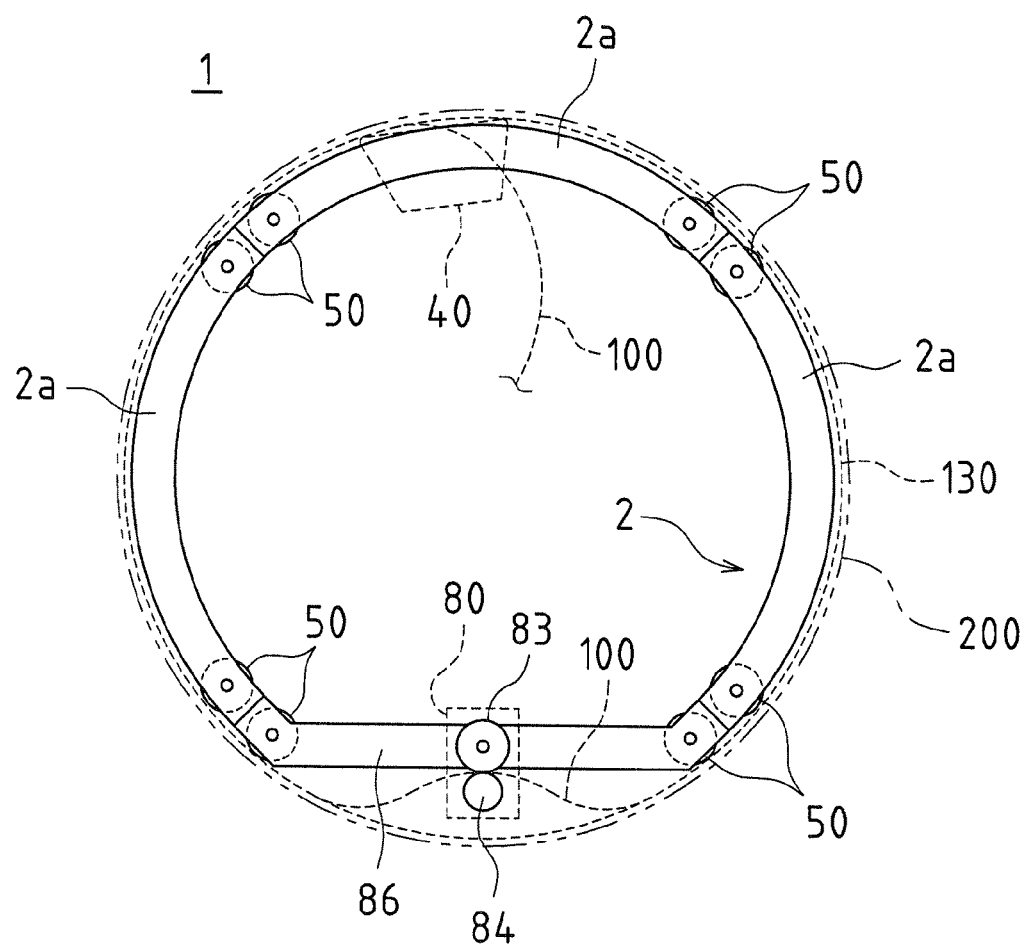
FIG. 36 is a front view further showing a variation of the pipe producing apparatus of the second embodiment.

FIGS. 34 to 36 show another form of the joint unit 80 in the second embodiment. FIG. 34 is a front view of a pipe producing apparatus 1. FIG. 35 is a perspective view of an inner surface roller 83 of the joint unit 80 of FIG. 34. FIG. 36 is a front view schematically showing a pipe producing apparatus 1 in still another form.

As shown in these figures, the joint unit 80 is provided in a frame element 86 that is integrated with coupling shafts 23 and 23 and an inner surface roller 83 that are arranged side by side in the same plane. The coupling shafts 23 and 23 and the inner surface roller 83 are rotatably supported by the frame element 86. The coupling shafts 23 and 23 are each provided with a guide roller 50. The outer surface roller 84, which is paired with the inner surface roller 83, is provided farther outside than the profile strip 100 as shown in FIG. 31.

The frame element 86 comprises a front side plate 86a and a rear side plate 86b, which are formed in the shape of a straight plate. Thereby, a portion of the shaping frame 2 in which the joint unit 80 is provided is shaped into substantially a straight chord with respect to the inner peripheral surface of the existing pipe 200. Therefore, in the case of this joint unit 80, by the frame element 86, a space in which the outer surface roller 84 is provided can be inevitably secured between the frame element 86 and the inner peripheral surface of the existing pipe 200.

Also, as shown in FIG. 36, if the internal diameter of the tubular structure 130 to be formed is previously determined, the shaping frame 2 may be formed of a plurality of substantially arc-shaped frames 2a coupled with each other instead of a plurality of linking bodies 20. In this case, the shaping frame 2 has a fixed outer shape, and frames 2a, . . . , and 2a having guide rollers 50 and a frame element 86 of a joint unit 80 are integrally coupled. The resultant shaping frame 2 is rotated along the inner peripheral surface of the tubular structure 130.

Also in the pipe producing apparatus 1 comprising such a joint unit 80, the tip portion of the rib 103 of the profile strip 100 is fitted with the bent piece 108 of the adjacent previous winding of the profile strip 100 by an action of the inner surface roller 83 and the outer surface roller 84 as described above. Also, since a space is secured for the outer surface roller 84, the subsidiary joint portion 120 can be smoothly formed within an elastic deformation region of the produced tubular structure 130 (profile strip 100) without contacting the existing pipe 200.

Next, a specific exemplary rehabilitating method employing the pipe producing apparatus 1 of the second embodiment will be described.

As shown in FIGS. 12 and 13 above, the existing pipe 200 is provided with manholes 201 and 202 that are spaced by a predetermined distance. In this example, the tubular structure 130 is produced in the existing pipe 200 using the upstream manhole 201 and the downstream manhole 202 in a region to be treated (rehabilitation region). The tubular structure 130 is produced from the upstream to the downstream of the existing pipe 200.

A drum 91 (with a rotation pedestal) into which the profile strip 100 having the structure of FIG. 24 has been rolled, the pipe producing apparatus 1, the hydraulic unit 93, the generator 92 and the like are used to produce the tubular structure 130. Of them, the drum 91 is provided on the ground at the upstream manhole 201, and the generator 92 is provided on the ground at the downstream manhole 202. The pipe producing apparatus 1 and the hydraulic unit 93 are introduced and installed through the upstream manhole 201 into an upstream end portion of the existing pipe 200 to be rehabilitated. In this case, the junction of the coupling portions of adjacent linking bodies 20 and 20 of the shaping frame 2 of the pipe producing apparatus 1 is released, so that the shaping frame 2 is carried as a single line of the linking bodies 20, the bending link 30, and the drive unit 40.

Note that the length of a circumference of the shaping frame 2 (the number of linking bodies 20) of the pipe producing apparatus 1 is previously adjusted, depending on a pipe size of the tubular structure 130 to be produced. The pipe producing apparatus 1 is also adjusted so that the helical pitch matches the internal diameter of the existing pipe 200 and the width of the profile strip 100.

As shown in FIG. 12, the profile strip 100 is pulled out of the drum 91 provided on the ground and is then introduced into the upstream manhole 201. After a tip portion of the profile strip 100 is passed through the pinch roller 41 of the drive unit 40, the tip portion of the profile strip 100 is wound around an outer surface of the guide roller 47, and is then inserted and pinched between the guide roller 50 and the inner peripheral surface of the existing pipe 200. In this situation, the whole pipe producing apparatus 1 is manually rotated to wind the profile strip 100 several turns (about 1 to 3), so that several windings of tubular structure 130 are prepared for initiation of pipe production.

Next, by expanding the hydraulic cylinder 34, the diameter of the shaping frame 2 is expanded, and the previous windings of the tubular structure 130 for initiation are pressed outward by the guide rollers 50, so that the tubular structure 130 is held with tension being applied thereto.

After the several windings of the tubular structure 130 for initiation of pipe production are pulled out and the installation of the pipe producing apparatus 1 is completed, the drive unit 40 of the pipe producing apparatus 1 is then driven (the hydraulic motor 46 is driven). Thereby, the pinch roller 41 of the drive unit 40 shown in FIGS. 27 and 28 is rotated, so that the profile strip 100 is pinched and forcedly sent out by the inner surface roller 42 and the outer surface roller 43 of the pinch roller 41, and is guided by the guide roller 47 so that the profile strip 100 is arranged adjacent to the several previous windings of the tubular structure 130. By reactive force occurring when the profile strip 100 is sent out by the pinch roller 41, the pipe producing apparatus 1 orbits (revolves) along the inner peripheral surface of the previous winding of the tubular structure 130 in a direction opposite to a direction in which the profile strip 100 is sent out.

Here, in the drive unit 40, the profile strip 100 is newly fed from the pinch roller 41. When the newly fed profile strip 100 reaches the first guide roller 50A, the joint convex portion 101 of the new winding of the profile strip 100 is pressed, from the inside, against the joint concave portion 102 of the previous winding of the tubular structure 130 to which tension is applied, so that the joint convex portion 101 of the new winding of the profile strip 100 fits in the joint concave portion 102 of the tubular structure 130, resulting in a main joint portion 110 (see FIG. 26(a)).

Also, when the guide roller 50 rotates about half a turn around the inner circumference of the previous winding of the tubular structure 130 by the orbiting (revolution) of the pipe producing apparatus 1, the bent piece 108 of the profile strip 100 is pressed by the joint unit 80, so that the bent piece 108 is changed from its elastically deformed state back to its original state and is fitted with the tip portion of the rib 103 of the adjacent winding of the profile strip 100 (see FIG. 26(b)). Thereby, a subsidiary joint portion 120 of the windings of the profile strip 100 is formed, resulting in the tubular structure 130.

Further, when the guide roller 50 rotates about one turn around the inner circumference of the previous winding of the tubular structure 130 by the orbiting (revolution) of the pipe producing apparatus 1, the joint convex portion 101 of the newly fed profile strip 100 is joined with the joint concave portion 102 of the previous winding of the profile strip 100 of the tubular structure 130 by the guide roller 50A, so that the tubular structure 130 is progressively produced.

By such a pipe producing process, the pipe producing apparatus 1 can produce the tubular structure 130 having any external diameter. In addition, as is different from the conventional pipe producing apparatus 300, the main joint portion 110 of the profile strip 100 is formed to produce the tubular structure 130 having any outer shape, and further, the joint unit 80 is used to form the subsidiary joint portion 120, thereby making it possible to form the tubular structure 130 having a high level of strength and a high level of ability to prevent water leakage.

In this case, windings of the profile strip 100 that have already been passed through the drive unit 40 have the main joint portion 110, so that the resultant tubular structure tolerates elastic deformation. Therefore, even if the outer surface roller 84 of the joint unit 80 is subsequently inserted and pinched between the inner peripheral surface of the existing pipe 200 and the profile strip 100, the outer surface roller 84 can be deformed within the elastic deformation region so that the subsidiary joint portion 120 can be formed. After the subsidiary joint portion 120 is formed, the tubular structure 130 can be formed with substantially no gap with respect to the inner peripheral surface of the existing pipe 200. Also, the outer surface roller 84 freely rotates without drive force, so that an acting load is suppressed to a considerably small level. Therefore, even if the outer surface roller 84 contacts the existing pipe 200, frictional force that would otherwise have an influence on driving of the pipe producing apparatus 1 does not occur, so that the pipe producing process can be smoothly carried out.

Further, the pipe producing apparatus 1 has substantially an annular structure. Therefore, during pipe production, the pipe producing apparatus 1 does not clog the existing pipe 200, so that the tubular structure 130 can be produced stably in the existing pipe 200 even when water is passed through the existing pipe 200. In addition, while the tubular structure 130 is being produced by the pipe producing apparatus 1, a process of loading a back-filling material into between the tubular structure 130 and the existing pipe 200 can be performed. In this case, the outer surface roller 84 of the joint unit 80 exists between the existing pipe 200 and the tubular structure 130 (profile strip 100). However, since the outer surface roller 84 freely rotates without drive force, even if a back-filling material is attached thereto, the joining action of the profile strip 100 is not affected, so that the driving of the pipe producing apparatus 1 is not likely to be stopped.

When the production of the tubular structure 130 is completed over the whole length of a region (rehabilitation region) to be treated of the existing pipe 200, the profile strip 100 at a pipe end portion of the tubular structure 130 is cut. Next, the pipe producing apparatus 1 is disassembled, and the apparatuses, such as the pipe producing apparatus 1, the hydraulic unit 93 and the like, are pull out.

Specifically, the shaping frame 2 of the pipe producing apparatus 1 is formed by coupling the linking bodies 20, the bending link 30, and the drive unit 40 with each other. Therefore, by releasing the junction of the coupling portion of adjacent linking bodies 20, the shaping frame 2 can be changed to a single line of the linking bodies 20, the bending link 30, and the drive unit 40, and the joint unit 80, so that the pipe producing apparatus 1 can be easily disassembled and assembled. Therefore, the maintenance of the pipe producing apparatus 1 can be easily performed. The pipe producing apparatus 1 can also be easily carried into or out of the existing pipe 200.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority on Patent Application No. 2006-340207 filed in Japan on Dec. 18, 2006, which is hereby incorporated by reference in its entirety. All documents cited herein are also specifically incorporated by reference in their entirety.

INDUSTRIAL APPLICABILITY

The present invention can be preferably applied so as to rehabilitate an inner peripheral surface of an existing pipe, such as an agricultural water pipe, a sewage pipe, a water supply pipe, a gas pipe or the like.

The invention claimed is:

1. A pipe producing apparatus for continuously feeding an elongated profile strip into an existing pipe, helically winding the profile strip, and joining adjacent windings of the profile strip to form a tubular structure, and further feeding a new winding of the profile strip to a front of the tubular structure, thereby progressively and additionally forming a tubular structure, wherein
the apparatus comprises a shaping frame provided in the existing pipe, and a plurality of guide rollers rotatably supported by the shaping frame,
the shaping frame includes a drive unit for forcedly feeding the profile strip from an inside of the shaping frame, and a bending link coupled with the shaping frame, wherein the bending link is bent toward an inside of the shaping frame,
in the shaping frame, a plurality of linking bodies including a pair of linking elements rotatably coupled via coupling shafts, are coupled with the drive unit and the bending link such that the plurality of linking bodies, the drive unit and the bending link form a substantially enclosed annular shape, and
the bending link includes an actuator for changing a bent shape of the bending link, wherein a length of a circumference of the shaping frame is expanded or contracted by increasing or decreasing a bent angle of the bending link, thereby applying tension to a previous winding of the profile strip via the guide roller.

2. The pipe producing apparatus according to claim 1, wherein
coupling elements are rotatably coupled via coupling shafts with opposite ends of the bending link.

3. The pipe producing apparatus according to claim 1, wherein
the actuator is a hydraulic cylinder or a pneumatic cylinder.

4. The pipe producing apparatus according to claim 1, wherein
coupling elements are rotatably coupled via coupling shafts with opposite ends of the drive unit.

5. The pipe producing apparatus according to claim 1, wherein
a feeding unit for forcedly feeding the profile strip to the drive unit is provided via a stay inside the shaping frame.

6. The pipe producing apparatus according to claim 5, wherein
a guide plate for helically guiding the profile strip is provided between the feeding unit and the drive unit.

7. The pipe producing apparatus according to claim 1, wherein
the guide roller is provided at a plurality of portions of the shaping frame.

8. A rehabilitation method for rehabilitating an existing pipe by using a pipe producing apparatus comprising:
continuously feeding an elongated profile strip into the existing pipe,
helically winding the profile strip,
joining adjacent windings of the profile strip to form a tubular structure, and
feeding a new winding of the profile strip to a front of the tubular structure, thereby progressively and additionally forming a tubular structure, wherein
in the pipe producing apparatus, a shaping frame provided in the existing pipe is configured to form a substantially enclosed annular shape with a drive unit for forcedly feeding the profile strip from an inside of the shaping frame, a bending link provided in a bent shape and having an actuator for changing the bent shape, and a plurality of linking bodies, and
wherein a length of a circumference of the shaping frame is expanded or contracted into any outer shape by changing the bent shape of the bending link by increasing or decreasing a bent angle thereof, so that tension is applied to a previous winding of the profile strip, and a new winding of the profile strip is newly forcedly sent by the drive unit to the previous winding of the profile strip, so that the previous winding of the profile strip is joined with the newly fed winding of the profile strip.

* * * * *